(12) United States Patent
Hooli et al.

(10) Patent No.: US 8,149,958 B2
(45) Date of Patent: Apr. 3, 2012

(54) LOW PAR ZERO AUTO-CORRELATION ZONE SEQUENCES FOR CODE SEQUENCE MODULATION

(75) Inventors: Kari Hooli, Oulu (FI); Kari Pajukoski, Oulu (FI); Esa Tiirola, Kempele (FI)

(73) Assignee: Nokia Siemens Networks Oy, Espoo (FI)

( * ) Notice: Subject to any disclaimer, the term of this patent is extended or adjusted under 35 U.S.C. 154(b) by 953 days.

(21) Appl. No.: 12/214,636

(22) Filed: Jun. 20, 2008

(65) Prior Publication Data

US 2008/0318528 A1 Dec. 25, 2008

Related U.S. Application Data

(60) Provisional application No. 60/936,379, filed on Jun. 20, 2007, provisional application No. 60/967,792, filed on Sep. 7, 2007.

(51) Int. Cl.
*H04L 27/06* (2006.01)
(52) U.S. Cl. ........................................ 375/340
(58) Field of Classification Search ............... 375/340, 375/343, 336, 298
See application file for complete search history.

(56) References Cited

U.S. PATENT DOCUMENTS

| | | | |
|---|---|---|---|
| 2007/0171889 A1* | 7/2007 | Kwon et al. | 370/350 |
| 2008/0075195 A1* | 3/2008 | Pajukoski et al. | 375/298 |
| 2008/0101306 A1* | 5/2008 | Bertrand et al. | 370/336 |
| 2008/0165903 A1* | 7/2008 | Hooli et al. | 375/343 |
| 2008/0232449 A1* | 9/2008 | Khan et al. | 375/220 |
| 2008/0253484 A1* | 10/2008 | Kakura et al. | 375/343 |
| 2008/0310547 A1 | 12/2008 | Tiirola et al. | 375/296 |
| 2009/0110034 A1* | 4/2009 | Kowalski | 375/142 |

OTHER PUBLICATIONS

3GPP TS 36.211 V1.0.0, "Technical Specification Group Radio Access Network; Physical Channels and Modulation", (Release 8) (Mar. 2007), Section 6, Figure 12.
3GPP TR 25.814 V7.1.0, "Technical Specification Group Radio Access Network; Physical layer aspects for evolved Universal Terrestrial Radio Access (UTRA)", (Release 7) (Sep. 2006), Section 9.
3GPP TSG RAN WG1#49, "Design of CAZAC Sequences for Small RB Allocations in E-UTRA UL", Kobe, Japan, May 7-11, 2007, Texas Instruments, R1-072206.
Nokia Siemens Networks, Nokia: "Pucch sequence modulation sequences" 3GPP TSG RAN WG1 Meeting #49BIS, [Online] No. R1-073001, Jun. 25, 2007,-Jun. 29, 2007 pp. 1-5, XP002498093, Orlando, USA.
Fujitsu: "Cubic Metric properties of CAZAC sequences" 3GPP TSG RAN WG1 Meeting #45, vol. R1-061284, May 8, 2006, pp. 1-4, XP00302300, p. 3-p. 4.

(Continued)

*Primary Examiner* — Jaison Joseph
(74) *Attorney, Agent, or Firm* — Harrington & Smith

(57) ABSTRACT

In one non-limiting exemplary embodiment, a method includes: randomly selecting a set of sequences with each sequence having sequence elements, each sequence element having a frequency selected from constellation points on a unit circle in a complex plane, where the selected set of sequences is a candidate set of sequences; calculating a first cubic metric for each sequence of the candidate set of sequences, where the first cubic metric is for single code modulation; and in response to the first cubic metric being larger than at least one threshold, removing the corresponding sequence from the candidate set of sequences to obtain at least one saved sequence.

38 Claims, 47 Drawing Sheets

OTHER PUBLICATIONS

S. Marsili: "Algorithm for Peak to Average Power Ratio Reduction operating at Symbol Rate" Circuits and Systems, 2005. ISCAS 2005. IEEE International Symposium on Kobe, Japan May 23-26, 2005, Piscataway, NJ, USA, IEEE, May 23, 2005, pp. 5497-5500, XP010816777, ISBN: 978-0-7803-8834-5, abstract, Section III, figure 4.

* cited by examiner

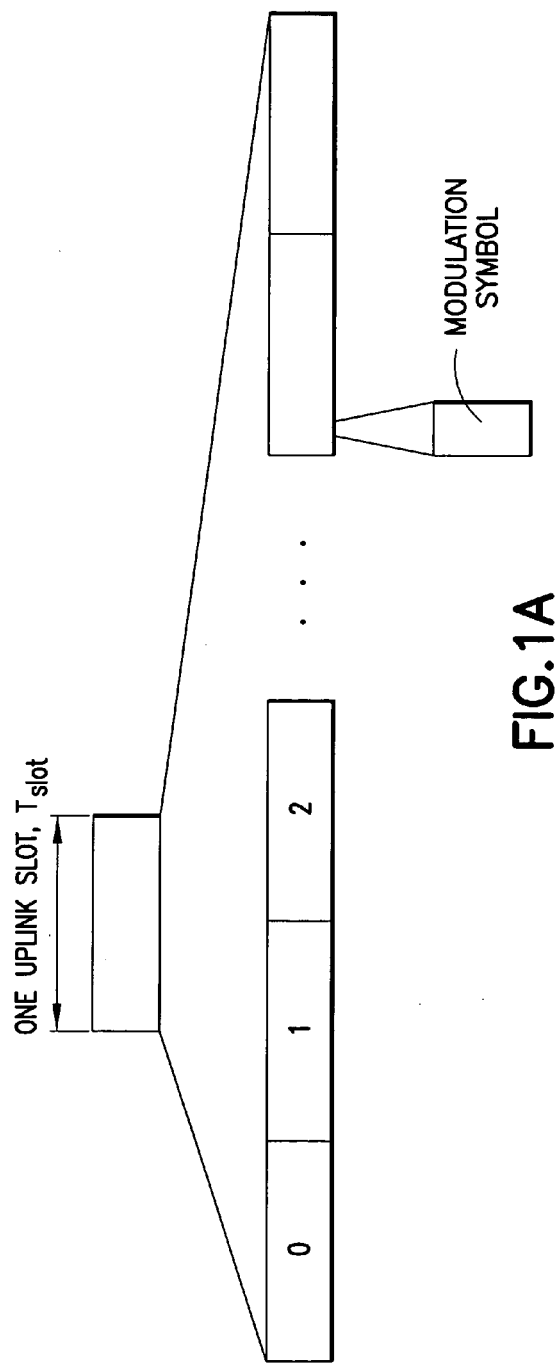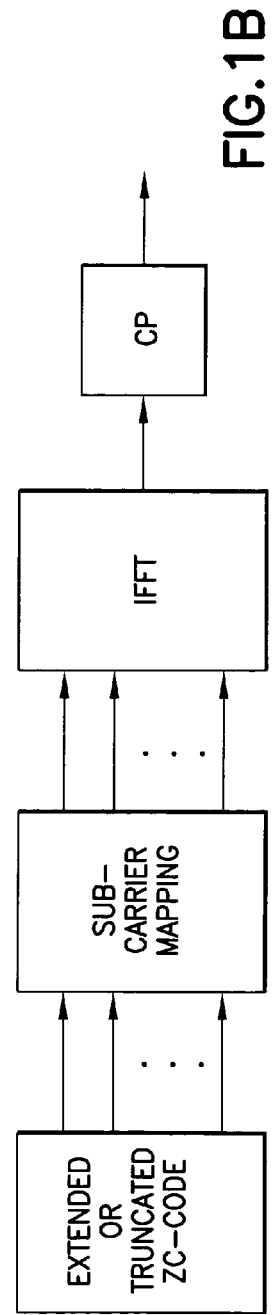
FIG.1A
FIG.1B

FIG.5A

| FIG.5A-1 | FIG.5A-2 |
|---|---|
| FIG.5A-3 | FIG.5A-4 |

FIG.5A-1

| SEQUENCES IN FREQUENCY SEQUENCE NUMBER: ELEMENT | 1 | 2 | 3 | 4 |
|---|---|---|---|---|
| 1 | -2.9172 - 1.8683i | 0.5165 + 3.4255i | -2.3651 - 2.5311i | -1.8421 + 2.9338i |
| 2 | 1.3995 + 3.1689i | -0.1297 + 3.4617i | 3.1575 + 1.4255i | -3.3733 - 0.7876i |
| 3 | 2.6153 - 2.2716i | 0.7616 + 3.3794i | 0.9892 - 3.3198i | 1.1298 - 3.2747i |
| 4 | -3.4319 + 0.4706i | -2.5894 + 2.3008i | -2.3942 + 2.5034i | 3.4152 - 0.5791i |
| 5 | -1.4262 - 3.1567i | -1.6089 + 3.0676i | -3.2364 + 1.2353i | 2.5571 - 2.3367i |
| 6 | 2.9132 - 1.8740i | 1.1386 - 3.2717i | -0.1221 + 3.4620i | -1.2969 - 3.2122i |
| 7 | 3.0238 - 1.6899i | 3.4425 + 0.3853i | -1.0781 + 3.2921i | -1.6093 + 3.0676i |
| 8 | 3.3433 - 0.9061i | -3.3790 - 0.7632i | -0.7956 + 3.3715i | 3.0602 - 1.6237i |
| 9 | 3.1455 + 1.4514i | -1.4099 - 3.1643i | 1.4201 + 3.1597i | -2.9260 - 1.8544i |
| 10 | -1.0487 - 3.3016i | -1.8384 + 2.9360i | -2.9550 - 1.8080i | 1.6066 - 3.0691i |
| 11 | 0.6198 - 3.4083i | 3.4642 + 0.0231i | -1.5521 - 3.0968i | -3.4631 - 0.0830i |
| 12 | -2.2004 + 2.6756i | -3.2869 - 1.0942i | 2.1410 + 2.7234i | -2.8406 - 1.9825i |

FIG.5A-2

| 5 | 6 | 7 | 8 | 9 | 10 |
|---|---|---|---|---|---|
| -3.4200 - 0.5504i | -1.7385 - 2.9964i | -2.9543 - 1.8086i | -1.2675 - 3.2238i | 3.3305 - 0.9524i | -3.4210 + 0.5454i |
| 3.4483 + 0.3307i | -2.3120 - 2.5796i | 3.0402 - 1.6605i | -1.8968 - 2.8986i | -3.4569 + 0.2199i | 3.0303 + 1.6787i |
| 2.5862 - 2.3049i | 0.3154 - 3.4497i | -1.2211 + 3.2417i | -3.4324 - 0.4684i | 0.5625 - 3.4182i | -1.5695 - 3.0882i |
| -2.5957 + 2.2941i | 0.6337 - 3.4056i | -3.4263 + 0.5112i | -1.6200 - 3.0619i | 1.5001 + 3.1224i | 3.0423 - 1.6571i |
| 3.4630 + 0.0809i | 3.4513 + 0.2980i | -3.4603 + 0.1606i | -2.3192 + 2.5731i | 0.6083 - 3.4104i | -0.8649 + 3.3544i |
| 0.8850 + 3.3492i | -3.1090 - 1.5279i | -0.2141 + 3.4576i | 2.5855 - 2.3053i | -2.4866 - 2.4117i | 1.6568 + 3.0423i |
| 3.0904 - 1.5654i | -3.1787 + 1.3770i | 3.2265 - 1.2606i | 2.4003 - 2.4978i | 3.3589 - 0.8476i | 2.6152 + 2.2718i |
| 2.5471 + 2.3479i | 3.1277 + 1.4890i | -0.9712 - 3.3251i | -1.6982 + 3.0194i | 2.5788 - 2.3130i | 3.1140 + 1.5178i |
| 3.1832 - 1.3665i | 3.4544 - 0.2596i | -3.4602 + 0.1639i | -0.1282 + 3.4617i | 0.8063 + 3.3689i | 2.7043 - 2.1649i |
| 3.3005 - 1.0519i | -3.2517 + 1.1942i | 0.4313 - 3.4372i | -2.4812 - 2.4173i | -0.1219 + 3.4620i | 1.0399 + 3.3043i |
| -2.5716 + 2.3211i | 2.2615 - 2.6241i | -2.2418 - 2.6408i | 3.4210 - 0.5450i | 1.6379 + 3.0523i | -2.0501 + 2.7925i |
| -3.2052 + 1.3136i | -2.6949 + 2.1767i | 3.3469 - 0.8938i | -2.5153 - 2.3821i | 3.3485 - 0.8874i | -0.8421 - 3.3602i |

| SEQUENCES IN TIME SEQUENCE NUMBER: | 1 | 2 | 3 | 4 |
|---|---|---|---|---|
| ELEMENT 1 | 0.5030 - 0.8925i | -0.4099 + 0.8905i | -0.5659 + 0.8681i | -0.4652 - 1.0668i |
| 2 | -0.9853 + 0.1895i | -0.7512 + 0.9090i | 0.2396 - 1.1650i | -0.6029 + 0.8468i |
| 3 | -0.1169 + 1.1396i | 0.1106 - 0.6049i | 0.4179 + 1.0915i | -0.7843 + 1.0135i |
| 4 | -0.2675 + 0.7791i | -1.0711 + 0.6639i | 0.2482 + 0.5098i | 0.3846 - 0.6388i |
| 5 | -0.4891 - 0.5355i | -0.5710 + 0.7682i | -0.5931 - 0.7467i | 0.0325 + 1.1678i |
| 6 | -0.4677 - 0.6835i | 0.8025 + 0.4037i | -0.9676 - 0.4722i | 0.0182 - 0.9057i |
| 7 | 0.3405 - 0.9314i | 1.2709 + 0.2956i | -0.4045 - 1.0782i | -0.5604 + 0.8089i |
| 8 | 0.6225 - 0.9223i | -0.5167 - 0.5295i | -0.0397 - 1.0118i | 0.9307 + 0.6547i |
| 9 | -1.1074 - 0.1693i | 0.8637 + 0.6032i | -1.0391 + 0.2427i | 0.8253 + 0.4873i |
| 10 | -0.9753 - 0.1464i | -0.6240 - 0.7404i | -0.6716 + 0.3216i | -0.0960 + 0.4776i |
| 11 | 0.9232 - 0.3900i | 0.7152 - 0.0472i | 0.4631 + 0.0031i | -0.7736 + 0.5900i |
| 12 | -0.8972 + 0.6944i | 0.6975 + 0.8134i | 0.5476 - 1.0940i | -0.7510 - 0.5015i |

FIG.5A-3

| 5 | 6 | 7 | 8 | 9 | 10 |
|---|---|---|---|---|---|
| 0.8926 + 0.4332i | -0.2534 - 0.8590i | -0.6587 - 0.6243i | -0.7460 - 0.8955i | 0.9722 - 0.0846i | 0.7046 + 0.6864i |
| -1.0992 - 0.0446i | 0.3035 - 0.7062i | -0.8285 - 0.4571i | -0.2309 - 1.1635i | 0.9584 - 0.1808i | -0.7508 - 0.6116i |
| 0.3709 + 1.0311i | -0.5692 + 0.6199i | 1.0417 - 0.1545i | -0.0249 - 1.0207i | 0.1820 - 1.0953i | 0.5259 + 0.8571i |
| 0.2874 + 0.8834i | 0.7452 - 0.6667i | -0.9755 + 0.2903i | -0.0756 + 0.8636i | -0.1802 - 1.1061i | -1.0085 + 0.0143i |
| -0.6945 - 0.0777i | -0.7895 + 0.5686i | 0.9586 - 0.5877i | -0.2754 - 0.8804i | 0.4576 + 0.5781i | -1.0191 + 0.3072i |
| -1.0977 - 0.2445i | 0.9902 - 0.3723i | -1.0729 - 0.2166i | 0.4168 + 1.0072i | -0.9251 - 0.5826i | -0.4302 + 0.7351i |
| 0.1626 - 0.9974i | 1.0143 - 0.4168i | -1.0265 + 0.2670i | 0.5250 + 0.7788i | 0.7452 - 0.2833i | -1.1356 - 0.0679i |
| -0.0797 + 1.1071i | -0.3855 - 0.8134i | -0.7621 + 0.5361i | -0.0602 - 0.8503i | -0.0148 - 0.0475i | -0.6580 - 0.2457i |
| -0.1043 - 0.5739i | -0.8409 - 0.6673i | -0.9806 - 0.2868i | 0.2793 - 1.0243i | 0.5871 + 0.7026i | 1.1336 + 0.1225i |
| -0.2672 - 0.9312i | 0.2163 + 0.9565i | -0.6309 - 0.4277i | -0.9417 + 0.1901i | 0.0445 + 1.1427i | 0.9123 - 0.0545i |
| -0.7921 - 0.8732i | -1.0199 - 0.0551i | 0.8016 - 0.1483i | 0.8084 + 0.1813i | 0.4006 - 0.7175i | -0.6123 - 0.4967i |
| -0.9988 - 0.2627i | -1.1496 - 0.5846i | 1.1795 + 0.0010i | -0.9423 - 0.4101i | -0.9266 + 0.7219i | -1.0829 - 0.7008i |

FIG.5A-4

| | 11 | 12 | 13 | 14 | 15 | 16 |
|---|---|---|---|---|---|---|
| | -3.4273 - 0.5037i | -0.7183 + 3.3888i | -1.4262 - 3.1570i | 3.4638 - 0.0349i | -2.4784 + 2.4202i | -2.3300 + 2.5634i |
| | 3.4481 + 0.3325i | -1.5615 - 3.0923i | 1.6467 + 3.0478i | 1.0000 + 3.3167i | 2.8624 + 1.9510i | 0.9613 - 3.3281i |
| | 1.3939 + 3.1713i | 1.8206 + 2.9473i | 1.9310 - 2.8758i | -2.6362 - 2.2473i | 1.7445 - 2.9927i | 3.2649 + 1.1577i |
| | -2.3824 - 2.5150i | 1.3069 - 3.2082i | -0.7166 + 3.3892i | 1.8216 - 2.9465i | -1.5475 - 3.0993i | -2.9450 + 1.8238i |
| | 3.4165 + 0.5724i | -3.3101 - 1.0217i | -3.1836 + 1.3655i | -1.6011 - 3.0718i | 1.3964 - 3.1700i | 2.6745 + 2.2014i |
| | 2.5977 - 2.2919i | -2.7176 - 2.1482i | 1.5878 + 3.0788i | 0.8258 + 3.3641i | 3.4614 + 0.1386i | 3.4373 - 0.4300i |
| | 3.1219 + 1.5013i | -0.7997 - 3.3706i | 2.6644 + 2.2140i | 3.1958 + 1.3367i | -1.7676 + 2.9792i | 2.8096 + 2.0262i |
| | 3.3788 - 0.7650i | 1.7650 - 2.9807i | -0.5937 + 3.4129i | 1.9750 - 2.8462i | 0.2532 - 3.4547i | 1.8958 - 2.8991i |
| | 1.7121 + 3.0114i | 3.0654 - 1.6138i | 3.0753 + 1.5947i | -2.1207 + 2.7392i | 2.4497 + 2.4493i | -3.2317 + 1.2481i |
| | 2.2942 + 2.5954i | -3.4573 - 0.2168i | 3.4240 - 0.5262i | 3.4416 + 0.3935i | 2.6987 - 2.1721i | 0.8874 + 3.3486i |
| | 2.1937 - 2.6809i | -3.4533 + 0.2736i | -2.1837 + 2.6892i | 1.0052 + 3.3151i | 2.0508 + 2.7918i | -1.2553 + 3.2286i |
| | -3.1144 - 1.5170i | 2.5855 + 2.3054i | -3.3442 - 0.9035i | 3.2744 + 1.1310i | 1.7404 + 2.9951i | -3.1640 + 1.4110i |

FIG.5B-1

| FIG.5B-1 | FIG.5B-2 |
|---|---|
| FIG.5B-3 | FIG.5B-4 |

| | 17 | 18 | 19 | 20 | 21 | 22 |
|---|---|---|---|---|---|---|
| | 3.2708 + 1.1414i | -0.0795 - 3.4632i | -0.7583 - 3.3800i | -3.3078 + 1.0284i | -3.4573 - 0.2169i | 3.3237 - 0.9770i |
| | -3.3337 - 0.9412i | 2.6871 + 2.1859i | -3.4489 + 0.3246i | -2.2071 + 2.6699i | 2.4512 + 2.4478i | 1.5922 + 3.0763i |
| | 3.2796 - 1.1155i | -1.8141 + 2.9511i | -0.4633 + 3.4330i | 1.1880 + 3.2541i | -1.4140 - 3.1623i | -2.8923 + 1.9067i |
| | -2.6161 - 2.2709i | -2.4439 - 2.4550i | 3.3811 + 0.7538i | 2.5330 + 2.3632i | -1.6652 + 3.0378i | 2.0742 - 2.7745i |
| | -2.6305 + 2.2540i | -3.4024 - 0.6511i | -3.1821 + 1.3690i | -0.7464 + 3.3828i | -3.1392 + 1.4652i | -2.8782 + 1.9280i |
| | -3.4302 + 0.4835i | -1.7426 + 2.9940i | -1.2268 - 3.2395i | -2.1923 - 2.6821i | -2.8803 + 1.9245i | 2.4706 + 2.4281i |
| | -2.8544 - 1.9628i | 2.5819 - 2.3094i | -0.1279 - 3.4616i | -3.3988 + 0.6698i | -2.4175 - 2.4813i | 0.3943 + 3.4414i |
| | -1.1316 - 3.2741i | -2.8727 + 1.9357i | 2.0800 - 2.7701i | 1.4397 - 3.1507i | 2.9314 - 1.8457i | 1.5513 + 3.0975i |
| | -0.0970 - 3.4629i | 1.9069 - 2.8922i | 0.4985 - 3.4280i | -1.1808 - 3.2568i | 3.3403 + 0.9183i | -2.9616 + 1.7970i |
| | -1.9715 + 2.8487i | 0.6635 - 3.4000i | -3.4621 - 0.1190i | -0.7612 + 3.3794i | -1.7396 - 2.9956i | 3.2026 - 1.3203i |
| | -0.2173 + 3.4572i | -0.2554 - 3.4548i | 2.2637 - 2.6222i | -1.8302 - 2.9411i | 0.7685 - 3.3780i | -1.4287 - 3.1557i |
| | 1.3711 - 3.1814i | -2.4624 - 2.4366i | 0.3253 + 3.4488i | 3.4475 + 0.3387i | -3.1319 - 1.4798i | -3.4641 - 0.0323i |

| 11 | 12 | 13 | 14 | 15 | 16 |
|---|---|---|---|---|---|
| 1.2194 + 0.0759i | -0.4562 - 0.7281i | 0.2401 + 1.1108i | 1.1371 + 0.3708i | 1.0720 + 0.0697i | 0.2504 + 1.0293i |
| -0.8511 - 0.2444i | 0.2954 + 1.0786i | -0.6000 - 1.0934i | 0.9651 - 0.2753i | 0.7968 + 0.2998i | -0.5629 + 0.8549i |
| -0.9604 + 0.0792i | 0.4333 + 0.8810i | -0.0609 + 0.8785i | 0.9067 + 0.1160i | -0.0750 + 0.8989i | 1.0198 - 0.5072i |
| -0.8701 + 0.9622i | 0.2536 - 1.0409i | -0.3040 + 0.7574i | -1.1299 - 0.3813i | -0.3447 + 0.6248i | -0.5801 + 0.7583i |
| -0.3042 + 0.8075i | 0.3694 - 0.8783i | -0.3212 - 0.8613i | 1.2302 - 0.1227i | -0.6001 - 0.2233i | -0.0205 + 0.9921i |
| 0.4560 - 0.6452i | 0.4815 + 0.6109i | -1.0478 - 0.1564i | -0.8892 - 0.3919i | -0.9774 - 0.6965i | 0.3635 - 0.8538i |
| 0.1824 + 0.7694i | -0.1097 + 0.8287i | -0.0939 - 0.8057i | -0.9193 - 0.0313i | -0.5061 + 0.6766i | 0.0716 + 1.0416i |
| -0.8615 - 0.2170i | -0.8689 + 0.3770i | 0.7425 - 0.3735i | 0.8954 - 0.2872i | 0.7265 - 0.5459i | 0.0815 + 0.8176i |
| -1.0136 - 0.6139i | -0.8303 + 0.7547i | 1.0675 + 0.2305i | 0.6134 - 0.5609i | -1.2456 + 0.1856i | -0.6244 + 0.4191i |
| 0.0354 - 0.7808i | -0.0087 + 1.1914i | -0.3537 - 1.1281i | 0.8261 - 0.0807i | 0.2347 - 0.8046i | -0.7043 - 0.8249i |
| 0.7237 - 0.6193i | -0.1655 - 0.8489i | -0.2125 - 1.0243i | 0.3617 + 0.8790i | -0.7682 + 1.0922i | -0.4571 - 0.6801i |
| -1.1833 - 0.0773i | -0.1122 + 1.1627i | -0.4823 - 0.6915i | -0.5335 + 0.7306i | -0.7913 + 0.8429i | -1.1675 - 0.4835i |

FIG.5B-3

| 17 | 18 | 19 | 20 | 21 | 22 |
|---|---|---|---|---|---|
| -0.8634 - 0.5020i | -0.6028 - 0.9163i | -0.3434 - 0.8076i | -0.5847 + 0.4213i | -0.8628 - 0.4805i | 0.0820 + 0.7846i |
| 1.0334 + 0.0345i | -0.8359 - 0.8363i | -0.8589 + 0.6452i | -0.7533 + 0.8125i | -1.0533 - 0.7474i | -0.4732 - 0.6992i |
| 0.9833 - 0.1903i | -0.2353 + 0.9312i | -0.0241 - 0.6291i | -0.6815 - 0.4325i | -0.2010 + 1.1209i | -0.2455 + 0.9874i |
| -0.8985 - 0.5671i | -0.5686 + 0.4328i | -0.0540 - 1.3927i | -0.4175 - 1.0341i | -0.1548 + 0.9071i | -0.2069 + 0.6383i |
| -0.7228 - 0.3883i | 0.4350 - 0.9759i | 0.3332 - 0.4746i | -0.4910 + 0.3870i | -0.7638 + 0.4205i | 1.1666 - 0.1859i |
| 0.8234 + 0.0877i | -0.2864 + 0.9027i | 1.2815 + 0.1580i | 0.8116 - 0.9620i | -0.8376 + 0.3745i | 1.1271 - 0.1418i |
| 0.9886 + 0.5539i | 0.4257 - 0.7203i | 0.0485 - 0.5407i | -0.9613 - 0.0651i | -0.1904 - 0.6620i | -1.1558 + 0.0388i |
| 0.3048 - 0.9178i | -0.9036 - 0.0940i | -0.4389 - 1.3173i | -0.9770 - 0.2388i | 0.6994 - 0.8691i | 0.3384 - 0.6509i |
| 0.5434 + 0.8294i | 0.3483 - 1.0147i | -0.2316 - 0.2695i | -0.1580 + 1.0519i | -0.6933 - 0.6040i | 1.0001 - 1.0063i |
| 0.9544 + 0.4927i | 0.2207 - 1.1317i | -0.7984 + 0.9280i | 0.2185 + 1.0627i | 0.1226 + 0.9576i | 0.4420 - 0.5457i |
| -0.7209 - 0.7134i | 0.8803 - 0.1903i | -0.2257 - 0.6993i | -0.4768 - 0.5135i | -0.2261 - 1.1440i | 1.0116 + 0.6136i |
| 0.8451 + 0.5865i | 1.0431 + 0.1496i | 0.5535 + 1.0196i | 1.1632 + 0.5390i | 0.7038 + 0.5095i | 0.2373 - 0.8099i |

FIG.5B-4

| | 23 | 24 | 25 | 26 | 27 | 28 |
|---|---|---|---|---|---|---|
| | 1.3422 + 3.1936i | 3.4631 - 0.0808i | -3.2750 + 1.1290i | 3.3094 - 1.0242i | 2.6683 - 2.2092i | -0.8803 + 3.3505i |
| | -1.9971 - 2.8305i | -1.1907 - 3.2532i | 3.1530 - 1.4347i | 2.1439 - 2.7208i | 0.0384 - 3.4639i | -2.9769 - 1.7714i |
| | 3.4632 - 0.0824i | -2.9304 + 1.8471i | 0.2148 + 3.4574i | -3.2786 + 1.1181i | -2.6703 + 2.2068i | 2.2998 - 2.5904i |
| | -0.6254 - 3.4072i | 2.6679 - 2.2096i | -3.4534 - 0.2696i | -2.9433 + 1.8271i | -1.5065 + 3.1194i | 1.5532 - 3.0968i |
| | -3.1821 + 1.3691i | -2.2160 - 2.6626i | 2.6033 - 2.2848i | -2.5740 - 2.3183i | -3.4502 + 0.3104i | 1.3108 - 3.2065i |
| | -2.6386 + 2.2445i | -3.4383 + 0.4215i | 3.4491 - 0.3201i | 1.7109 + 3.0122i | 2.5629 + 2.3306i | -0.2097 + 3.4576i |
| | -3.4378 - 0.4256i | -1.7881 + 2.9668i | 0.8842 + 3.3494i | -2.0986 - 2.7560i | -2.9771 + 1.7714i | 2.0007 - 2.8279i |
| | -2.9407 - 1.8308i | -3.3492 - 0.8844i | 1.5766 + 3.0844i | -0.2140 - 3.4574i | -2.0859 - 2.7657i | -3.3782 + 0.7669i |
| | 0.1797 - 3.4596i | -3.4635 + 0.0696i | -3.4569 + 0.2219i | -1.2973 + 3.2120i | 1.8829 + 2.9077i | 2.7228 + 2.1417i |
| | -3.3650 + 0.8224i | -3.0777 - 1.5900i | -1.4886 - 3.1280i | 0.3113 - 3.4501i | -2.7555 - 2.0992i | 2.2260 + 2.6542i |
| | -2.9300 + 1.8481i | 3.3607 + 0.8399i | -3.3436 + 0.9047i | -2.6397 - 2.2432i | -3.4426 + 0.3841i | 2.9424 - 1.8282i |
| | 2.9988 - 1.7340i | 0.4962 + 3.4285i | 1.0449 + 3.3028i | 0.5104 - 3.4262i | -1.5124 - 3.1164i | 3.2026 - 1.3205i |

| FIG.5C-1 | FIG.5C-2 |
|---|---|
| FIG.5C-3 | FIG.5C-4 |

| | 29 | 30 | 31 | 32 | 33 |
|---|---|---|---|---|---|
| | -3.4638 - 0.0440i | 1.1089 + 3.2819i | -3.0717 + 1.6014i | -3.4516 - 0.2941i | -1.1742 + 3.2590i |
| | 2.7773 - 2.0702i | -1.8139 + 2.9511i | -0.6411 - 3.4042i | -3.3564 - 0.8569i | 2.1348 - 2.7279i |
| | -1.3113 + 3.2064i | 1.7785 - 2.9727i | 0.1685 + 3.4601i | 2.0761 + 2.7731i | -2.7479 - 2.1093i |
| | -0.5093 - 3.4265i | 2.6064 + 2.2816i | -3.1383 + 1.4666i | 1.7459 + 2.9918i | -3.4628 + 0.0990i |
| | -3.3667 + 0.8151i | -2.8665 + 1.9451i | -0.7755 + 3.3762i | -2.7686 + 2.0821i | -0.6318 - 3.4060i |
| | -0.0727 + 3.4634i | 0.1430 + 3.4611i | -1.5769 - 3.0845i | -0.1615 + 3.4603i | 1.3122 + 3.2058i |
| | -3.0256 - 1.6868i | -2.1527 - 2.7139i | -3.2151 - 1.2896i | -1.6220 - 3.0607i | -3.3054 + 1.0366i |
| | -2.3809 - 2.5161i | -3.4612 - 0.1422i | -1.7938 + 2.9636i | -1.1837 + 3.2556i | -1.9548 + 2.8598i |
| | 1.2022 - 3.2488i | 2.9087 - 1.8814i | 2.0610 - 2.7846i | -0.5307 - 3.4233i | -1.2831 - 3.2178i |
| | 3.0911 - 1.5639i | -2.6422 - 2.2404i | 1.5223 - 3.1116i | -3.0491 + 1.6446i | 3.4488 - 0.3258i |
| | -0.3938 - 3.4417i | -2.9411 - 1.8302i | 3.3256 - 0.9693i | -3.4640 + 0.0203i | 0.0788 - 3.4633i |
| | -3.3897 + 0.7139i | -3.0347 + 1.6700i | -3.4034 - 0.6457i | 2.8644 - 1.9484i | -0.9778 - 3.3233i |

| 23 | 24 | 25 | 26 | 27 | 28 |
|---|---|---|---|---|---|
| -1.0944 - 0.3577i | -0.9555 + 0.3515i | -0.1743 + 1.0485i | -0.5883 - 1.0189i | -1.1040 - 0.0520i | 0.9011 - 0.3559i |
| 1.0398 + 0.3545i | 1.1477 - 0.1690i | -0.7332 + 0.5239i | -0.1333 - 0.6125i | -0.4366 - 0.7681i | 0.9124 - 0.4827i |
| 0.9311 + 0.6083i | 0.7716 - 0.3400i | 0.8237 + 0.3996i | 0.6754 - 0.4198i | 0.6818 - 0.4388i | -0.8524 - 0.2630i |
| -0.4970 - 0.6392i | 0.3248 - 0.8770i | 0.7597 + 0.1558i | 0.4631 + 0.8803i | 0.8884 + 0.1331i | -1.0067 + 0.5995i |
| -0.3281 - 0.8846i | 1.0979 + 0.1388i | -0.6979 - 0.1916i | 1.1742 - 0.2330i | 0.6925 - 0.5654i | 0.7196 - 0.5422i |
| 0.5082 + 0.6355i | 0.7879 + 0.4669i | 0.0525 - 0.7351i | -0.6134 + 0.4870i | -0.2668 + 0.7772i | -0.5200 + 0.8699i |
| 0.3336 + 0.7649i | 0.3598 + 1.0327i | -0.8879 + 0.8427i | -0.8415 + 0.3503i | -0.2275 + 0.9472i | 0.8316 - 0.4709i |
| -0.3668 + 1.0076i | -0.2830 - 1.0707i | -0.8158 + 0.6490i | 1.1771 + 0.4564i | 1.1105 - 0.6059i | -0.4099 + 0.9364i |
| -0.0990 + 1.2881i | 0.1739 - 0.7187i | -0.9610 - 0.5867i | -0.9412 - 0.0989i | -0.7312 + 0.7630i | -0.3958 + 0.9181i |
| 0.7044 + 0.5997i | -0.4679 + 0.3766i | -1.0737 - 0.8351i | 0.7794 - 0.2552i | 0.8101 - 0.6920i | 0.3251 + 0.9892i |
| -0.7910 - 0.0350i | -0.6102 + 0.9787i | 0.7020 + 0.7267i | 1.1268 - 0.4698i | 0.5340 - 0.8729i | -0.6439 + 0.9752i |
| 1.0014 - 0.1485i | 1.1161 - 0.2506i | -0.2691 - 0.8687i | 1.0311 - 0.0901i | 0.7171 - 0.8346i | -0.7414 + 0.1769i |

FIG.5C-3

| 29 | 30 | 31 | 32 | 33 |
|---|---|---|---|---|
| -0.9036 - 0.8166i | -0.8639 + 0.3175i | -0.8782 - 0.2018i | -1.0751 + 0.5537i | -0.7136 - 0.6761i |
| -0.6355 - 0.2806i | -0.6629 + 0.9531i | -0.7235 - 0.6603i | -0.7735 + 0.1370i | 0.1173 - 1.1126i |
| -0.2765 + 0.9078i | 0.1486 + 1.1576i | -1.0098 + 0.0214i | -0.0608 - 0.5249i | -0.2890 + 0.6235i |
| -0.4963 + 0.9600i | 0.3420 + 0.8699i | 0.9433 + 0.7193i | -0.3075 - 0.9468i | 0.1974 + 1.2052i |
| 0.7823 - 0.4169i | 0.1060 - 1.0120i | -0.9111 + 0.1411i | -0.5222 - 1.2007i | -0.1116 + 1.0865i |
| 0.6449 + 0.8438i | -0.0546 + 0.9175i | 0.9023 + 0.7719i | 0.2953 + 1.0346i | 0.0258 + 0.9503i |
| -0.8229 + 0.0833i | 0.5032 - 1.0127i | 0.6270 + 0.7675i | -0.5517 - 0.8708i | -0.7970 - 0.6407i |
| -0.9454 - 0.0543i | 0.7187 - 0.5117i | -0.5971 + 0.4353i | -0.5641 + 1.1453i | 0.0068 + 1.2566i |
| -0.8556 - 0.4468i | 0.4880 + 0.8468i | -0.1864 - 0.2726i | 0.0031 + 0.9674i | -0.2982 + 0.6068i |
| 0.3467 - 1.0526i | 0.4024 + 0.9405i | -1.2875 - 0.5540i | -0.3160 + 0.7188i | 0.2835 - 1.0100i |
| -1.1684 - 0.1762i | -0.9038 - 0.0132i | -0.7849 - 0.2997i | -0.3301 - 0.6021i | -0.0304 + 1.1478i |
| 0.8665 + 0.4051i | 0.8852 - 0.1714i | 0.8342 + 0.7333i | 0.7510 - 0.7056i | 0.4348 - 0.1783i |

| | 34 | 35 | 36 | 37 | 38 | 39 |
|---|---|---|---|---|---|---|
| | -2.2852 - 2.6034i | -0.0299 + 3.4640i | -2.4748 + 2.4237i | -2.9160 + 1.8700i | 1.2648 - 3.2251i | 3.4393 + 0.4150i |
| | -0.3966 + 3.4412i | -0.9333 - 3.3360i | -0.1391 - 3.4613i | -2.8746 + 1.9333i | -3.0927 + 1.5602i | 2.3261 + 2.5670i |
| | 3.4235 + 0.5284i | 3.4038 - 0.6428i | -1.3996 + 3.1688i | -2.9050 + 1.8873i | 2.7686 + 2.0821i | -2.2590 + 2.6262i |
| | 3.4507 - 0.3053i | -2.7720 - 2.0775i | -2.7723 - 2.0772i | -2.3362 + 2.5578i | -0.5497 - 3.4204i | 2.7110 - 2.1565i |
| | -1.8919 + 2.9019i | -0.0534 + 3.4637i | -2.9964 - 1.7379i | 3.2954 - 1.0678i | -1.2081 - 3.2465i | -3.2394 + 1.2274i |
| | 0.1893 - 3.4591i | 0.7673 + 3.3782i | -1.2062 + 3.2472i | -3.4579 + 0.2093i | 1.4018 - 3.1677i | -3.4620 - 0.1164i |
| | -1.7694 - 2.9782i | -2.5113 + 2.3860i | 3.2248 + 1.2651i | 3.0350 - 1.6698i | -0.6656 + 3.3995i | -2.9977 + 1.7362i |
| | 3.4233 - 0.5294i | 0.6091 + 3.4100i | -0.0259 - 3.4641i | 2.1303 + 2.7316i | -2.9979 - 1.7357i | 1.8292 + 2.9419i |
| | -3.4501 + 0.3117i | -3.2230 + 1.2695i | 0.1600 - 3.4605i | -3.2276 + 1.2579i | 3.2472 + 1.2060i | 1.3307 + 3.1984i |
| | 1.5087 - 3.1183i | -3.3488 + 0.8863i | 2.1787 - 2.6932i | -3.3896 + 0.7152i | 0.8293 - 3.3632i | -3.3818 - 0.7499i |
| | 0.6523 - 3.4020i | 3.3792 + 0.7618i | 3.4350 - 0.4484i | 2.8754 + 1.9320i | 1.9221 - 2.8818i | 0.7561 + 3.3806i |
| | -0.8290 - 3.3635i | 3.2135 - 1.2932i | -3.2294 - 1.2534i | -0.3704 - 3.4444i | 2.8378 - 1.9866i | -0.3345 - 3.4479i |

FIG.5D-2

| 40 | 41 | 42 | 43 | 44 |
|---|---|---|---|---|
| -0.6175 - 3.4087i | 2.1859 + 2.6873i | -2.1253 + 2.7356i | 2.5008 - 2.3971i | -3.3165 - 1.0008i |
| 2.2580 - 2.6270i | -2.6176 - 2.2686i | -1.3937 + 3.1716i | -2.6152 - 2.2715i | -2.9959 + 1.7396i |
| 0.4383 + 3.4364i | -1.0210 + 3.3102i | -3.4605 - 0.1585i | -2.9863 + 1.7554i | 1.1204 + 3.2780i |
| -2.2478 - 2.6356i | -2.2478 - 2.6356i | -2.6916 - 2.1809i | 1.6550 + 3.0433i | 1.2759 + 3.2206i |
| -1.9993 + 2.8287i | -3.4188 + 0.5585i | -0.7558 + 3.3806i | -2.4909 - 2.4074i | 1.2455 - 3.2323i |
| 1.0605 + 3.2978i | -3.4217 + 0.5400i | 2.0036 - 2.8260i | 3.3281 - 0.9605i | 2.1130 + 2.7450i |
| -3.4235 - 0.5289i | 3.4535 - 0.2717i | 2.2949 + 2.5948i | -0.7972 - 3.3711i | 3.3343 + 0.9396i |
| -3.4511 - 0.2998i | 3.4028 + 0.6490i | 1.3242 - 3.2011i | 3.3031 - 1.0438i | -2.4081 + 2.4901i |
| -2.6593 + 2.2198i | -2.6599 - 2.2195i | -2.1298 - 2.7319i | 2.9961 - 1.7385i | -0.3533 + 3.4462i |
| 2.3518 + 2.5434i | -1.0464 - 3.3024i | -1.0356 + 3.3057i | 3.4442 + 0.3709i | -1.6353 + 3.0538i |
| -2.8621 - 1.9517i | 2.1947 - 2.6800i | -3.4559 - 0.2358i | -3.0205 + 1.6961i | -0.4626 - 3.4331i |
| 1.7122 + 3.0114i | -1.5609 - 3.0924i | 1.0239 - 3.3093i | -0.4392 - 3.4362i | 2.9958 + 1.7389i |

| 34 | 35 | 36 | 37 | 38 | 39 |
|---|---|---|---|---|---|
| 0.1688 - 1.0480i | -0.1249 + 0.9725i | -0.4371 - 0.7076i | -0.8451 + 0.7427i | 0.4798 - 1.2316i | -0.2735 + 0.9685i |
| -0.8662 + 0.4286i | 0.9676 - 0.8140i | -1.0505 - 0.8078i | -0.7398 - 0.0709i | 0.2479 - 0.6164i | 1.0056 - 0.4610i |
| -1.3982 - 0.0048i | 0.7094 - 0.0631i | 0.4606 + 0.7898i | -0.4398 - 1.0289i | -1.3698 + 0.1132i | -0.4928 + 0.7539i |
| -0.9163 + 0.1432i | -0.7056 + 0.0939i | -1.2049 + 0.0084i | -0.5722 - 0.7696i | -0.2411 - 0.6681i | 0.1390 - 0.9688i |
| -0.5771 - 0.4246i | -1.1349 + 0.0124i | 1.0185 + 0.6479i | -0.6838 + 1.1733i | 0.1902 - 1.3385i | -0.4589 - 0.1170i |
| 0.7733 - 0.7832i | 0.9511 + 0.3729i | 0.0286 + 0.9948i | -0.8052 + 0.4645i | 0.1281 - 0.7417i | 0.0891 + 1.1688i |
| -1.0556 + 0.1744i | 0.2858 + 0.8112i | 0.4286 + 0.9094i | 0.8713 - 0.0411i | 0.7417 + 0.7873i | -0.2215 + 1.1288i |
| 0.6239 - 0.2485i | 0.1703 + 1.0702i | -0.2642 + 0.5074i | 0.0820 + 1.0705i | 0.2210 - 0.9052i | 0.4944 - 0.7223i |
| 0.6345 - 0.7787i | -0.9057 + 0.1798i | -0.5423 - 0.2107i | 0.1272 - 1.0477i | -0.4503 + 0.9178i | 0.6751 - 1.0403i |
| -0.7393 + 0.9338i | -0.5574 - 0.8548i | -0.5570 - 1.1351i | -0.4034 + 0.7547i | 0.1209 - 0.6428i | 0.8662 + 0.4851i |
| 0.2003 - 0.7091i | -0.1003 + 1.0122i | -0.5533 + 0.4156i | 1.0297 + 0.3018i | 0.7080 + 0.8390i | 0.9924 - 0.6183i |
| 0.8667 - 0.2865i | 0.4147 - 1.0388i | 0.1982 + 1.0116i | -0.5369 + 0.3207i | 0.4884 + 0.2619i | 0.6242 - 0.1624i |

FIG.5D-3

| 40 | 41 | 42 | 43 | 44 |
|---|---|---|---|---|
| -0.8780 + 0.7855i | -0.5631 - 0.7271i | -0.8668 + 0.0454i | 0.4065 - 0.8967i | 0.0761 + 1.2488i |
| 0.5748 - 0.5552i | -0.8218 - 0.8460i | -1.0783 + 0.2817i | -0.9262 - 0.5018i | -0.5696 + 0.1071i |
| 0.4285 - 0.8424i | 0.4748 + 0.8042i | 0.8513 - 0.2400i | -0.0353 - 0.8180i | -0.9934 - 0.9272i |
| 0.0811 + 0.9531i | -0.7140 - 0.5010i | -1.0610 + 0.0918i | 0.9362 - 0.5821i | -0.5421 - 0.4961i |
| 0.8213 - 0.9307i | 0.7392 + 0.5168i | -0.8875 + 0.6602i | 0.6216 - 0.4032i | 0.9039 - 0.6053i |
| 0.5223 - 0.7496i | 1.0442 + 0.6731i | 0.3488 - 0.7660i | 0.3838 + 0.8198i | -0.6075 - 0.0986i |
| -0.9759 - 0.3529i | 0.6855 + 0.9579i | -0.7386 + 0.8854i | -1.0395 - 0.1804i | 0.1852 - 1.2492i |
| -0.7865 + 0.3499i | -0.0507 + 0.9564i | -0.8877 - 0.1475i | 1.0212 + 0.5102i | -0.5631 - 0.0020i |
| -1.2016 + 0.0228i | 0.4102 - 0.6703i | 0.8649 + 0.9082i | 0.6726 + 0.7114i | -1.0654 + 0.9098i |
| 0.0141 - 0.8391i | -0.7060 + 0.6123i | 0.9961 + 0.1055i | 0.6988 - 0.5218i | -0.5273 + 0.2342i |
| -0.2148 - 0.6511i | 1.0731 + 0.3263i | 0.8615 + 0.4060i | 0.2259 - 1.2972i | 0.9025 + 0.5925i |
| 0.9972 - 0.5990i | 0.6145 + 0.5847i | -0.5280 + 0.5049i | -0.4648 + 0.7627i | -0.5158 - 0.7148i |

FIG.5D-4

| | 45 | 46 | 47 | 48 | 49 | 50 |
|---|---|---|---|---|---|---|
| | -2.8600 - 1.9545i | -2.5134 + 2.3837i | -3.4103 + 0.6085i | -3.2913 + 1.0801i | -2.7892 + 2.0542i | 2.8691 + 1.9412i |
| | -1.4934 + 3.1257i | -0.4392 - 3.4361i | -2.6656 - 2.2122i | -3.0706 + 1.6033i | 3.1332 - 1.4774i | 1.0876 - 3.2889i |
| | 3.1483 - 1.4452i | -3.4632 + 0.0813i | 0.6635 + 3.4002i | -0.0122 + 3.4641i | 3.2640 - 1.1604i | 1.4119 + 3.1631i |
| | -0.0989 - 3.4628i | 1.0491 - 3.3016i | -0.7782 + 3.3756i | 0.4914 + 3.4290i | -0.2432 - 3.4556i | 3.0103 - 1.7138i |
| | 2.2852 - 2.6034i | -3.4598 + 0.1672i | 3.2598 + 1.1723i | -1.9650 - 2.8526i | 1.7835 + 2.9697i | 1.2700 - 3.2229i |
| | 3.3546 + 0.8643i | -2.9368 + 1.8369i | -3.1298 + 1.4850i | -2.7740 + 2.0751i | -3.2390 - 1.2280i | 2.5289 - 2.3676i |
| | -3.4338 - 0.4585i | 2.3414 + 2.5531i | 0.6213 + 3.4079i | -1.0429 - 3.3033i | -3.2916 - 1.0794i | -1.5925 + 3.0764i |
| | 1.5347 - 3.1057i | 3.4330 - 0.4625i | -3.1480 + 1.4458i | 3.4642 - 0.0137i | 3.2908 - 1.0821i | -2.7968 + 2.0439i |
| | -2.5149 + 2.3823i | 0.4664 - 3.4326i | -0.0262 + 3.4641i | 1.8750 + 2.9128i | -3.4283 + 0.4973i | 0.2772 - 3.4529i |
| | 1.8387 - 2.9358i | -0.8999 + 3.3452i | 0.4140 - 3.4392i | 2.9376 - 1.8358i | 3.3380 - 0.9264i | 1.4859 - 3.1290i |
| | 2.8364 - 1.9885i | -3.1352 - 1.4737i | -0.4415 - 3.4358i | -3.4188 - 0.5577i | 2.9910 - 1.7472i | -3.2217 - 1.2733i |
| | 3.1707 - 1.3947i | -1.0984 - 3.2853i | 0.8974 + 3.3458i | 3.3398 + 0.9191i | 2.9680 - 1.7863i | 3.0061 - 1.7218i |

| FIG.5E-1 | FIG.5E-2 |
|---|---|
| FIG.5E-3 | FIG.5E-4 |

| | 51 | 52 | 53 |
|---|---|---|---|
| | 0.8764 + 3.3516i | 3.1039 - 1.5381i | 3.3994 - 0.6663i |
| | 1.8719 - 2.9148i | 2.0568 - 2.7873i | -2.2927 - 2.5969i |
| | 1.0574 + 3.2988i | 0.1172 - 3.4621i | -1.2391 + 3.2349i |
| | 2.9525 - 1.8121i | -0.5169 + 3.4255i | 3.4614 + 0.1379i |
| | 0.5258 - 1.8121i | 3.3983 + 0.6717i | 3.0622 + 1.6195i |
| | 0.7071 - 3.3911i | -0.6320 + 3.4059i | 0.5552 + 3.4193i |
| | 0.7066 + 3.3912i | -2.9341 - 1.8413i | -3.3132 + 1.0115i |
| | 0.8440 + 3.3595i | 3.1784 - 1.3771i | 2.9616 - 1.7969i |
| | -1.9977 - 2.8299i | -1.5684 + 3.0888i | -1.3199 + 3.2027i |
| | -1.7999 - 2.9599i | 1.0451 + 3.3027i | 3.0524 - 1.6375i |
| | -3.4131 + 0.5922i | -3.3727 + 0.7902i | 3.1762 - 1.3823i |
| | -1.5510 - 3.0972i | -0.2660 + 3.4539i | 3.4593 - 0.1815i |

| | 45 | 46 | 47 | 48 | 49 | 50 |
|---|---|---|---|---|---|---|
| | 0.6473 - 1.0814i | -0.8880 - 0.4187i | -0.6453 + 1.0515i | -0.2889 + 0.5767i | 0.6481 - 0.7018i | 0.7780 - 0.8288i |
| | 0.0857 + 0.1171i | -0.6092 - 0.9029i | -0.8019 - 0.4878i | -0.7854 - 0.2450i | 0.7908 - 0.2411i | 0.3411 + 0.5991i |
| | -1.0744 - 0.3287i | 0.6539 + 1.1460i | -0.9361 - 0.0982i | -1.0652 + 0.2599i | -0.5971 + 0.3176i | -0.6068 + 0.5388i |
| | -1.2215 + 0.0675i | -0.8371 - 0.8085i | 0.9428 - 0.0400i | 0.2987 - 0.7221i | -0.8408 + 0.5604i | 1.2677 - 0.6515i |
| | -0.5336 - 0.7048i | 0.4704 + 1.0795i | 0.9912 - 0.1327i | 0.8390 - 0.9025i | -0.8662 + 0.7646i | 0.4309 - 0.3493i |
| | -0.0919 - 1.1941i | 0.4284 + 0.8797i | -0.7969 - 0.8622i | -0.9763 - 0.2490i | 0.3592 - 0.8951i | 0.3851 + 0.4635i |
| | -0.7371 + 0.0701i | -0.7393 + 0.4652i | 0.7564 + 0.3847i | -1.0203 - 0.4528i | -0.8932 + 0.9575i | -0.6090 + 0.8674i |
| | 1.1690 + 0.1037i | -1.2444 + 0.4167i | -0.7769 + 0.2657i | 0.3839 + 1.1502i | -0.4903 + 1.0238i | -0.5508 + 0.7376i |
| | -1.2522 - 0.4167i | 0.4119 + 0.5843i | -1.1342 + 0.0694i | -0.7764 + 0.1683i | -0.5284 - 0.9146i | 0.2343 + 1.2218i |
| | 0.2814 + 0.2186i | 0.6288 + 0.4681i | -1.1128 + 0.3521i | -0.1166 + 0.9783i | -0.3921 + 1.0243i | 0.0354 - 0.9653i |
| | -0.1969 + 1.2550i | 0.0051 - 0.3879i | -0.4265 + 0.7335i | 0.1447 - 0.7612i | -0.8036 + 0.0641i | 0.4109 + 1.0589i |
| | 0.0642 - 0.0608i | -0.7939 - 0.1378i | 0.5299 - 0.6275i | 0.0715 + 1.2793i | 0.8244 + 0.0945i | 0.7523 - 0.7510i |

FIG.5E-3

| 51 | 52 | 53 |
|---|---|---|
| 0.0650 - 0.5363i | 0.3008 + 0.5944i | 1.2469 + 0.3637i |
| -0.0859 + 1.0255i | 0.7686 + 0.0771i | -0.0857 - 0.8894i |
| -0.4652 + 1.2036i | 1.1383 - 0.4393i | -0.3905 - 1.0489i |
| 0.7308 - 0.9709i | 1.0587 + 0.5675i | 0.4577 - 0.6063i |
| 0.0473 + 0.6309i | 0.6000 + 0.6706i | 1.1998 + 0.0673i |
| 0.3966 + 0.8792i | -0.0850 - 0.9469i | 0.6914 - 0.2494i |
| -0.4391 + 1.2663i | -0.5101 - 0.9762i | -0.6193 + 0.8063i |
| -0.2644 + 0.8228i | 0.7766 + 0.6580i | 0.7828 + 0.3575i |
| 0.5716 + 0.3981i | -0.7263 - 0.4278i | -0.7967 - 0.7196i |
| -0.5552 - 0.7265i | 0.7952 + 0.5551i | 0.6286 + 0.8216i |
| 1.0119 + 0.4088i | -0.7178 - 1.1114i | -0.5971 + 0.7038i |
| -0.1370 - 1.0499i | -0.2951 - 0.7592i | 0.8815 - 0.2729i |

FIG.5E-4

| FIG.6A-1 | FIG.6A-2 |
|---|---|
| FIG.6A-3 | FIG.6A-4 |

SEQUENCES IN FREQUENCY DOMAIN

| SEQUENCE NUMBER: | | 4 | | 20 | | 21 |
|---|---|---|---|---|---|---|
| ELEMENT 1 | | -1.8421 + 2.9338i | | -3.3078 + 1.0284i | | -3.4573 - 0.2169i |
| 2 | | -3.3733 - 0.7876i | | -2.2071 + 2.6699i | | 2.4512 + 2.4478i |
| 3 | | 1.1298 - 3.2747i | | 1.1880 + 3.2541i | | -1.4140 - 3.1623i |
| 4 | | 3.4152 - 0.5791i | | 2.5330 + 2.3632i | | -1.6652 + 3.0378i |
| 5 | | 2.5571 - 2.3367i | | -0.7464 + 3.3828i | | -3.1392 + 1.4652i |
| 6 | | -1.2969 - 3.2122i | | -2.1923 - 2.6821i | | -2.8803 + 1.9245i |
| 7 | | -1.6093 + 3.0676i | | -3.3988 + 0.6698i | | -2.4175 - 2.4813i |
| 8 | | 3.0602 - 1.6237i | | 1.4397 - 3.1507i | | 2.9314 - 1.8457i |
| 9 | | -2.9260 - 1.8544i | | -1.1808 - 3.2568i | | 3.3403 + 0.9183i |
| 10 | | 1.6066 - 3.0691i | | -0.7612 + 3.3794i | | -1.7396 - 2.9956i |
| 11 | | -3.4631 - 0.0830i | | -1.8302 - 2.9411i | | 0.7685 - 3.3780i |
| 12 | | -2.8406 - 1.9825i | | 3.4475 + 0.3387i | | -3.1319 - 1.4798i |

FIG.6A-2

| | 24 | 26 | 31 | 32 | 33 | 36 |
|---|---|---|---|---|---|---|
| | 3.4631 - 0.0808i | 3.3094 - 1.0242i | -3.0717 + 1.6014i | -3.4516 - 0.2941i | -1.1742 + 3.2590i | -2.4748 + 2.4237i |
| | -1.1907 - 3.2532i | 2.1439 - 2.7208i | -0.6411 - 3.4042i | -3.3564 - 0.8569i | 2.1348 - 2.7279i | -0.1391 - 3.4613i |
| | -2.9304 + 1.8471i | -3.2786 + 1.1181i | 0.1685 + 3.4601i | 2.0761 + 2.7731i | -2.7479 - 2.1093i | -1.3996 + 3.1688i |
| | 2.6679 - 2.2096i | -2.9433 + 1.8277i | -3.1383 + 1.4666i | 1.7459 + 2.9918i | -3.4628 + 0.0990i | -2.7723 - 2.0772i |
| | -2.2160 + 2.6626i | -2.5740 - 2.3183i | -0.7755 + 3.3762i | -2.7686 + 2.0821i | -0.6318 - 3.4060i | -2.9964 - 1.7379i |
| | -3.4383 + 0.4215i | 1.7109 + 3.0122i | -1.5769 - 3.0845i | -0.1615 + 3.4603i | 1.3122 + 3.2058i | -1.2062 + 3.2472i |
| | -1.7881 + 2.9668i | -2.0986 - 2.7560i | -3.2151 - 1.2896i | -1.6220 - 3.0607i | -3.3054 + 1.0366i | 3.2248 + 1.2651i |
| | -3.3492 - 0.8844i | -0.2140 - 3.4574i | -1.7938 + 2.9636i | -1.1837 + 3.2556i | -1.9548 + 2.8598i | -0.0259 - 3.4641i |
| | -3.4635 + 0.0696i | -1.2973 + 3.2120i | 2.0610 - 2.7846i | -0.5307 - 3.4233i | -1.2831 - 3.2178i | 0.1600 - 3.4605i |
| | -3.0777 - 1.5900i | 0.3113 - 3.4501i | 1.5223 - 3.1116i | -3.0491 + 1.6446i | 3.4488 - 0.3258i | 2.1787 - 2.6932i |
| | 3.3607 + 0.8399i | -2.6397 - 2.2432i | 3.3256 - 0.9693i | -3.4640 + 0.0203i | 0.0788 - 3.4633i | 3.4350 - 0.4484i |
| | 0.4962 + 3.4285i | 0.5104 - 3.4262i | -3.4034 - 0.6457i | 2.8644 - 1.9484i | -0.9778 - 3.3233i | -3.2294 - 1.2534i |

SEQUENCES IN TIME DOMAIN

| SEQUENCE NUMBER: | 4 | 20 | 21 |
|---|---|---|---|
| ELEMENT 1 | -0.4652 - 1.0668i | -0.5847 + 0.4213i | -0.8628 - 0.4805i |
| 2 | -0.6029 + 0.8468i | -0.7533 + 0.8125i | -1.0533 - 0.7474i |
| 3 | -0.7843 + 1.0135i | -0.6815 - 0.4325i | -0.2010 + 1.1209i |
| 4 | 0.3846 - 0.6388i | -0.4175 - 1.0341i | -0.1548 + 0.9071i |
| 5 | 0.0325 + 1.1678i | -0.4910 + 0.3870i | -0.7638 + 0.4205i |
| 6 | 0.0182 - 0.9057i | 0.8116 - 0.9620i | -0.8376 + 0.3745i |
| 7 | -0.5604 + 0.8089i | -0.9613 - 0.0651i | -0.1904 - 0.6620i |
| 8 | 0.9307 + 0.6547i | -0.9770 - 0.2388i | 0.6994 - 0.8691i |
| 9 | 0.8253 + 0.4873i | -0.1580 + 1.0519i | -0.6933 - 0.6040i |
| 10 | -0.0960 + 0.4776i | 0.2185 + 1.0627i | 0.1226 + 0.9576i |
| 11 | -0.7736 + 0.5900i | -0.4768 - 0.5135i | -0.2261 - 1.1440i |
| 12 | -0.7510 - 0.5015i | 1.1632 + 0.5390i | 0.7038 + 0.5095i |

FIG.6A-3

| 24 | 26 | 31 | 32 | 33 | 36 |
|---|---|---|---|---|---|
| -0.9555 + 0.3515i | -0.5883 - 1.0189i | -0.8782 - 0.2018i | -1.0751 + 0.5537i | -0.7136 - 0.6761i | -0.4371 - 0.7076i |
| 1.1477 - 0.1690i | -0.1333 - 0.6125i | -0.7235 - 0.6603i | -0.7735 + 0.1370i | 0.1173 - 1.1126i | -1.0505 - 0.8078i |
| 0.7716 - 0.3400i | 0.6754 - 0.4198i | -1.0098 + 0.0214i | -0.0608 - 0.5249i | -0.2890 + 0.6235i | 0.4606 + 0.7898i |
| 0.3248 - 0.8770i | 0.4631 + 0.8803i | 0.9433 + 0.7193i | -0.3075 - 0.9468i | 0.1974 + 1.2052i | -1.2049 + 0.0084i |
| 1.0979 + 0.1388i | 1.1742 - 0.2330i | -0.9111 + 0.1411i | -0.5222 - 1.2007i | -0.1116 + 1.0865i | 1.0185 + 0.6479i |
| 0.7879 + 0.4669i | -0.6134 + 0.4870i | 0.9023 + 0.7719i | 0.2953 + 1.0346i | 0.0258 + 0.9503i | 0.0286 + 0.9948i |
| 0.3598 + 1.0327i | -0.8415 + 0.3503i | 0.6270 + 0.7675i | -0.5517 - 0.8708i | -0.7970 - 0.6407i | 0.4286 + 0.9094i |
| -0.2830 - 1.0707i | 1.1771 + 0.4564i | -0.5971 + 0.4353i | -0.5641 + 1.1453i | 0.0068 + 1.2566i | -0.2642 + 0.5074i |
| 0.1739 - 0.7187i | -0.9412 - 0.0989i | -0.1864 - 0.2726i | 0.0031 + 0.9674i | -0.2982 + 0.6068i | -0.5423 - 0.2107i |
| -0.4679 + 0.3766i | 0.7794 - 0.2552i | -1.2875 - 0.5540i | -0.3160 + 0.7188i | 0.2835 - 1.0100i | -0.5570 - 1.1351i |
| -0.6102 + 0.9787i | 1.1268 - 0.4698i | -0.7849 - 0.2997i | -0.3301 - 0.6021i | -0.0304 + 1.1478i | -0.5533 + 0.4156i |
| 1.1161 - 0.2506i | 1.0311 - 0.0901i | 0.8342 + 0.7333i | 0.7510 - 0.7056i | 0.4348 - 0.1783i | 0.1982 + 1.0116i |

| 39 | 46 | 51 |
|---|---|---|
| 3.4393 + 0.4150i | -2.5134 + 2.3837i | 0.8764 + 3.3516i |
| 2.3261 + 2.5670i | -0.4392 - 3.4361i | 1.8719 - 2.9148i |
| -2.2590 + 2.6262i | -3.4632 + 0.0813i | 1.0574 + 3.2988i |
| 2.7110 - 2.1565i | 1.0491 - 3.3016i | 2.9525 - 1.8121i |
| -3.2394 + 1.2274i | -3.4598 + 0.1672i | 0.5258 - 3.4239i |
| -3.4620 - 0.1164i | -2.9368 + 1.8369i | 0.7071 - 3.3911i |
| -2.9977 + 1.7362i | 2.3414 + 2.5531i | 0.7066 + 3.3912i |
| 1.8292 + 2.9419i | 3.4330 - 0.4625i | 0.8440 + 3.3595i |
| 1.3307 + 3.1984i | 0.4664 - 3.4326i | -1.9977 - 2.8299i |
| -3.3818 - 0.7499i | -0.8999 + 3.3452i | -1.7999 - 2.9599i |
| 0.7561 + 3.3806i | -3.1352 - 1.4737i | -3.4131 + 0.5922i |
| -0.3345 - 3.4479i | -1.0984 - 3.2853i | -1.5510 - 3.0972i |

FIG.6B

| FIG.6B-1 |
|---|
| FIG.6B-2 |

| 39 | 46 | 51 |
|---|---|---|
| -0.2735 + 0.9685i | -0.8880 - 0.4187i | 0.0650 - 0.5363i |
| 1.0056 - 0.4610i | -0.6092 - 0.9029i | -0.0859 + 1.0255i |
| -0.4928 + 0.7539i | 0.6539 + 1.1460i | -0.4652 + 1.2036i |
| 0.1390 - 0.9688i | -0.8371 - 0.8085i | 0.7308 - 0.9709i |
| -0.4589 - 0.1170i | 0.4704 + 1.0795i | 0.0473 + 0.6309i |
| 0.0891 + 1.1688i | 0.4284 + 0.8797i | 0.3966 + 0.8792i |
| -0.2215 + 1.1288i | -0.7393 + 0.4652i | -0.4391 + 1.2663i |
| 0.4944 - 0.7223i | -1.2444 + 0.4167i | -0.2644 + 0.8228i |
| 0.6751 - 1.0403i | 0.4119 + 0.5843i | 0.5716 + 0.3981i |
| 0.8662 + 0.4851i | 0.6288 + 0.4681i | -0.5552 - 0.7265i |
| 0.9924 - 0.6183i | 0.0051 - 0.3879i | 1.0119 + 0.4088i |
| 0.6242 - 0.1624i | -0.7939 - 0.1378i | -0.1370 - 1.0499i |

| FIG.8A | FIG.8B |
|--------|--------|
| FIG.8C | FIG.8D |
| FIG.8E | FIG.8F |

FIG.8A

| SEQUENCE NUMBER: ELEMENT | 1 | 2 | 3 | 4 | 5 |
|---|---|---|---|---|---|
| 1 | 0.7071 - 0.7071i | -0.7071 - 0.7071i | 0.7071 - 0.7071i | -0.7071 + 0.7071i | 0.7071 + 0.7071i |
| 2 | 0.7071 - 0.7071i | 0.7071 - 0.7071i | -0.7071 + 0.7071i | -0.7071 - 0.7071i | -0.7071 - 0.7071i |
| 3 | -0.7071 + 0.7071i | -0.7071 - 0.7071i | 0.7071 - 0.7071i | -0.7071 - 0.7071i | 0.7071 - 0.7071i |
| 4 | -0.7071 - 0.7071i | 0.7071 - 0.7071i | 0.7071 + 0.7071i | -0.7071 + 0.7071i | 0.7071 + 0.7071i |
| 5 | -0.7071 - 0.7071i | 0.7071 - 0.7071i | -0.7071 - 0.7071i | 0.7071 - 0.7071i | -0.7071 - 0.7071i |
| 6 | 0.7071 - 0.7071i | 0.7071 + 0.7071i | -0.7071 - 0.7071i | 0.7071 + 0.7071i | 0.7071 + 0.7071i |
| 7 | 0.7071 - 0.7071i | -0.7071 - 0.7071i | -0.7071 - 0.7071i | -0.7071 - 0.7071i | -0.7071 - 0.7071i |
| 8 | -0.7071 - 0.7071i | 0.7071 - 0.7071i | -0.7071 - 0.7071i | 0.7071 - 0.7071i | 0.7071 + 0.7071i |
| 9 | -0.7071 - 0.7071i | 0.7071 - 0.7071i | 0.7071 - 0.7071i | -0.7071 - 0.7071i | 0.7071 + 0.7071i |
| 10 | 0.7071 + 0.7071i | -0.7071 - 0.7071i | 0.7071 - 0.7071i | -0.7071 - 0.7071i | 0.7071 + 0.7071i |
| 11 | -0.7071 - 0.7071i | -0.7071 - 0.7071i | -0.7071 - 0.7071i | -0.7071 - 0.7071i | 0.7071 + 0.7071i |
| 12 | 0.7071 + 0.7071i | 0.7071 + 0.7071i | -0.7071 - 0.7071i | -0.7071 - 0.7071i | -0.7071 + 0.7071i |

FIG.8B

| 6 | 7 | 8 | 9 | 10 |
|---|---|---|---|---|
| -0.7071 + 0.7071i | -0.7071 - 0.7071i | -0.7071 + 0.7071i | 0.7071 - 0.7071i | -0.7071 - 0.7071i |
| 0.7071 - 0.7071i | -0.7071 + 0.7071i | 0.7071 - 0.7071i | 0.7071 + 0.7071i | -0.7071 + 0.7071i |
| -0.7071 - 0.7071i | 0.7071 + 0.7071i | 0.7071 + 0.7071i | -0.7071 - 0.7071i | -0.7071 - 0.7071i |
| -0.7071 - 0.7071i | -0.7071 + 0.7071i | 0.7071 - 0.7071i | -0.7071 + 0.7071i | 0.7071 + 0.7071i |
| 0.7071 - 0.7071i | -0.7071 - 0.7071i | -0.7071 - 0.7071i | -0.7071 - 0.7071i | -0.7071 + 0.7071i |
| -0.7071 + 0.7071i | -0.7071 - 0.7071i | -0.7071 + 0.7071i | -0.7071 + 0.7071i | -0.7071 + 0.7071i |
| 0.7071 + 0.7071i | 0.7071 + 0.7071i | -0.7071 - 0.7071i | -0.7071 - 0.7071i | -0.7071 + 0.7071i |
| -0.7071 - 0.7071i | 0.7071 + 0.7071i | -0.7071 - 0.7071i | -0.7071 + 0.7071i | -0.7071 - 0.7071i |
| -0.7071 + 0.7071i | -0.7071 - 0.7071i | -0.7071 - 0.7071i | 0.7071 + 0.7071i | 0.7071 - 0.7071i |
| 0.7071 + 0.7071i | 0.7071 - 0.7071i | 0.7071 + 0.7071i | 0.7071 + 0.7071i | -0.7071 - 0.7071i |
| -0.7071 + 0.7071i | -0.7071 - 0.7071i | -0.7071 - 0.7071i | -0.7071 - 0.7071i | -0.7071 + 0.7071i |
| -0.7071 - 0.7071i | 0.7071 + 0.7071i | 0.7071 + 0.7071i | 0.7071 - 0.7071i | -0.7071 - 0.7071i |
| 0.7071 - 0.7071i | 0.7071 - 0.7071i | 0.7071 + 0.7071i | 0.7071 - 0.7071i | -0.7071 - 0.7071i |
| 0.7071 - 0.7071i | 0.7071 + 0.7071i | -0.7071 - 0.7071i | -0.7071 - 0.7071i | 0.7071 - 0.7071i |
| -0.7071 + 0.7071i | 0.7071 - 0.7071i | 0.7071 + 0.7071i | -0.7071 - 0.7071i | -0.7071 - 0.7071i |
| 0.7071 + 0.7071i | -0.7071 - 0.7071i | -0.7071 + 0.7071i | 0.7071 + 0.7071i | 0.7071 + 0.7071i |

FIG.8C

| SEQUENCE NUMBER: | 11 | 12 | 13 | 14 | 15 |
|---|---|---|---|---|---|
| ELEMENT 1 | -0.7071 + 0.7071i | -0.7071 + 0.7071i | 0.7071 + 0.7071i | 0.7071 + 0.7071i | -0.7071 + 0.7071i |
| 2 | -0.7071 + 0.7071i | 0.7071 + 0.7071i | 0.7071 + 0.7071i | 0.7071 + 0.7071i | 0.7071 - 0.7071i |
| 3 | 0.7071 - 0.7071i | -0.7071 - 0.7071i | -0.7071 - 0.7071i | -0.7071 - 0.7071i | -0.7071 + 0.7071i |
| 4 | 0.7071 - 0.7071i | 0.7071 - 0.7071i | 0.7071 - 0.7071i | -0.7071 - 0.7071i | -0.7071 - 0.7071i |
| 5 | 0.7071 + 0.7071i | -0.7071 + 0.7071i | -0.7071 - 0.7071i | -0.7071 - 0.7071i | -0.7071 - 0.7071i |
| 6 | 0.7071 + 0.7071i | -0.7071 - 0.7071i | -0.7071 - 0.7071i | -0.7071 - 0.7071i | 0.7071 + 0.7071i |
| 7 | 0.7071 - 0.7071i | -0.7071 - 0.7071i | -0.7071 - 0.7071i | -0.7071 - 0.7071i | -0.7071 + 0.7071i |
| 8 | 0.7071 - 0.7071i | 0.7071 - 0.7071i | 0.7071 + 0.7071i | -0.7071 - 0.7071i | -0.7071 + 0.7071i |
| 9 | 0.7071 + 0.7071i | -0.7071 + 0.7071i | -0.7071 - 0.7071i | -0.7071 + 0.7071i | 0.7071 + 0.7071i |
| 10 | -0.7071 - 0.7071i | -0.7071 - 0.7071i | 0.7071 - 0.7071i | 0.7071 + 0.7071i | -0.7071 - 0.7071i |
| 11 | 0.7071 + 0.7071i | -0.7071 + 0.7071i | 0.7071 - 0.7071i | -0.7071 + 0.7071i | -0.7071 + 0.7071i |
| 12 | 0.7071 - 0.7071i | -0.7071 - 0.7071i | -0.7071 - 0.7071i | -0.7071 + 0.7071i | -0.7071 - 0.7071i |

| 16 | 17 | 18 | 19 | 20 |
|---|---|---|---|---|
| -0.7071 - 0.7071i | 0.7071 + 0.7071i | -0.7071 - 0.7071i | -0.7071 - 0.7071i | -0.7071 + 0.7071i |
| 0.7071 - 0.7071i | -0.7071 + 0.7071i | -0.7071 + 0.7071i | -0.7071 - 0.7071i | 0.7071 + 0.7071i |
| -0.7071 - 0.7071i | 0.7071 - 0.7071i | 0.7071 + 0.7071i | 0.7071 - 0.7071i | -0.7071 + 0.7071i |
| 0.7071 + 0.7071i | -0.7071 - 0.7071i | 0.7071 + 0.7071i | 0.7071 - 0.7071i | 0.7071 + 0.7071i |
| 0.7071 + 0.7071i | 0.7071 - 0.7071i | -0.7071 - 0.7071i | 0.7071 + 0.7071i | -0.7071 - 0.7071i |
| -0.7071 + 0.7071i | -0.7071 + 0.7071i | 0.7071 - 0.7071i | 0.7071 + 0.7071i | -0.7071 - 0.7071i |
| -0.7071 - 0.7071i | -0.7071 - 0.7071i | -0.7071 + 0.7071i | -0.7071 - 0.7071i | 0.7071 - 0.7071i |
| 0.7071 - 0.7071i | 0.7071 + 0.7071i | -0.7071 + 0.7071i | -0.7071 - 0.7071i | -0.7071 + 0.7071i |
| 0.7071 + 0.7071i | -0.7071 - 0.7071i | -0.7071 - 0.7071i | 0.7071 - 0.7071i | -0.7071 + 0.7071i |
| -0.7071 + 0.7071i | 0.7071 + 0.7071i | -0.7071 - 0.7071i | 0.7071 - 0.7071i | 0.7071 + 0.7071i |
| 0.7071 - 0.7071i | 0.7071 - 0.7071i | 0.7071 + 0.7071i | -0.7071 - 0.7071i | 0.7071 - 0.7071i |
| -0.7071 - 0.7071i | 0.7071 - 0.7071i | 0.7071 + 0.7071i | -0.7071 - 0.7071i | -0.7071 - 0.7071i |
| -0.7071 + 0.7071i | -0.7071 + 0.7071i | -0.7071 - 0.7071i | 0.7071 + 0.7071i | -0.7071 - 0.7071i |
| 0.7071 + 0.7071i | 0.7071 - 0.7071i | -0.7071 - 0.7071i | 0.7071 + 0.7071i | 0.7071 - 0.7071i |

FIG. 8D

| SEQUENCE NUMBER: ELEMENT | 21 | 22 | 23 | 24 | 25 |
|---|---|---|---|---|---|
| 1 | -0.7071 - 0.7071i | -0.7071 + 0.7071i | -0.7071 + 0.7071i | 0.7071 - 0.7071i | -0.7071 - 0.7071i |
| 2 | 0.7071 + 0.7071i | -0.7071 + 0.7071i | 0.7071 + 0.7071i | 0.7071 + 0.7071i | -0.7071 - 0.7071i |
| 3 | 0.7071 + 0.7071i | 0.7071 - 0.7071i | 0.7071 - 0.7071i | 0.7071 - 0.7071i | -0.7071 + 0.7071i |
| 4 | -0.7071 + 0.7071i | -0.7071 - 0.7071i | -0.7071 + 0.7071i | -0.7071 - 0.7071i | -0.7071 - 0.7071i |
| 5 | -0.7071 - 0.7071i | -0.7071 + 0.7071i | 0.7071 - 0.7071i | 0.7071 + 0.7071i | 0.7071 + 0.7071i |
| 6 | -0.7071 + 0.7071i | 0.7071 - 0.7071i | -0.7071 - 0.7071i | -0.7071 - 0.7071i | -0.7071 - 0.7071i |
| 7 | -0.7071 - 0.7071i | 0.7071 + 0.7071i | -0.7071 - 0.7071i | -0.7071 - 0.7071i | 0.7071 + 0.7071i |
| 8 | -0.7071 + 0.7071i | -0.7071 + 0.7071i | -0.7071 - 0.7071i | -0.7071 - 0.7071i | 0.7071 + 0.7071i |
| 9 | -0.7071 + 0.7071i | -0.7071 - 0.7071i | 0.7071 + 0.7071i | 0.7071 + 0.7071i | -0.7071 + 0.7071i |
| 10 | 0.7071 + 0.7071i | -0.7071 - 0.7071i | -0.7071 - 0.7071i | 0.7071 + 0.7071i | -0.7071 - 0.7071i |
| 11 | -0.7071 - 0.7071i | 0.7071 - 0.7071i | 0.7071 + 0.7071i | -0.7071 - 0.7071i | -0.7071 + 0.7071i |
| 12 | 0.7071 - 0.7071i | 0.7071 + 0.7071i | -0.7071 - 0.7071i | -0.7071 + 0.7071i | 0.7071 + 0.7071i |

FIG.8E

| 26 | 27 | 28 | 29 | 30 |
|---|---|---|---|---|
| 0.7071 - 0.7071i | 0.7071 - 0.7071i | -0.7071 - 0.7071i | -0.7071 - 0.7071i | 0.7071 + 0.7071i |
| -0.7071 - 0.7071i | -0.7071 - 0.7071i | -0.7071 - 0.7071i | -0.7071 + 0.7071i | -0.7071 + 0.7071i |
| -0.7071 - 0.7071i | 0.7071 - 0.7071i | 0.7071 + 0.7071i | 0.7071 + 0.7071i | -0.7071 + 0.7071i |
| -0.7071 - 0.7071i | -0.7071 + 0.7071i | -0.7071 - 0.7071i | -0.7071 + 0.7071i | -0.7071 + 0.7071i |
| 0.7071 + 0.7071i | -0.7071 - 0.7071i | 0.7071 + 0.7071i | 0.7071 - 0.7071i | 0.7071 - 0.7071i |
| -0.7071 - 0.7071i | 0.7071 - 0.7071i | -0.7071 - 0.7071i | -0.7071 + 0.7071i | 0.7071 - 0.7071i |
| -0.7071 - 0.7071i | -0.7071 - 0.7071i | -0.7071 - 0.7071i | 0.7071 + 0.7071i | -0.7071 - 0.7071i |
| -0.7071 - 0.7071i | -0.7071 - 0.7071i | -0.7071 - 0.7071i | 0.7071 + 0.7071i | -0.7071 - 0.7071i |
| -0.7071 - 0.7071i | -0.7071 - 0.7071i | -0.7071 - 0.7071i | 0.7071 + 0.7071i | -0.7071 - 0.7071i |
| 0.7071 - 0.7071i | -0.7071 - 0.7071i | -0.7071 - 0.7071i | -0.7071 + 0.7071i | 0.7071 + 0.7071i |
| 0.7071 + 0.7071i | 0.7071 + 0.7071i | 0.7071 + 0.7071i | -0.7071 + 0.7071i | -0.7071 - 0.7071i |
| -0.7071 - 0.7071i | -0.7071 - 0.7071i | -0.7071 - 0.7071i | -0.7071 + 0.7071i | -0.7071 - 0.7071i |
| 0.7071 - 0.7071i | 0.7071 - 0.7071i | 0.7071 + 0.7071i | 0.7071 - 0.7071i | -0.7071 - 0.7071i |
| -0.7071 + 0.7071i | 0.7071 - 0.7071i | 0.7071 + 0.7071i | 0.7071 - 0.7071i | -0.7071 - 0.7071i |
| -0.7071 + 0.7071i | 0.7071 - 0.7071i | 0.7071 + 0.7071i | -0.7071 - 0.7071i | 0.7071 - 0.7071i |

FIG.8F

SEQUENCES ARE PRESENTED IN FREQUENCY

| SEQUENCE NUMBER ELEMENT | 1 | 2 | 3 | 4 |
|---|---|---|---|---|
| 1 | -0.7071-0.7071i | -0.7071+0.7071i | -0.7071+0.7071i | -0.7071+0.7071i |
| 2 | -0.7071-0.7071i | 0.7071-0.7071i | 0.7071-0.7071i | -0.7071-0.7071i |
| 3 | -0.7071+0.7071i | -0.7071+0.7071i | 0.7071+0.7071i | 0.7071-0.7071i |
| 4 | 0.7071+0.7071i | -0.7071+0.7071i | -0.7071-0.7071i | 0.7071+0.7071i |
| 5 | -0.7071+0.7071i | -0.7071-0.7071i | -0.7071+0.7071i | -0.7071+0.7071i |
| 6 | 0.7071+0.7071i | 0.7071-0.7071i | -0.7071-0.7071i | -0.7071-0.7071i |
| 7 | 0.7071-0.7071i | -0.7071+0.7071i | -0.7071-0.7071i | -0.7071+0.7071i |
| 8 | -0.7071+0.7071i | -0.7071-0.7071i | 0.7071+0.7071i | -0.7071-0.7071i |
| 9 | 0.7071+0.7071i | 0.7071+0.7071i | 0.7071-0.7071i | -0.7071+0.7071i |
| 10 | 0.7071+0.7071i | -0.7071-0.7071i | -0.7071-0.7071i | 0.7071-0.7071i |
| 11 | 0.7071+0.7071i | 0.7071-0.7071i | 0.7071+0.7071i | -0.7071-0.7071i |
| 12 | 0.7071+0.7071i | -0.7071+0.7071i | -0.7071-0.7071i | -0.7071-0.7071i |
| 13 | -0.7071+0.7071i | 0.7071+0.7071i | 0.7071-0.7071i | -0.7071+0.7071i |
| 14 | 0.7071-0.7071i | 0.7071-0.7071i | -0.7071+0.7071i | -0.7071-0.7071i |
| 15 | 0.7071+0.7071i | -0.7071-0.7071i | 0.7071+0.7071i | -0.7071+0.7071i |
| 16 | 0.7071-0.7071i | 0.7071+0.7071i | -0.7071-0.7071i | -0.7071-0.7071i |
| 17 | 0.7071+0.7071i | 0.7071+0.7071i | 0.7071+0.7071i | 0.7071-0.7071i |
| 18 | 0.7071+0.7071i | 0.7071+0.7071i | -0.7071+0.7071i | 0.7071+0.7071i |
| 19 | 0.7071-0.7071i | -0.7071-0.7071i | -0.7071-0.7071i | -0.7071-0.7071i |
| 20 | 0.7071+0.7071i | 0.7071-0.7071i | -0.7071+0.7071i | 0.7071+0.7071i |
| 21 | 0.7071+0.7071i | 0.7071+0.7071i | -0.7071-0.7071i | -0.7071-0.7071i |
| 22 | 0.7071-0.7071i | -0.7071-0.7071i | 0.7071+0.7071i | 0.7071-0.7071i |
| 23 | 0.7071+0.7071i | 0.7071+0.7071i | -0.7071+0.7071i | -0.7071-0.7071i |
| 24 | -0.7071+0.7071i | -0.7071+0.7071i | -0.7071-0.7071i | 0.7071+0.7071i |

| FIG.9A-1 | FIG.9A-2 |
|---|---|

| SEQUENCE NUMBER | 11 | 12 | 13 | 14 |
|---|---|---|---|---|
| ELEMENT 1 | 0.7071−0.7071i | −0.7071+0.7071i | −0.7071−0.7071i | 0.7071−0.7071i |
| 2 | −0.7071−0.7071i | 0.7071+0.7071i | −0.7071−0.7071i | −0.7071+0.7071i |
| 3 | 0.7071+0.7071i | 0.7071−0.7071i | 0.7071−0.7071i | −0.7071−0.7071i |
| 4 | 0.7071+0.7071i | −0.7071+0.7071i | −0.7071−0.7071i | −0.7071+0.7071i |
| 5 | −0.7071+0.7071i | 0.7071−0.7071i | −0.7071−0.7071i | 0.7071+0.7071i |
| 6 | 0.7071+0.7071i | 0.7071+0.7071i | 0.7071+0.7071i | −0.7071−0.7071i |
| 7 | −0.7071+0.7071i | −0.7071−0.7071i | −0.7071−0.7071i | −0.7071−0.7071i |
| 8 | −0.7071+0.7071i | −0.7071−0.7071i | 0.7071+0.7071i | −0.7071+0.7071i |
| 9 | 0.7071+0.7071i | −0.7071+0.7071i | 0.7071+0.7071i | −0.7071+0.7071i |
| 10 | −0.7071+0.7071i | −0.7071+0.7071i | 0.7071+0.7071i | −0.7071+0.7071i |
| 11 | 0.7071+0.7071i | −0.7071−0.7071i | 0.7071+0.7071i | −0.7071−0.7071i |
| 12 | −0.7071−0.7071i | −0.7071−0.7071i | −0.7071+0.7071i | −0.7071−0.7071i |
| 13 | −0.7071−0.7071i | 0.7071+0.7071i | −0.7071−0.7071i | −0.7071+0.7071i |
| 14 | 0.7071−0.7071i | −0.7071−0.7071i | −0.7071−0.7071i | −0.7071+0.7071i |
| 15 | −0.7071+0.7071i | 0.7071−0.7071i | 0.7071−0.7071i | −0.7071−0.7071i |
| 16 | 0.7071+0.7071i | −0.7071+0.7071i | −0.7071−0.7071i | −0.7071+0.7071i |
| 17 | 0.7071+0.7071i | 0.7071+0.7071i | 0.7071+0.7071i | −0.7071+0.7071i |
| 18 | 0.7071+0.7071i | 0.7071+0.7071i | −0.7071−0.7071i | −0.7071+0.7071i |
| 19 | −0.7071−0.7071i | 0.7071+0.7071i | 0.7071+0.7071i | −0.7071+0.7071i |
| 20 | 0.7071−0.7071i | −0.7071−0.7071i | 0.7071−0.7071i | −0.7071+0.7071i |
| 21 | 0.7071−0.7071i | −0.7071−0.7071i | −0.7071−0.7071i | −0.7071+0.7071i |
| 22 | −0.7071+0.7071i | −0.7071−0.7071i | 0.7071+0.7071i | −0.7071+0.7071i |
| 23 | −0.7071+0.7071i | −0.7071−0.7071i | 0.7071+0.7071i | −0.7071+0.7071i |
| 24 | −0.7071+0.7071i | −0.7071−0.7071i | 0.7071+0.7071i | 0.7071−0.7071i |

| 15 | 16 | 17 | 18 | 19 | 20 |
|---|---|---|---|---|---|
| 0.7071−0.7071i | 0.7071−0.7071i | −0.7071+0.7071i | −0.7071+0.7071i | −0.7071−0.7071i | 0.7071+0.7071i |
| −0.7071−0.7071i | 0.7071−0.7071i | −0.7071−0.7071i | 0.7071+0.7071i | 0.7071+0.7071i | 0.7071−0.7071i |
| −0.7071−0.7071i | 0.7071+0.7071i | 0.7071−0.7071i | −0.7071−0.7071i | 0.7071+0.7071i | −0.7071−0.7071i |
| 0.7071−0.7071i | 0.7071+0.7071i | 0.7071−0.7071i | −0.7071+0.7071i | −0.7071+0.7071i | −0.7071+0.7071i |
| 0.7071−0.7071i | 0.7071−0.7071i | 0.7071+0.7071i | −0.7071+0.7071i | −0.7071−0.7071i | 0.7071−0.7071i |
| −0.7071−0.7071i | 0.7071−0.7071i | −0.7071+0.7071i | 0.7071+0.7071i | 0.7071+0.7071i | 0.7071+0.7071i |
| −0.7071+0.7071i | 0.7071+0.7071i | −0.7071−0.7071i | 0.7071−0.7071i | 0.7071+0.7071i | −0.7071+0.7071i |
| 0.7071+0.7071i | −0.7071+0.7071i | −0.7071−0.7071i | 0.7071+0.7071i | −0.7071+0.7071i | −0.7071−0.7071i |
| −0.7071−0.7071i | 0.7071−0.7071i | −0.7071−0.7071i | 0.7071+0.7071i | −0.7071−0.7071i | 0.7071+0.7071i |
| −0.7071−0.7071i | 0.7071−0.7071i | 0.7071+0.7071i | −0.7071−0.7071i | −0.7071+0.7071i | 0.7071−0.7071i |
| 0.7071−0.7071i | 0.7071−0.7071i | 0.7071−0.7071i | 0.7071−0.7071i | 0.7071−0.7071i | −0.7071−0.7071i |
| 0.7071−0.7071i | 0.7071−0.7071i | −0.7071+0.7071i | 0.7071−0.7071i | −0.7071−0.7071i | −0.7071+0.7071i |
| −0.7071−0.7071i | 0.7071−0.7071i | 0.7071+0.7071i | −0.7071+0.7071i | 0.7071−0.7071i | 0.7071+0.7071i |
| −0.7071−0.7071i | 0.7071−0.7071i | −0.7071−0.7071i | −0.7071+0.7071i | 0.7071+0.7071i | 0.7071−0.7071i |
| −0.7071−0.7071i | −0.7071−0.7071i | −0.7071−0.7071i | −0.7071−0.7071i | −0.7071+0.7071i | −0.7071−0.7071i |
| −0.7071−0.7071i | −0.7071−0.7071i | −0.7071+0.7071i | −0.7071+0.7071i | 0.7071+0.7071i | −0.7071+0.7071i |
| −0.7071−0.7071i | −0.7071−0.7071i | 0.7071−0.7071i | −0.7071−0.7071i | −0.7071+0.7071i | 0.7071+0.7071i |
| −0.7071−0.7071i | −0.7071−0.7071i | 0.7071+0.7071i | 0.7071+0.7071i | 0.7071+0.7071i | 0.7071−0.7071i |
| −0.7071−0.7071i | −0.7071−0.7071i | −0.7071−0.7071i | 0.7071−0.7071i | 0.7071+0.7071i | −0.7071−0.7071i |
| −0.7071−0.7071i | −0.7071−0.7071i | −0.7071−0.7071i | 0.7071−0.7071i | 0.7071+0.7071i | −0.7071−0.7071i |
| 0.7071+0.7071i | 0.7071+0.7071i | −0.7071−0.7071i | −0.7071−0.7071i | 0.7071+0.7071i | 0.7071+0.7071i |
| 0.7071−0.7071i | 0.7071+0.7071i | −0.7071−0.7071i | −0.7071−0.7071i | 0.7071+0.7071i | 0.7071+0.7071i |

FIG.9B−2

| SEQUENCE NUMBER | 21 | 22 | 23 | 24 |
|---|---|---|---|---|
| ELEMENT 1 | 0.7071−0.7071i | −0.7071+0.7071i | −0.7071+0.7071i | −0.7071+0.7071i |
| 2 | 0.7071−0.7071i | −0.7071−0.7071i | −0.7071+0.7071i | 0.7071+0.7071i |
| 3 | 0.7071−0.7071i | 0.7071−0.7071i | 0.7071+0.7071i | 0.7071−0.7071i |
| 4 | −0.7071−0.7071i | −0.7071−0.7071i | 0.7071+0.7071i | 0.7071+0.7071i |
| 5 | −0.7071−0.7071i | −0.7071−0.7071i | 0.7071−0.7071i | 0.7071+0.7071i |
| 6 | 0.7071−0.7071i | −0.7071−0.7071i | 0.7071+0.7071i | 0.7071−0.7071i |
| 7 | 0.7071+0.7071i | −0.7071+0.7071i | −0.7071+0.7071i | 0.7071−0.7071i |
| 8 | 0.7071+0.7071i | −0.7071−0.7071i | 0.7071+0.7071i | 0.7071+0.7071i |
| 9 | −0.7071+0.7071i | −0.7071−0.7071i | 0.7071+0.7071i | −0.7071−0.7071i |
| 10 | 0.7071−0.7071i | −0.7071+0.7071i | 0.7071+0.7071i | −0.7071+0.7071i |
| 11 | −0.7071−0.7071i | −0.7071−0.7071i | −0.7071−0.7071i | −0.7071−0.7071i |
| 12 | 0.7071−0.7071i | 0.7071−0.7071i | −0.7071+0.7071i | 0.7071+0.7071i |
| 13 | 0.7071−0.7071i | 0.7071−0.7071i | −0.7071−0.7071i | 0.7071+0.7071i |
| 14 | 0.7071+0.7071i | −0.7071−0.7071i | −0.7071+0.7071i | −0.7071+0.7071i |
| 15 | 0.7071−0.7071i | −0.7071+0.7071i | −0.7071+0.7071i | 0.7071+0.7071i |
| 16 | 0.7071−0.7071i | −0.7071+0.7071i | 0.7071+0.7071i | 0.7071+0.7071i |
| 17 | 0.7071−0.7071i | −0.7071+0.7071i | −0.7071−0.7071i | −0.7071−0.7071i |
| 18 | 0.7071−0.7071i | 0.7071+0.7071i | −0.7071+0.7071i | 0.7071+0.7071i |
| 19 | −0.7071−0.7071i | −0.7071+0.7071i | −0.7071−0.7071i | −0.7071−0.7071i |
| 20 | 0.7071+0.7071i | 0.7071+0.7071i | −0.7071+0.7071i | −0.7071+0.7071i |
| 21 | 0.7071−0.7071i | −0.7071+0.7071i | −0.7071−0.7071i | −0.7071−0.7071i |
| 22 | −0.7071−0.7071i | −0.7071−0.7071i | −0.7071+0.7071i | 0.7071+0.7071i |
| 23 | 0.7071−0.7071i | 0.7071−0.7071i | 0.7071+0.7071i | 0.7071−0.7071i |
| 24 | 0.7071−0.7071i | 0.7071−0.7071i | 0.7071+0.7071i | −0.7071+0.7071i |

| | 25 | 26 | 27 | 28 | 29 | 30 |
|---|---|---|---|---|---|---|
| | -0.7071+0.7071i | -0.7071-0.7071i | 0.7071-0.7071i | -0.7071-0.7071i | 0.7071+0.7071i | -0.7071-0.7071i |
| | 0.7071+0.7071i | 0.7071+0.7071i | -0.7071+0.7071i | 0.7071+0.7071i | -0.7071+0.7071i | -0.7071-0.7071i |
| | -0.7071+0.7071i | 0.7071+0.7071i | -0.7071-0.7071i | -0.7071-0.7071i | -0.7071-0.7071i | -0.7071-0.7071i |
| | 0.7071+0.7071i | -0.7071-0.7071i | -0.7071-0.7071i | 0.7071-0.7071i | -0.7071-0.7071i | 0.7071+0.7071i |
| | -0.7071+0.7071i | 0.7071-0.7071i | 0.7071-0.7071i | 0.7071-0.7071i | 0.7071+0.7071i | -0.7071-0.7071i |
| | 0.7071+0.7071i | -0.7071-0.7071i | -0.7071+0.7071i | -0.7071-0.7071i | -0.7071+0.7071i | -0.7071-0.7071i |
| | -0.7071-0.7071i | -0.7071-0.7071i | 0.7071+0.7071i | 0.7071+0.7071i | 0.7071+0.7071i | 0.7071+0.7071i |
| | 0.7071+0.7071i | 0.7071-0.7071i | -0.7071+0.7071i | -0.7071+0.7071i | -0.7071-0.7071i | -0.7071-0.7071i |
| | -0.7071+0.7071i | -0.7071-0.7071i | -0.7071-0.7071i | 0.7071-0.7071i | 0.7071+0.7071i | 0.7071+0.7071i |
| | 0.7071-0.7071i | -0.7071-0.7071i | 0.7071-0.7071i | -0.7071-0.7071i | 0.7071+0.7071i | -0.7071+0.7071i |
| | -0.7071+0.7071i | -0.7071-0.7071i | -0.7071-0.7071i | -0.7071-0.7071i | 0.7071+0.7071i | -0.7071-0.7071i |
| | 0.7071-0.7071i | 0.7071+0.7071i | 0.7071-0.7071i | 0.7071+0.7071i | -0.7071-0.7071i | 0.7071+0.7071i |
| | -0.7071-0.7071i | -0.7071+0.7071i | -0.7071-0.7071i | 0.7071+0.7071i | 0.7071+0.7071i | -0.7071-0.7071i |
| | 0.7071-0.7071i | -0.7071+0.7071i | 0.7071-0.7071i | -0.7071-0.7071i | -0.7071-0.7071i | 0.7071+0.7071i |
| | -0.7071-0.7071i | -0.7071-0.7071i | -0.7071-0.7071i | -0.7071+0.7071i | 0.7071+0.7071i | -0.7071-0.7071i |
| | 0.7071+0.7071i | 0.7071+0.7071i | 0.7071-0.7071i | -0.7071-0.7071i | -0.7071-0.7071i | 0.7071+0.7071i |
| | -0.7071-0.7071i | -0.7071-0.7071i | -0.7071-0.7071i | 0.7071-0.7071i | 0.7071+0.7071i | -0.7071-0.7071i |
| | 0.7071-0.7071i | -0.7071+0.7071i | 0.7071-0.7071i | -0.7071-0.7071i | -0.7071-0.7071i | 0.7071+0.7071i |
| | -0.7071+0.7071i | -0.7071-0.7071i | -0.7071-0.7071i | 0.7071+0.7071i | 0.7071+0.7071i | -0.7071-0.7071i |
| | 0.7071+0.7071i | -0.7071-0.7071i | -0.7071+0.7071i | -0.7071-0.7071i | -0.7071-0.7071i | 0.7071+0.7071i |
| | -0.7071-0.7071i | 0.7071+0.7071i | -0.7071-0.7071i | -0.7071-0.7071i | -0.7071-0.7071i | -0.7071-0.7071i |
| | 0.7071+0.7071i | -0.7071-0.7071i | 0.7071+0.7071i | 0.7071+0.7071i | 0.7071+0.7071i | 0.7071+0.7071i |
| | -0.7071-0.7071i | 0.7071+0.7071i | 0.7071-0.7071i | -0.7071-0.7071i | 0.7071+0.7071i | -0.7071-0.7071i |
| | 0.7071+0.7071i | -0.7071-0.7071i | -0.7071+0.7071i | 0.7071+0.7071i | -0.7071-0.7071i | 0.7071+0.7071i |
| | -0.7071-0.7071i | -0.7071-0.7071i | 0.7071-0.7071i | -0.7071-0.7071i | -0.7071-0.7071i | -0.7071-0.7071i |
| | 0.7071+0.7071i | 0.7071+0.7071i | -0.7071+0.7071i | 0.7071+0.7071i | 0.7071+0.7071i | 0.7071+0.7071i |
| | -0.7071+0.7071i | 0.7071+0.7071i | 0.7071+0.7071i | -0.7071+0.7071i | -0.7071-0.7071i | -0.7071-0.7071i |
| | 0.7071+0.7071i | -0.7071-0.7071i | -0.7071-0.7071i | -0.7071-0.7071i | 0.7071+0.7071i | 0.7071+0.7071i |
| | -0.7071-0.7071i | 0.7071+0.7071i | 0.7071+0.7071i | -0.7071-0.7071i | -0.7071-0.7071i | -0.7071-0.7071i |
| | 0.7071-0.7071i | -0.7071+0.7071i | -0.7071-0.7071i | 0.7071+0.7071i | -0.7071-0.7071i | 0.7071+0.7071i |

FIG.9C-2

LOW PAR ZERO AUTO-CORRELATION ZONE SEQUENCES FOR CODE SEQUENCE MODULATION

CROSS-REFERENCE TO RELATED APPLICATIONS

This patent application claims priority under 35 U.S.C. §119(e) from U.S. Provisional Patent Application No. 60/936,379, filed Jun. 20, 2007, and from U.S. Provisional Patent Application No. 60/967,792, filed Sep. 7, 2007, the disclosures of which are incorporated by reference herein in their entirety.

TECHNICAL FIELD

The exemplary and non-limiting embodiments of this invention relate generally to wireless communication systems, methods, devices and computer program products and, more specifically, relate to techniques for transmitting information between a user device and a wireless network device.

BACKGROUND

Certain abbreviations that may be found in the description and/or in the Figures are herewith defined as follows:
3GPP Third Generation Partnership Project
CAZAC constant-amplitude zero auto-correlation
CDF cumulative distribution function
CDM code division multiplexing
CDMA code division multiple access
CM cubic metric
CP cyclic prefix
CQI channel quality indicator
DFT discrete Fourier transform
DFT-S-OFDM discrete Fourier transform spread OFDM (SC-FDMA based on frequency domain processing)
eNode B E-UTRAN Node B (eNB)
E-UTRAN evolved UTRAN
FDM frequency division multiplexing
FDMA frequency division multiple access
FFT fast Fourier transform
IFFT inverse FFT
LB long block
LTE long term evolution of UTRAN (E-UTRAN)
Node B base station
OFDM orthogonal frequency division multiplexing
OFDMA orthogonal frequency division multiple access
PAR peak to average ratio
PRB physical resource block
PUCCH physical uplink control channel
PUSCH physical uplink shared channel
QPSK quadrature phase shift keying
RAZAC random zero auto-correlation
RRC radio resource control
SC subcarrier
SC-FDMA single carrier, frequency division multiple access
SNR signal to noise ratio
UE user equipment, such as a mobile station or mobile terminal
UL uplink
UTRAN universal terrestrial radio access network
ZC Zadoff-Chu A proposed communication system known as evolved UTRAN (E-UTRAN, also referred to as UTRAN-LTE) is currently under discussion within the 3GPP. The working assumption is that the DL access technique will be OFDMA, and the UL technique will be SC-FDMA.

Reference may be made to Section 6 of 3GPP TR 36.211, V1.0.0 (2007-03), 3rd Generation Partnership Project; Technical Specification Group Radio Access Network; Physical Channels and Modulation (Release 8) for a description of the UL physical channels.

Reference may also be made to 3GPP TR 25.814, V7.1.0 (2006-09), 3rd Generation Partnership Project; Technical Specification Group Radio Access Network; Physical layer aspects for evolved Universal Terrestrial Radio Access (UTRA) (Release 7), such as generally in section 9.1, for a description of the SC-FDMA UL of E-UTRAN.

FIG. 1A reproduces FIG. 12 of 3GPP TS 36.211 and shows the UL slot format for a generic frame structure.

As is described in Section 9.1 of 3GPP TR 25.814, the basic uplink transmission scheme is single-carrier transmission (SC-FDMA) with cyclic prefix to achieve uplink inter-user orthogonality and to enable efficient frequency-domain equalization at the receiver side. Frequency-domain generation of the signal, sometimes known as DFT-spread OFDM (DFT S-OFDM), is assumed.

FIG. 1B shows the generation of pilot samples. An extended or truncated Zadoff-Chu symbol sequence is applied to an IFFT block via a sub-carrier mapping block. The sub-carrier mapping block determines which part of the spectrum is used for transmission by inserting a suitable number of zeros at the upper and/or lower end. A CP is inserted into the output of the IFFT block.

In the PUCCH sub-frame structure for the UL control signaling, seven SC-FDMA symbols (also referred to herein as "LBs" for convenience) are currently defined per slot. A sub-frame consists of two slots. Part of the LBs are used for reference signals (pilot long blocks) for coherent demodulation. The remaining LBs are used for control and/or data transmission.

The current working assumption is that for the PUCCH the multiplexing within a PRB is performed using CDM and (localized) FDM is used for different resource blocks. In the PUCCH, the bandwidth of one control and pilot signal always corresponds to one PRB=12 SCs.

Two types of CDM are used both for data and pilot LBs. Multiplexing based on the usage of cyclic shifts provides nearly complete orthogonality between different cyclic shifts if the length of cyclic shift is larger than the delay spread of the radio channel. For example, with an assumption of a 5 microsecond delay spread in the radio channel, up to 12 orthogonal cyclic shifts within one LB can be achieved. Sequence sets for different cells are obtained by changing the sequence index.

Another type of CDM may be applied between LBs based on orthogonal covering sequences, e.g., Walsh or DFT spreading. This orthogonal covering may be used separately for those LBs corresponding to the RS and those LBs corresponding to the data signal. The CQI is typically transmitted without orthogonal covering.

Of particular interest to the exemplary embodiments of this invention is control channel signaling and, in particular, the use of the PUCCH.

As was noted, it has been determined in 3GPP that UEs having CQI transmission are code division multiplexed by means of different cyclic shifts of CAZAC sequences. In commonly owned and copending U.S. Provisional Patent Application No. 60/933,760, filed Jun. 8, 2007, by Kari Pajukoski, Esa Tiirola and Kari Hooli, entitled: Multi-code Precoding for CAZAC Sequence Modulation, Nokia Siemens Networks Oy Docket No.: 2007P02633, Harrington & Smith, PC Docket No. 863.0066.P1 (US), multi-code sequence modulation is provided to allow for larger CQI sizes, and a multi-code preceding for CAZAC sequence modulation is described.

One problem related to conventional CAZAC sequence modulation is the small spectrum efficiency per UE, due to the fact that only one modulated CAZAC sequence per UE can be transmitted during the long block. Correspondingly, the maximum symbol rate is limited to one symbol per block. Spectrum efficiency can be increased by transmitting multiple modulated CAZAC sequences simultaneously, however the use of this approach suffers from an increased PAR, which in turn results in either higher UE power consumption or decreased CQI coverage. The preceding method disclosed in U.S. Provisional Patent Application No. 60/933,760 significantly reduces PAR for multi-code sequence modulation. However, multi-code sequence modulation can still exhibit a larger PAR than single code sequence modulation.

3GPP has proposed the use of Zadoff-Chu sequences, as well as the extended and truncated modifications of Zadoff-Chu sequences, considered together with numerically searched CAZAC-like sequences. However, the multi-code sequence modulation has not been considered in the design of these sequences and one result of this is an increase in CM when multi-code sequence modulation is applied.

In 3GPP TSG RAN WG1 #49, Kobe, Japan, May 7-11, 2007, "Design of CAZAC Sequences for Small RB Allocations in E-UTRA UL", Texas Instruments, R1-072206, a numerical search method for CAZAC-like sequences is presented. The method can be approximately summarized as follows:

1. A set of initial sequences are randomly selected with elements on the unit circle.
2. Sequences are iterated with two steps in a loop:
   a. Sequences are forced to flat in frequency by dividing each sequence element with its amplitude; and
   b. Sequences are forced to flat in time by dividing each sequence element with its amplitude.

More specifically, R1-072206 describes a method for generating CAZAC sequences by computer search using random initialization. Because a random procedure is used to search these CAZAC sequences, they are referred to as Random-CAZAC. The procedure for generating the CAZAC sequence of length N is as follows:

(1) Let i=1, in the first step generate N QPSK random complex numbers:

$$\tilde{X}_i^f = \{\tilde{x}_i^f(1), \tilde{x}_i^f(2), \ldots \tilde{x}_i^f(n) \ldots, \tilde{x}_i^f(N)\}; \tilde{x}_i^f(n) \in \{1+j, 1-j, -1+j, -1-j\}.$$

(2) Next, define the sequence:

$$X_i^f = \{x_1^f(1), x_1^f(2), \ldots x_1^f(n) \ldots, x_1^f(N)\} = \left\{\frac{\tilde{x}_i^f(1)}{|\tilde{x}_i^f(1)|}, \frac{\tilde{x}_i^f(2)}{|\tilde{x}_i^f(2)|}, \ldots \frac{\tilde{x}_i^f(n)}{|\tilde{x}_i^f(n)|} \ldots, \frac{\tilde{x}_i^f(N)}{|\tilde{x}_i^f(N)|}\right\}.$$

(3) Let sequence $\tilde{X}_i^t = \{\tilde{x}_i^t(1), \tilde{x}_i^t(2), \ldots, \tilde{x}_i^t(N)\}$ be the IFFT of sequence $\tilde{X}_i^f$, and define the sequence:

$$X_i^t = \{x_i^t(1), x_i^t(2), \ldots x_i^t(n) \ldots, x_i^t(N)\} = \left\{\left(\frac{\tilde{x}_i^t(1)}{|\tilde{x}_i^t(1)|}\right), \left(\frac{\tilde{x}_i^t(2)}{|\tilde{x}_i^t(2)|}\right), \ldots \left(\frac{\tilde{x}_i^t(n)}{|\tilde{x}_i^t(n)|}\right) \ldots \left(\frac{\tilde{x}_i^t(N)}{|\tilde{x}_i^t(N)|}\right)\right\}.$$

(4) Let the FFT of the sequence $X_i^t$ be now denoted by $\tilde{X}_i^f$; set i=i+1 and go back to step (2). Repeat the above steps (2), (3) and (4) for say M=1000 or more.

For large number of iterations, it is said that it was found that the resulting sequence $X_M^t$ is a CAZAC sequence. Further, several such CAZAC sequences can be generated by starting with a different random sequence in step (1) above.

SUMMARY

The below summary section is intended to be merely exemplary and non-limiting.

In one exemplary embodiment of the invention, a method comprising: randomly selecting a set of sequences with each sequence comprised of sequence elements, each sequence element having a frequency selected from constellation points on a unit circle in a complex plane, where the selected set of sequences comprises a candidate set of sequences; calculating a first cubic metric for each sequence of the candidate set of sequences, where the first cubic metric is for single code modulation; and in response to the first cubic metric being larger than at least one threshold, removing the corresponding sequence from the candidate set of sequences to obtain at least one saved sequence.

In another exemplary embodiment of the invention, a program storage device readable by a machine, tangibly embodying a program of instructions executable by the machine for performing operations, said operations comprising: randomly selecting a set of sequences with each sequence comprised of sequence elements, each sequence element having a frequency selected from constellation points on a unit circle in a complex plane, where the selected set of sequences comprises a candidate set of sequences; calculating a first cubic metric for each sequence of the candidate set of sequences, where the first cubic metric is for single code modulation; and in response to the first cubic metric being larger than at least one threshold, removing the corresponding sequence from the candidate set of sequences to obtain at least one saved sequence.

In another exemplary embodiment of the invention, an apparatus comprising: a memory and at least one processor, where the at least one processor is configured to: randomly select a set of sequences with each sequence comprised of sequence elements, each sequence element having a frequency selected from constellation points on a unit circle in a complex plane, where the selected set of sequences comprises a candidate set of sequences; calculate a first cubic metric for each sequence of the candidate set of sequences, where the first cubic metric is for single code modulation; and in response to the first cubic metric being larger than at least one threshold, remove the corresponding sequence from the candidate set of sequences to obtain at least one saved sequence, where the at least one saved sequence is stored on the memory.

In another exemplary embodiment of the invention, an apparatus comprising: means for randomly selecting a set of sequences with each sequence comprised of sequence elements, each sequence element having a frequency selected from constellation points on a unit circle in a complex plane, where the selected set of sequences comprises a candidate set of sequences; means for calculating a first cubic metric or each sequence of the candidate set of sequences, where the first cubic metric is for single code modulation; and means, in response to the first cubic metric being larger than at least one threshold, for removing the corresponding sequence from the candidate set of sequences to obtain at least one saved sequence.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 1A reproduces FIG. 12 of 3GPP TS 36.211 and shows the UL slot format for a generic frame structure;

FIG. 1B is a block diagram that illustrates the generation of pilot samples for the 3GPP LTE SC-FDMA UL;

FIGS. 5A-5E, collectively referred to as FIG. 5, show a set of RAZAC sequences in accordance with the exemplary embodiments of this invention;

FIGS. 6A and 6B, collectively referred to as FIG. 6, show a selected subset of the set of RAZAC sequences of FIG. 5;

FIG. 8 shows a set of RAZAC-like sequences for length 1RB PUSCH demodulation reference sequences in accordance with the exemplary embodiments of this invention;

FIGS. 9A-9C, collectively referred to as FIG. 9, show a set of RAZAC-like sequences for length 2RB PUSCH demodulation reference sequences in accordance with the exemplary embodiments of this invention;

DETAILED DESCRIPTION

The exemplary embodiments of this invention pertain at least in part to the UL portion of the LTE, and, more specifically, pertain to PUCCH DL CQI modulation in the UL PUCCH channel. The exemplary embodiments of this invention provide novel sequences suitable for both multi-code and single-code sequence modulation while exhibiting a low PAR. The exemplary embodiments of this invention also provide novel sequences suitable as PUSCH demodulation reference sequences, for example, for both 1 and 2 resource block (RB) allocations.

Figure 2:
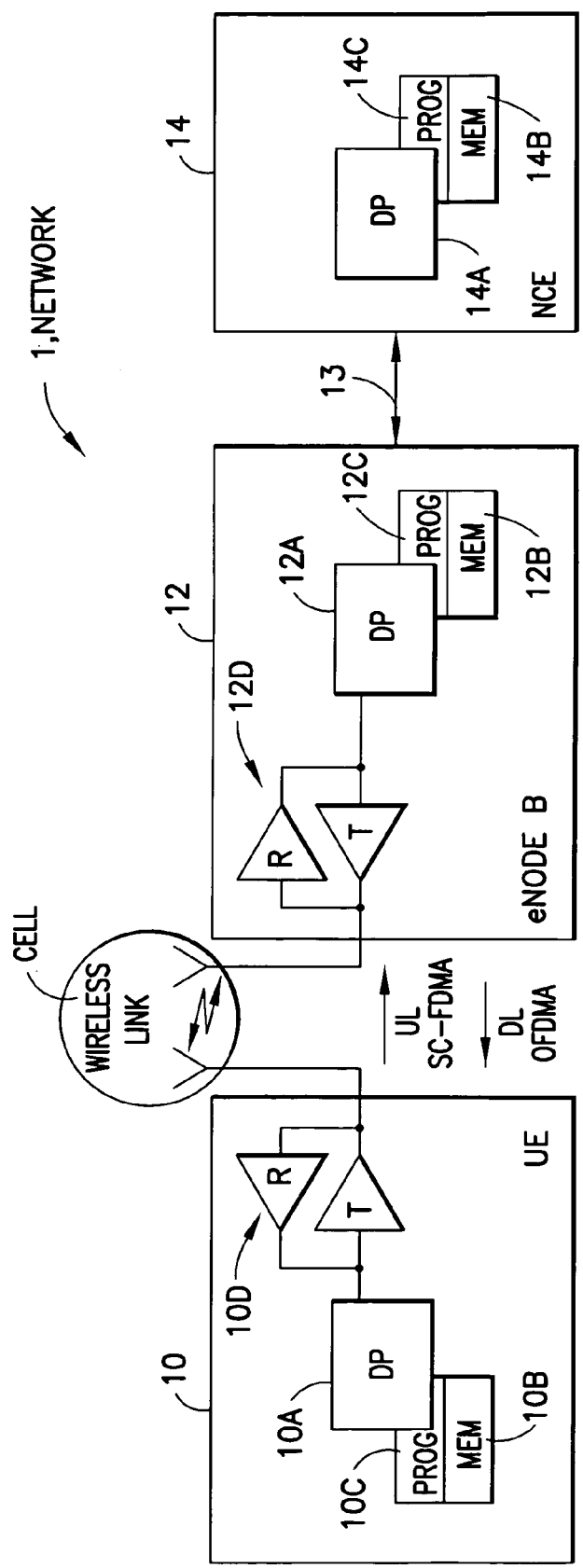
FIG. 2 shows a simplified block diagram of various electronic devices that are suitable for use in practicing the exemplary embodiments of this invention.

By way of introduction, reference is made to FIG. 2 for illustrating a simplified block diagram of various electronic devices that are suitable for use in practicing the exemplary embodiments of this invention. In FIG. 2, a wireless network 1 is adapted for communication with a UE 10 via at least one Node B (base station) 12 (also referred to herein as an eNode B 12). The network 1 may include a network control element 14 coupled to the eNode B 12 via a data path 13. The UE 10 includes a data processor (DP) 10A, a memory (MEM) 10B that stores a program (PROG) 10C, and a suitable radio frequency (RF) transceiver 10D having a transmitter (T) and a receiver (R) for bidirectional wireless communication with the eNode B 12, which also includes a DP 12A, a MEM 12B that stores a PROG 12C, and a suitable RF transceiver 12D having a transmitter (T) and a receiver (R). The eNode B 12 is typically coupled via the data path 13 to the network control element 14 that also includes at least one DP 14A and a MEM 14B storing an associated PROG 14C. At least one of the PROGs 10C and 12C is assumed to include program instructions that, when executed by the associated DP, enable the respective electronic device to operate in accordance with the exemplary embodiments of this invention, as will be discussed below in greater detail.

In a typical implementation, there will be a plurality of UEs 10 that are present and that require the use of UL signaling.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 10A of the UE 10 and the DP 12A of the eNode B 12, or by hardware, or by a combination of software (and firmware) and hardware.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Discussing now in greater detail the exemplary embodiments of this invention, there is provided a set of numerically searched sequences which have the following properties:
  nearly zero auto-correlation zone that provide nearly orthogonal cyclic shifts and flat frequency response;
  a CM mainly below 1 dB with single-code sequence modulation; and a low CM when used with the precoded multi-code sequence modulation presented in U.S. Provisional Patent Application No. 60/933,760.

The disclosed sequences may be differentiated from the sequences previously considered in 3GPP in at least two main respects. First, the sequences exhibit a low CM with precoded multi-code sequence modulation. Second, the sequences do not have constant amplitude in time, thus, they are not characterized as CAZAC-like sequence. Instead, they may be characterized generally as random zero auto-correlation (RAZAC) sequences or as RAZAC-like sequences.

An exemplary set of 53 RAZAC sequences is presented in FIGS. 5A-5E. In this case, each of the 53 sequences has 12 elements each comprised of a value having a real and an imaginary part. In FIGS. 5A-5E, the sequences are presented both in the frequency and time domains. From the set of sequences, sequence subsets may be selected so that the cross-correlations between the sequences within the subset are reasonable (acceptable for use). A non-limiting example of such a subset containing 12 sequences is shown in FIGS. 6A and 6B, and includes the sequences 4, 20, 21, 24, 26, 31, 32, 33, 36, 39, 46 and 51 from the set of RAZAC sequences shown in FIG. 5. Such a subset allows for a sequence reuse factor of 12.

It should be pointed out that FIG. 5 is not intended to present an exhaustive list of RAZAC sequences, and that there may be others that could be employed. It is also pointed out that the RAZAC sequences may be rotated and/or scaled by multiplying the entire sequence by a complex number. However, this type of operation does not fundamentally change the sequence.

Figure 4:
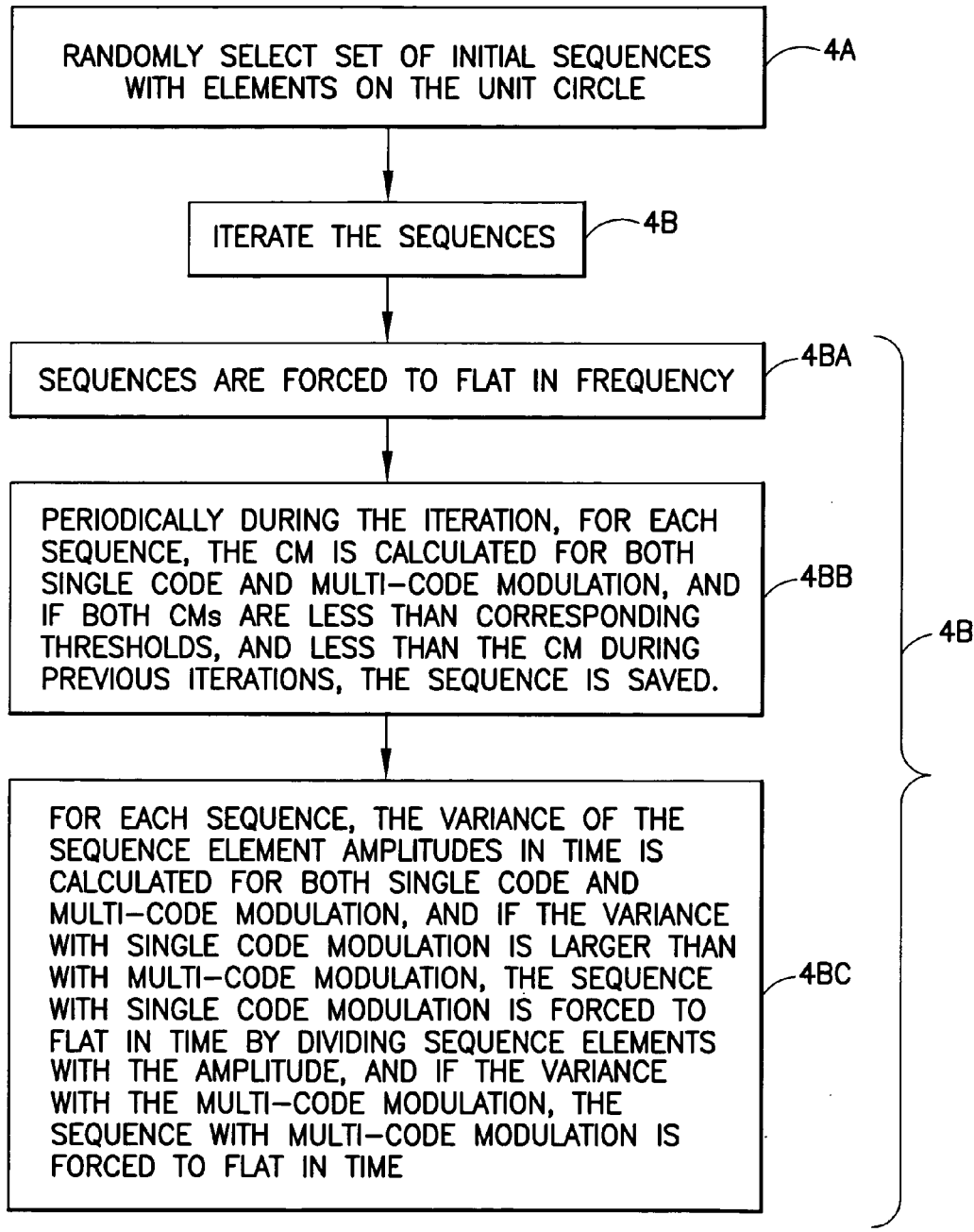
FIG. 4 is a logic flow diagram in accordance with exemplary embodiments of a method, and a computer program product, in accordance with this invention for determining the set of random zero auto-correlation (RAZAC) sequences shown in FIG. 5.

The sequences may be numerically searched with the following method that forms an aspect of the exemplary embodiments of this invention (reference is also made to FIG. 4 in this regards).

4A. A set of initial sequences are randomly selected with elements on the unit circle.

4B. The sequences are iterated with three steps in a loop:

4Ba. Sequences are forced to flat in frequency by dividing each sequence element with its amplitude.

4Bb. For each sequence, the CM is calculated for both single code and multi-code modulation. If both CMs are less than some given thresholds, and less than the CM during previous iterations, the sequence is saved. This step may be performed every $n^{th}$ iteration (e.g., every $5^{th}$ iteration).

4Bc. For each sequence, the variance of the sequence element amplitudes in time is calculated for both single code and multi-code modulation. If the variance with single code modulation is larger than with multi-code modulation, the sequence with single code modulation is forced to flat in time by dividing sequence elements with the amplitude. If the variance with multi-code modulation is larger than with single code modulation, the sequence with multi-code modulation is forced to flat in time by dividing each sequence element with its amplitude.

During the search, different exemplary embodiments of the method may used with differences in steps 4Bb and 4Bc. Note that the presence and execution of the steps 4Bb and 4Bc is clearly different than the search method discussed above for R1-072206.

The unit circle may be a unit circle in the complex plane such that the frequencies for the sequence elements of the randomly selected sequences have a real part and an imaginary part, as with the examples shown in FIGS. 5, 6, 8 and 9, as described in greater detail below. In some exemplary embodiments, each sequence element has a frequency selected from constellation points on a unit circle (see FIGS. 8 and 9). In some exemplary embodiments, each sequence element has a frequency selected from four constellation points on a unit circle (see FIGS. 8 and 9). The constellation points (e.g., the four constellation points) may be evenly-spaced about the unit circle (see FIGS. 8 and 9). In some exemplary embodiments, the constellation points comprise QPSK constellation points.

Figure 7:
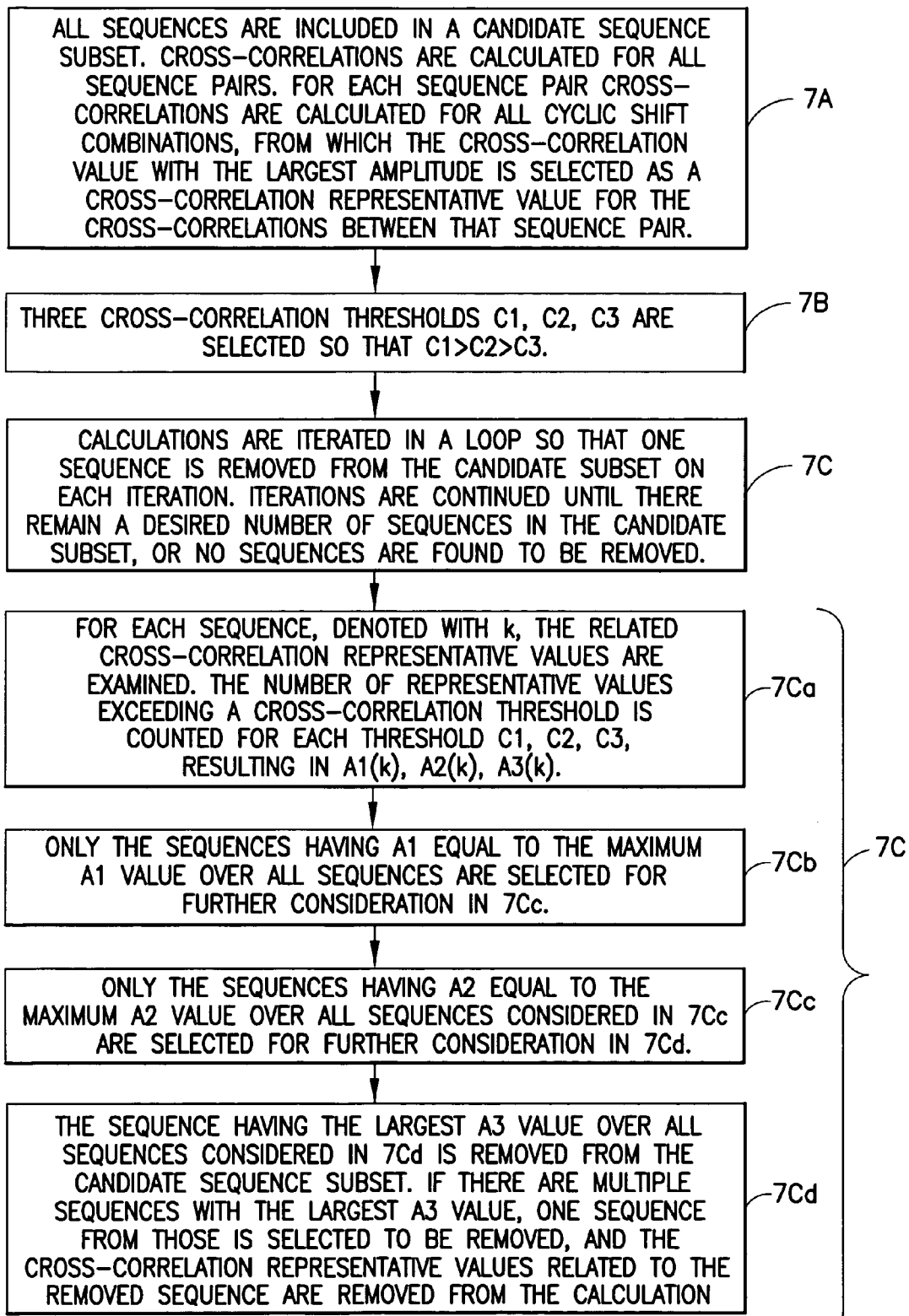
FIG. 7 is a logic flow diagram in accordance with exemplary embodiments of a method, and a computer program product, in accordance with this invention for use in selecting the subset of RAZAC sequences shown in FIG. 6.

From the obtained set of sequences, a subset may be selected from it with the following method that also forms an aspect of the exemplary embodiments of this invention (reference is made to FIG. 7 in this regard).

7A. All sequences are included in a candidate sequence subset. Cross-correlations are calculated for all sequence pairs. For each sequence pair, cross-correlations are calculated for all cyclic shift combinations, from which the cross-correlation value with the largest amplitude is selected as a cross-correlation representative value for the cross-correlations between that sequence pair.

7B. Three cross-correlation thresholds C1, C2, C3 are selected so that C1>C2>C3.

7C. Calculations are iterated in a loop so that one sequence is removed from the candidate subset on each iteration. Iterations are continued until there remain a desired number of sequences in the candidate subset, or no sequences are found to be removed. There are four steps in the loop:

7Ca. For each sequence, denoted with k, the related cross-correlation representative values are examined. The number of representative values exceeding a cross-correlation threshold is counted for each threshold C1, C2, C3, resulting in A1($k$), A2($k$), A3($k$).

7Cb. Only the sequences having A1 equal to the maximum A1 value over all sequences are selected for further consideration in 7Cc.

7Cc. Only the sequences having A2 equal to the maximum A2 value over all sequences considered in 7Cc are selected for further consideration in 7Cd.

7Cd. The sequence having the largest A3 value over all sequences considered in 7Cd is removed from the candidate sequence subset. If there are multiple sequences with the largest A3 value, one sequence from those is selected to be removed. Also the cross-correlation representative values related to the removed sequence are removed from the calculation.

As non-limiting examples, the sequences as described above may be used for sequence modulation on the PUCCH, as well as for demodulation and sounding reference signals of length 12. When considering sequence modulation on the PUCCH, a reasonable subset of sequences, such as in FIG. 6, may be defined and saved in the memories 10B, 12B of the UE 10 and the eNB 12. Sequences and their cyclic shifts may be allocated by means of higher layer signaling (e.g., by RRC signaling). The sequence index may be cell-specific, whereas the cyclic shift index or indices may be resource-specific and/or UE-specific. The modulation used with multi-code sequence modulation may be as described in U.S. Provisional Patent Application No. 60/933,760. In addition, the two cyclic shifts used in the multi-code modulation may be consecutive, e.g., one of the pairs {0,1}, {2,3}, {4,5}, {6,7}, {8,9}, {10,11}.

Figure 9A-2:
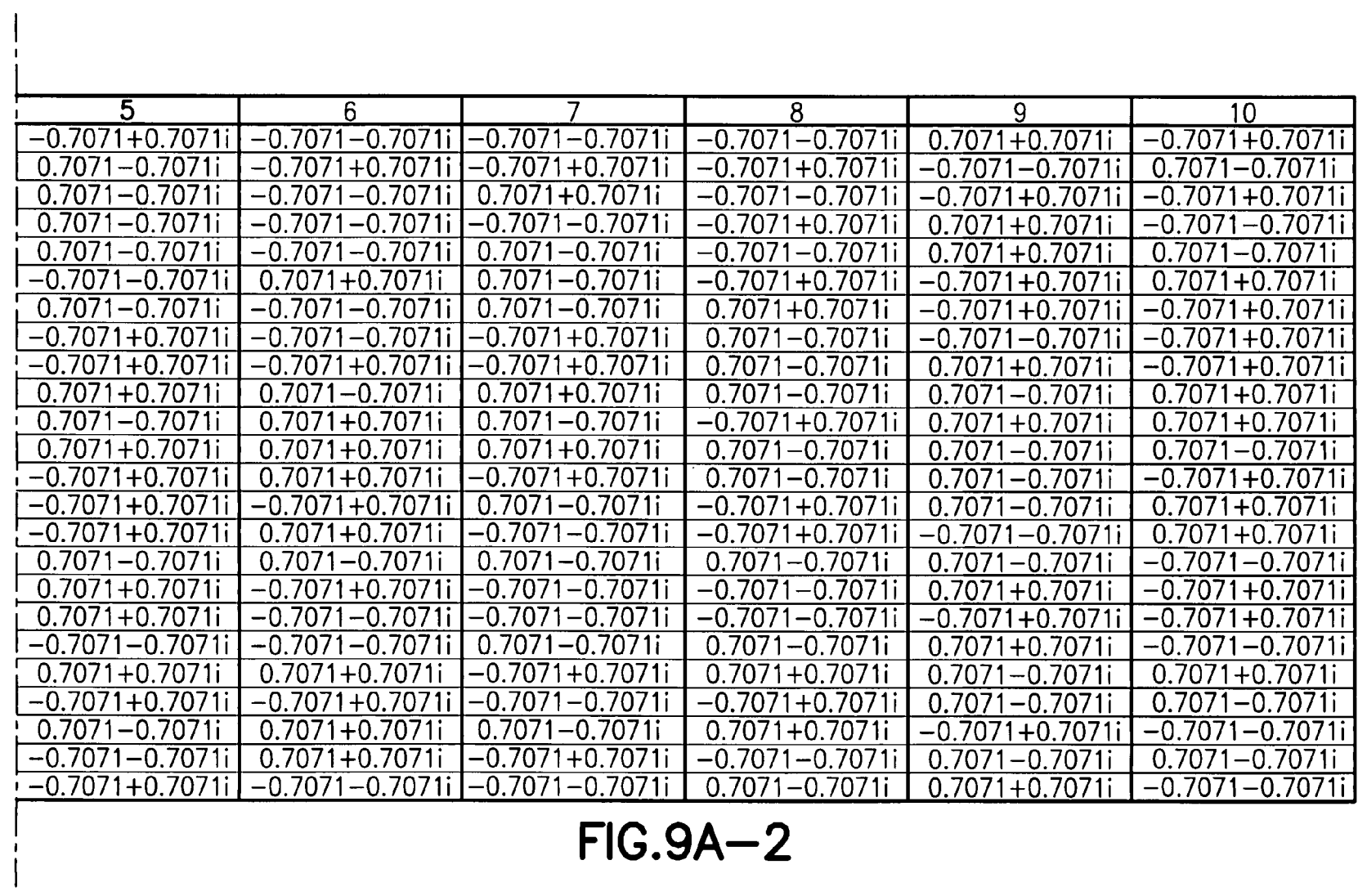

In further exemplary embodiments of the invention, exemplary sets of 30 RAZAC-like sequences of 1 and 2 RB lengths for PUSCH demodulation reference sequences are presented in FIGS. 8 and 9, respectively. In this case each of the 30 sequences has 12 elements (1 RB length) or 24 elements (2 RB length) in frequency, each element comprised of a value having a real and an imaginary part. These values are restricted so that they can be represented with 2 bits. This limits the number of allowed values per sequence element to 4. Due to this limited sequence set, a candidate sequence set can be searched with conventional numerical search methods so that the candidate sequence set fulfills the following three requirements:

Sequences have low PAR with single sequence modulation and with multi-sequence modulation in the case of sequences of length 12.

Sequences have reasonable (i.e., acceptable for use) cross-correlations with extended Zadoff-Chu sequences of length 36.

Sequences of length 24 have reasonable (i.e., acceptable for use) cross-correlations with a set of sequences of length 12 (which is selected first).

Figure 10:
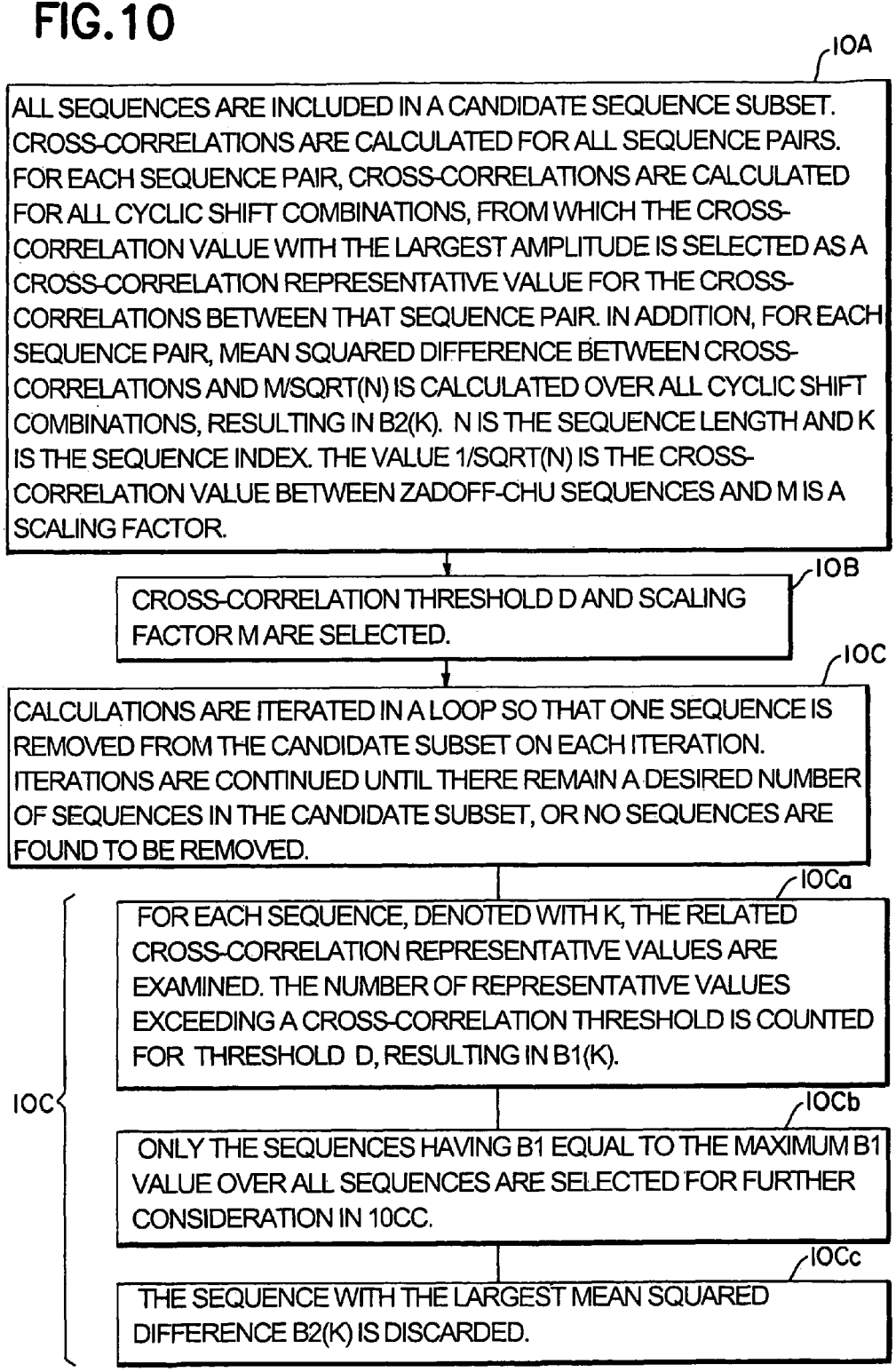
FIG. 10 is another logic flow diagram in accordance with exemplary embodiments of a another method, and a computer program product, in accordance with this invention for use in selecting a subset of the exemplary RAZAC-like sequences shown in FIG. 9.

However, to select a sequence set from the exemplary candidate sequence set(s) so that the cross-correlations between the sequences within the set are reasonable (i.e., acceptable for use), the following variant of the method depicted in FIG. 7 may be used. This variant is shown in the exemplary logic flow diagram of FIG. 10.

10A. All sequences are included in a candidate sequence subset. Cross-correlations are calculated for all sequence pairs. For each sequence pair, cross-correlations are calculated for all cyclic shift combinations, from which the cross-correlation value with the largest amplitude is selected as a cross-correlation representative value for the cross-correlations between that sequence pair. In addition, for each sequence pair, mean squared difference between cross-correlations and m/sqrt(N) is calculated over all cyclic shift combinations, resulting in B2($k$). N is the sequence length and k is the sequence index. The value 1/sqrt(N) is the cross-correlation value between Zadoff-Chu sequences and m is a scaling factor.

10B. Cross-correlation threshold D and scaling factor m are selected.

10C. Calculations are iterated in a loop so that one sequence is removed from the candidate subset on each iteration. Iterations are continued until there remain a desired number of sequences in the candidate subset, or no sequences are found to be removed. There are three steps in the loop:

10Ca. For each sequence, denoted with k, the related cross-correlation representative values are examined. The number of representative values exceeding a cross-correlation threshold C is counted for threshold D, resulting in B1($k$).

10Cb. Only the sequences having B13 equal to the maximum B1 value over all sequences are selected for further consideration in 10Cc.

10Cc The sequence with the largest mean squared difference B2($k$) is discarded.

It should be noted that threshold C may be adjusted and calculation repeated to obtain a sequence set of a desired size. In addition, mean cross-correlation between a sequence pair may be used instead of the mean squared difference.

As further non-limiting examples, the sequence sets selected as described above may be used for sequence modulation on the PUCCH, as well as for demodulation and sounding reference signals of lengths 12 and 24.

Figure 3:
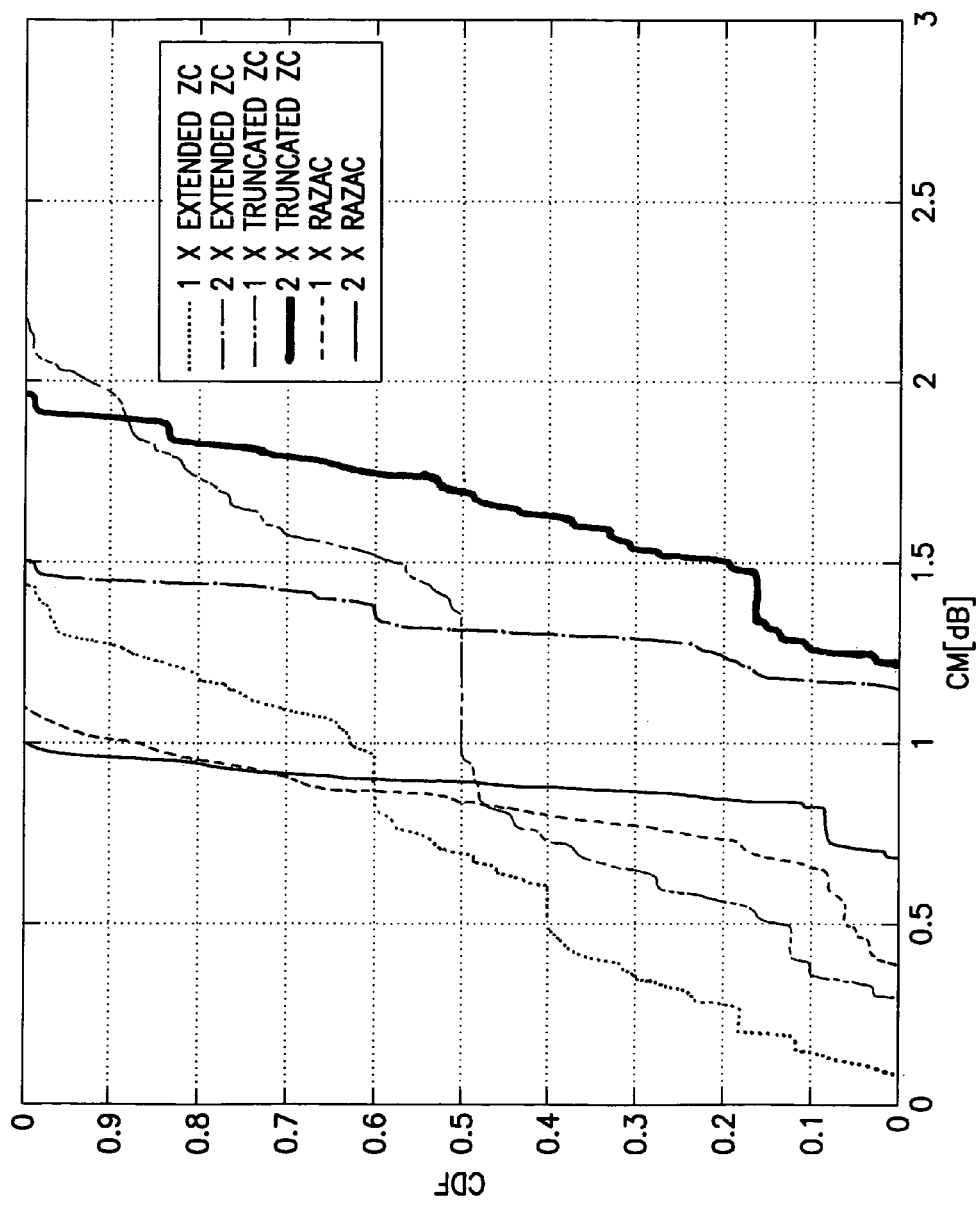
FIG. 3 is a graph that presents the CDF of CM for extended and truncated Zadoff-Chu sequences, as well as for 12 exemplary RAZAC sequences, with results for both single code (1x) and multi-code (2x) modulation being depicted.

As should be appreciated, a number of advantages can be realized by the use of the exemplary embodiments of this invention. For example, and referring to FIG. 3, the CDF of the CM is presented for extended and truncated Zadoff-Chu (ZC) sequences, as well as for the subset of 12 RAZAC sequences shown in FIG. 6. It can be seen that for the RAZAC sequences only few cyclic shifts of the sequences have a CM greater than 1 dB in the case of single code modulation. In addition, the CM remains less than 1 dB in the case of multi-code modulation. Thus, the RAZAC sequences shown in FIGS. 5 and 6 provide a significant improvement in the CM as compared to truncated and extended Zadoff-Chu sequences. Although not shown in FIG. 3, the sequences presented in R1-072206 exhibit high CM values in the case of multi-code modulation with consecutive cyclic shifts. One should also note that due at least to UE 10 power limitations, differences in CM values that are less than 1 dB are generally not significant.

Based on the foregoing it should be apparent that the exemplary embodiments of this invention provide for, in a non-limiting aspect thereof, a method, apparatus and computer program product for providing a user equipment with a plurality of RAZAC or RAZAC-like sequences for use in single-code or multi-code sequence modulation of an uplink transmission to a base station.

The exemplary embodiments of this invention further provide for precoding the multi-code sequence modulation.

Further in accordance with exemplary embodiments of this invention, the UE 10 of FIG. 2 is constructed to contain circuitry (e.g., at least one memory) configured to store a plurality of RAZAC sequences for use in single-code or multi-code sequence modulation of an uplink transmission to a base station, where the UE may further include circuitry configured to precode the multi-code sequence modulation.

Below are provided further descriptions of non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments.

Figure 11:
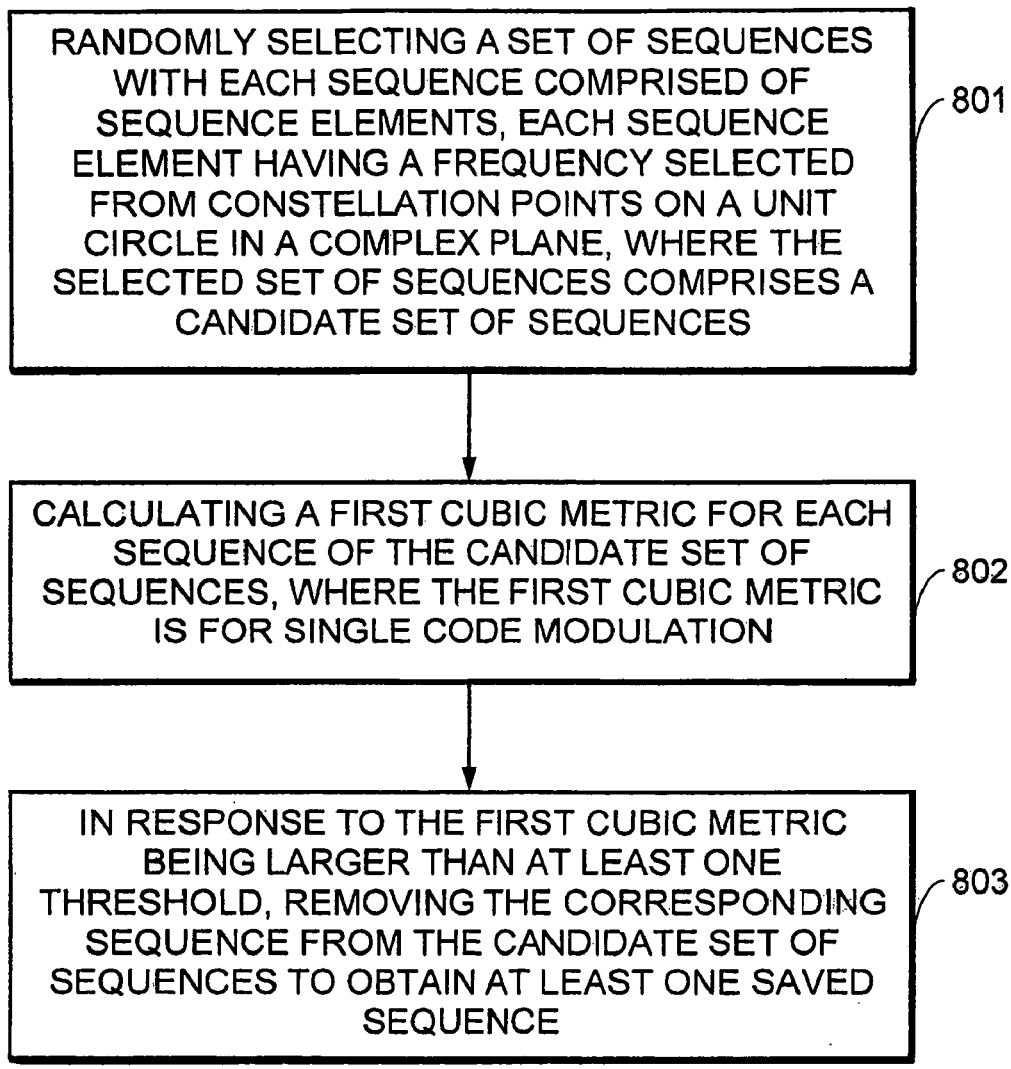
FIG. 11 is another logic flow diagram in accordance with exemplary embodiments of a another method, and a computer program product, in accordance with this invention for use in selecting a set of the exemplary sequences.

(1) In one non-limiting, exemplary embodiment, and as shown in FIG. 11, a method comprising: randomly selecting a set of sequences with each sequence comprised of sequence elements, each sequence element having a frequency selected from constellation points on a unit circle in a complex plane, where the selected set of sequences comprises a candidate set of sequences (801); calculating a first cubic metric for each sequence of the candidate set of sequences, where the first cubic metric is for single code modulation (802); and in response to the first cubic metric being larger than at least one threshold, removing the corresponding sequence from the candidate set of sequences to obtain at least one saved sequence (803).

A method as in any above, further comprising: calculating a second cubic metric for each sequence of the candidate set of sequences, where the second cubic metric is for multi-code modulation; and in response to at least one of the first cubic metric or the second cubic metric being larger than the at least one threshold, removing the corresponding sequence from the candidate set of sequences to obtain that at least one saved sequence. A method as in any above, where the at least one threshold comprises a first threshold and a second threshold, where removing the corresponding sequence is performed in response to at least one of the first cubic metric being larger than the first threshold or the second cubic metric being larger than the second threshold. A method as in any above, further comprising: calculating cross-correlations for a plurality of different cyclic shift combinations of each sequence of the candidate set of sequences against a second sequence set; selecting a cross-correlation value having a largest amplitude as a representative cross-correlation value for the cross-correlations between the corresponding sequence and the second sequence set; and in response to the representative cross-correlation value being larger than a threshold, removing the corresponding sequence from the candidate set of sequences. A method as in any above, where the second sequence set is comprised of second sequences having a length of 36 sequence elements or second sequences having a length of 12 sequence elements. A method as in any above, where each sequence element of the sequences in the selected set of sequences has a frequency selected from four possible constellation points on a unit circle in a complex plane. A method as in any above, where the at least one saved sequence has a length of one resource block or two resource blocks.

A method as in any above, where the at least one saved sequence comprises at least one of:

| element | | | | | |
|---|---|---|---|---|---|
| | 1 | 0.7071 − 0.7071i | −0.7071 + 0.7071i | 0.7071 + 0.7071i | 0.7071 + 0.7071i |
| | 2 | −0.7071 + 0.7071i | 0.7071 + 0.7071i | 0.7071 + 0.7071i | −0.7071 + 0.7071i |
| | 3 | 0.7071 − 0.7071i | 0.7071 − 0.7071i | −0.7071 − 0.7071i | 0.7071 + 0.7071i |
| | 4 | 0.7071 + 0.7071i | 0.7071 − 0.7071i | −0.7071 − 0.7071i | 0.7071 − 0.7071i |
| | 5 | −0.7071 − 0.7071i | −0.7071 + 0.7071i | −0.7071 − 0.7071i | 0.7071 + 0.7071i |
| | 6 | −0.7071 − 0.7071i | −0.7071 + 0.7071i | −0.7071 − 0.7071i | −0.7071 + 0.7071i |
| | 7 | −0.7071 − 0.7071i | −0.7071 − 0.7071i | 0.7071 − 0.7071i | −0.7071 + 0.7071i |
| | 8 | −0.7071 − 0.7071i | 0.7071 + 0.7071i | −0.7071 + 0.7071i | −0.7071 + 0.7071i |
| | 9 | −0.7071 − 0.7071i | −0.7071 + 0.7071i | −0.7071 − 0.7071i | 0.7071 − 0.7071i |
| | 10 | 0.7071 + 0.7071i | 0.7071 + 0.7071i | 0.7071 + 0.7071i | 0.7071 − 0.7071i |
| | 11 | 0.7071 − 0.7071i | −0.7071 + 0.7071i | −0.7071 − 0.7071i | −0.7071 + 0.7071i |
| | 12 | −0.7071 − 0.7071i | −0.7071 + 0.7071i | −0.7071 + 0.7071i | 0.7071 − 0.7071i |

| element | | | | |
|---|---|---|---|---|
| | 1 | −0.7071 − 0.7071i | −0.7071 − 0.7071i | 0.7071 + 0.7071i |
| | 2 | −0.7071 + 0.7071i | 0.7071 + 0.7071i | −0.7071 + 0.7071i |
| | 3 | 0.7071 + 0.7071i | 0.7071 + 0.7071i | −0.7071 + 0.7071i |
| | 4 | 0.7071 + 0.7071i | −0.7071 + 0.7071i | −0.7071 + 0.7071i |
| | 5 | −0.7071 − 0.7071i | −0.7071 − 0.7071i | 0.7071 − 0.7071i |
| | 6 | 0.7071 + 0.7071i | −0.7071 + 0.7071i | 0.7071 − 0.7071i |
| | 7 | −0.7071 − 0.7071i | −0.7071 − 0.7071i | −0.7071 − 0.7071i |
| | 8 | −0.7071 − 0.7071i | −0.7071 − 0.7071i | −0.7071 − 0.7071i |
| | 9 | 0.7071 − 0.7071i | −0.7071 + 0.7071i | 0.7071 + 0.7071i |
| | 10 | 0.7071 − 0.7071i | 0.7071 + 0.7071i | −0.7071 − 0.7071i |
| | 11 | 0.7071 + 0.7071i | −0.7071 + 0.7071i | −0.7071 + 0.7071i |
| | 12 | −0.7071 − 0.7071i | 0.7071 − 0.7071i | 0.7071 − 0.7071i |

A method as in any above, where the at least one saved sequence comprises at least one of:

| element | | | | |
|---|---|---|---|---|
| | 1 | −0.7071 − 0.7071i | −0.7071 + 0.7071i | −0.7071 − 0.7071i |
| | 2 | −0.7071 − 0.7071i | 0.7071 − 0.7071i | −0.7071 + 0.7071i |
| | 3 | −0.7071 + 0.7071i | 0.7071 − 0.7071i | −0.7071 − 0.7071i |
| | 4 | 0.7071 + 0.7071i | 0.7071 − 0.7071i | −0.7071 − 0.7071i |
| | 5 | −0.7071 + 0.7071i | 0.7071 − 0.7071i | −0.7071 − 0.7071i |
| | 6 | 0.7071 + 0.7071i | −0.7071 − 0.7071i | 0.7071 + 0.7071i |
| | 7 | −0.7071 − 0.7071i | 0.7071 − 0.7071i | −0.7071 − 0.7071i |
| | 8 | −0.7071 + 0.7071i | −0.7071 + 0.7071i | −0.7071 − 0.7071i |
| | 9 | 0.7071 + 0.7071i | −0.7071 + 0.7071i | −0.7071 − 0.7071i |
| | 10 | −0.7071 + 0.7071i | 0.7071 + 0.7071i | 0.7071 − 0.7071i |
| | 11 | 0.7071 + 0.7071i | 0.7071 − 0.7071i | 0.7071 + 0.7071i |
| | 12 | 0.7071 + 0.7071i | 0.7071 + 0.7071i | 0.7071 + 0.7071i |
| | 13 | −0.7071 + 0.7071i | −0.7071 + 0.7071i | 0.7071 + 0.7071i |
| | 14 | −0.7071 + 0.7071i | −0.7071 + 0.7071i | −0.7071 + 0.7071i |
| | 15 | 0.7071 − 0.7071i | −0.7071 − 0.7071i | 0.7071 + 0.7071i |
| | 16 | 0.7071 − 0.7071i | 0.7071 − 0.7071i | 0.7071 + 0.7071i |
| | 17 | −0.7071 − 0.7071i | 0.7071 + 0.7071i | −0.7071 + 0.7071i |
| | 18 | 0.7071 + 0.7071i | 0.7071 + 0.7071i | −0.7071 − 0.7071i |
| | 19 | −0.7071 − 0.7071i | −0.7071 − 0.7071i | −0.7071 − 0.7071i |
| | 20 | 0.7071 − 0.7071i | 0.7071 + 0.7071i | 0.7071 + 0.7071i |
| | 21 | −0.7071 + 0.7071i | −0.7071 + 0.7071i | −0.7071 + 0.7071i |
| | 22 | 0.7071 + 0.7071i | 0.7071 − 0.7071i | 0.7071 + 0.7071i |
| | 23 | 0.7071 + 0.7071i | −0.7071 − 0.7071i | 0.7071 + 0.7071i |
| | 24 | −0.7071 + 0.7071i | −0.7071 + 0.7071i | −0.7071 − 0.7071i |

| element | | |
|---|---|---|
| 1 | 0.7071 − 0.7071i | 0.7071 − 0.7071i |
| 2 | 0.7071 − 0.7071i | 0.7071 + 0.7071i |
| 3 | 0.7071 − 0.7071i | −0.7071 − 0.7071i |
| 4 | −0.7071 − 0.7071i | −0.7071 − 0.7071i |
| 5 | −0.7071 − 0.7071i | −0.7071 + 0.7071i |
| 6 | 0.7071 − 0.7071i | 0.7071 − 0.7071i |
| 7 | 0.7071 + 0.7071i | −0.7071 + 0.7071i |
| 8 | 0.7071 + 0.7071i | 0.7071 − 0.7071i |
| 9 | −0.7071 + 0.7071i | 0.7071 − 0.7071i |
| 10 | −0.7071 + 0.7071i | −0.7071 − 0.7071i |
| 11 | 0.7071 − 0.7071i | −0.7071 − 0.7071i |
| 12 | −0.7071 + 0.7071i | −0.7071 − 0.7071i |
| 13 | 0.7071 − 0.7071i | 0.7071 − 0.7071i |
| 14 | 0.7071 + 0.7071i | −0.7071 − 0.7071i |
| 15 | 0.7071 − 0.7071i | −0.7071 − 0.7071i |
| 16 | −0.7071 − 0.7071i | 0.7071 + 0.7071i |
| 17 | 0.7071 + 0.7071i | 0.7071 − 0.7071i |
| 18 | 0.7071 − 0.7071i | 0.7071 + 0.7071i |
| 19 | −0.7071 − 0.7071i | −0.7071 + 0.7071i |
| 20 | −0.7071 − 0.7071i | −0.7071 + 0.7071i |
| 21 | 0.7071 − 0.7071i | 0.7071 − 0.7071i |
| 22 | −0.7071 − 0.7071i | 0.7071 + 0.7071i |
| 23 | 0.7071 − 0.7071i | 0.7071 − 0.7071i |
| 24 | 0.7071 − 0.7071i | −0.7071 + 0.7071i |

A method as in any above, where the at least one saved sequence is used for sequence modulation on a physical uplink control channel. A method as in any above, where the at least one saved sequence is used for demodulation and sounding of at least one reference signal. A method as in the previous, where said reference signals have a length of 12. A method as in any above, where the at least one saved sequence is allocated using higher layer signaling (e.g., radio resource control signaling). A method as in any above, where the at least one saved sequence comprises at least one sequence index. A method as in the previous, where said at least one sequence index is cell-specific. A method as in any above, where the at least one saved sequence comprises at least one cell-specific sequence index. A method as in any above, where two consecutive cyclic shifts are used in multi-code modulation based on the at least one saved sequence.

A method as in any above, where the at least one saved sequence comprises at least one zero auto-correlation sequence. A method as in any above, where the at least one saved sequence comprises at least one random zero auto-correlation sequence. A method as in any above, where the at least one saved sequence comprises at least one random zero auto-correlation-like sequence. A method as in any above, where the at least one random zero auto-correlation-like sequence consists of 30 sequences. A method as in any above, where said at least one random zero auto-correlation-like sequence has a length of one resource block or two resource blocks. A method as in any above, where said at least one random zero auto-correlation-like sequence comprises at least one of first sequences having a length of 12 sequence elements or second sequences having a length of 24 sequence elements. A method as in any above, where the sequence elements of the at least one saved sequence comprise values restricted such that said values can be represented with two bits.

A method as in any above, where the at least one saved sequence is used for sequence modulation for at least one communication transmitted from a mobile station. A method as in any above, where the at least one saved sequence is used for sequence modulation for at least one communication received by a mobile station. A method as in any above, where the at least one saved sequence is used for sequence modulation for at least one communication transmitted from a base station. A method as in any above, where the at least one saved sequence is used for sequence modulation for at least one communication received by a base station. A method as in any above, where the at least one saved sequence is used for at least one wireless communication within an evolved universal terrestrial radio access network.

A method as in any above, where each sequence element of the sequences in the selected set of sequences has a frequency selected from QPSK constellation points on a unit circle in a complex plane. A method as in any above, where each sequence element of the sequences in the selected set of sequences has a frequency selected from four possible QPSK constellation points on a unit circle in a complex plane. A method as in any above, where randomly selecting the set of sequences comprises randomly selecting in a frequency domain. A method as in any above, where randomly selecting the set of sequences comprises randomly selecting only in a frequency domain. A method as in any above, where cyclic shifts of the sequences in the selected set of sequences are orthogonal to one another.

A method as in any above, where the at least one saved sequence comprises a plurality of saved sequences, the method further comprising: selecting a subset of the at least one saved sequence.

A method as in the previous, where selecting the subset of the plurality of saved sequences comprises: calculating cross-correlations for each pair of sequences of the plurality of saved sequences for a plurality of different cyclic shift combinations; selecting a cross-correlation value having a largest amplitude as a cross-correlation representative value for the cross-correlations between the corresponding pair of sequences; and iterating the sequences of the plurality of saved sequences in the following manner to obtain the subset of the plurality of saved sequences, where zero or more of the sequences of the plurality of saved sequences are removed on each iteration: for each sequence of the plurality of saved sequences, counting a first number of representative values exceeding a first cross-correlation threshold, a second number of representative values exceeding a second cross-correlation threshold and a third number of representative values exceeding a third cross-correlation threshold, where the first cross-correlation threshold is greater than the second cross-correlation threshold and the second cross-correlation threshold is greater than the third cross-correlation threshold; selecting for further consideration those sequences having the first number of representative values equal to a maximum first number of representative values over all sequences under consideration; selecting for further consideration those sequences having the second number of representative values equal to a maximum second number of representative values over all sequences under consideration; removing a sequence having a largest third number of representative values over all sequences under consideration; removing the cross-correlation representative values related to the removed sequence; and placing remaining sequences back under consideration.

A method as in any above, where selecting the subset of the plurality of saved sequences comprises: calculating cross-correlations for each pair of sequences of the plurality of saved sequences for a plurality of different cyclic shift combinations; selecting a cross-correlation value having a largest amplitude as a cross-correlation representative value for the cross-correlations between the corresponding pair of sequences; and iterating the sequences of the plurality of saved sequences in the following manner to obtain the subset of the plurality of saved sequences, where zero or more of the sequences of the plurality of saved sequences are removed on each iteration: for each sequence of the plurality of saved sequences, counting p numbers of representative values exceeding p different cross-correlation thresholds; selecting for further consideration those sequences having the p−p+1 number of representative values equal to a maximum p−p+1 number of representative values over all sequences under consideration; selecting for further consideration those sequences having the p−p+2 number of representative values equal to a maximum p−p+2 number of representative values over all sequences under consideration; and so on through the p−1 number of representative values; removing a sequence having a largest p-th number of representative values over all sequences under consideration; removing the cross-correlation representative values related to the removed sequence; and placing remaining sequences back under consideration.

A method as in any above, where calculating cross-correlations comprises calculating cross-correlations for each pair of sequences of the plurality of saved sequences for all cyclic shift combinations. A method as in any above, the method further comprising: selecting the first, second and third cross-correlation thresholds. A method as in any above, where iteration of the sequences of the plurality of saved sequences is performed until there remain a desired number of sequences or no sequences are found to be removed. A method as in any above, where the zero or more of the sequences of the plurality of saved sequences that are removed on each iteration consists of one sequence.

A method as in any above, where selecting the subset of the plurality of saved sequences comprises: calculating cross-correlations for each pair of sequences of the plurality of saved sequences for a first plurality of different cyclic shift combinations; selecting a cross-correlation value having a largest amplitude as a cross-correlation representative value for the cross-correlations between the corresponding pair of sequences; for each pair of sequences, calculating mean squared difference between the cross-correlations and m/sqrt(N) over a second plurality of different cyclic shift combination, where m comprises a scaling factor and N comprises a sequence length; iterating the sequences of the plurality of saved sequences in the following manner to obtain the subset of the plurality of saved sequences, where zero or more of the sequences of the plurality of saved sequences are removed on each iteration: for each sequence of the plurality of saved sequences, counting a number of representative values exceeding a cross-correlation threshold; selecting for further consideration those sequences having the number of representative values equal to a maximum number of representative values over all sequences under consideration; removing a sequence having a largest mean squared difference over all sequences under consideration; removing the cross-correlation representative values and the mean squared difference values related to the removed sequence; and placing remaining sequences back under consideration.

A method as in any above, where selecting the subset of the plurality of saved sequences comprises: calculating cross-correlations for each pair of sequences of the plurality of saved sequences for a first plurality of different cyclic shift combinations; selecting a cross-correlation value having a largest amplitude as a cross-correlation representative value for the cross-correlations between the corresponding pair of sequences; for each pair of sequences, calculating mean cross-correlation between the pair of sequences; iterating the sequences of the plurality of saved sequences in the following manner to obtain the subset of the plurality of saved sequences, where zero or more of the sequences of the plurality of saved sequences are removed on each iteration: for each sequence of the plurality of saved sequences, counting a number of representative values exceeding a cross-correlation threshold; selecting for further consideration those sequences having the number of representative values equal to a maximum number of representative values over all sequences under consideration; removing a sequence having a largest mean cross-correlation over all sequences under consideration; removing the cross-correlation representative values and the mean cross-correlation values related to the removed sequence; and placing remaining sequences back under consideration.

A method as in any above, where calculating cross-correlations comprises calculating cross-correlations for each pair of sequences of the plurality of saved sequences for all cyclic shift combinations. A method as in any above, where iteration of the sequences of the plurality of saved sequences is performed until there remain a desired number of sequences or no sequences are found to be removed. A method as in any above, where the zero or more of the sequences of the plurality of saved sequences that are removed on each iteration consists of one sequence. A method as in any above, where the first plurality of different cyclic shift combinations comprises the second plurality of different cyclic shift combinations. A method as in any above, the method further comprising: selecting at least one of the cross-correlation threshold or the scaling factor m. A method as in any above, where a value 1/sqrt(N) comprises a cross-correlation value between Zad-off-Chu sequences.

A method as in any above, the method further comprising: using the selected subset for at least one wireless communication.

A method as in any above, where the subset of the plurality of saved sequences is used for sequence modulation on a physical uplink control channel. A method as in any above, where the subset of the plurality of saved sequences is used for demodulation and sounding of at least one reference signal. A method as in the previous, where said reference signals have a length of 12. A method as in any above, where the subset of the plurality of saved sequences is allocated using higher layer signaling (e.g., radio resource control signaling). A method as in any above, where the subset of the plurality of saved sequences at least one sequence index. A method as in the previous, where said at least one sequence index is cell-specific. A method as in any above, where the subset of the plurality of saved sequences comprises at least one cell-specific sequence index. A method as in any above, where two consecutive cyclic shifts are used in multi-code modulation based on the subset of the plurality of saved sequences.

A method as in any above, where the subset of the plurality of saved sequences comprises at least one zero auto-correlation sequence. A method as in any above, where the subset of the plurality of saved sequences comprises at least one random zero auto-correlation sequence. A method as in any above, where the subset of the plurality of saved sequences comprises at least one random zero auto-correlation-like sequence. A method as in any above, where the at least one zero auto-correlation-like sequence consists of 30 sequences. A method as in any above, where said at least one random zero auto-correlation-like sequence has a length of one resource block or two resource blocks. A method as in any above, where said at least one random zero auto-correlation-like sequences comprises at least one of first sequences having a length of 12 sequence elements or second sequences having a length of 24 sequence elements. A method as in any above, where the sequence elements of the subset of the plurality of saved sequences comprise values restricted such that said values can be represented with two bits.

A method as in any above, where the subset of the plurality of saved sequences is used for sequence modulation for at least one communication transmitted from a mobile station. A method as in any above, where the subset of the plurality of saved sequences is used for sequence modulation for at least one communication received by a mobile station. A method as in any above, where the subset of the plurality of saved sequences is used for sequence modulation for at least one communication transmitted from a base station. A method as in any above, where the subset of the plurality of saved sequences is used for sequence modulation for at least one communication received by a base station. A method as in any above, where the subset of the plurality of saved sequences is used for at least one wireless communication within an evolved universal terrestrial radio access network.

A method as in any above, wherein the method is implemented by a computer program. A method as in any above, wherein the method is implemented by a program of instructions tangibly embodied on a program storage device readable by a machine, said program of instructions executable by the machine for performing operations, said operations comprising steps of the method. A method as in any of the above, and further comprising one or more additional aspects of the exemplary embodiments as described elsewhere herein.

(2) In another non-limiting, exemplary embodiment, a program storage device readable by a machine, tangibly embodying a program of instructions executable by the machine for performing operations, said operations comprising: randomly selecting a set of sequences with each sequence comprised of sequence elements, each sequence element having a frequency selected from constellation points on a unit circle in a complex plane, where the selected set of sequences comprises a candidate set of sequences (801); calculating a first cubic metric for each sequence of the candidate set of sequences, where the first cubic metric is for single code modulation (802); and in response to the first cubic metric being larger than at least one threshold, removing the corresponding sequence from the candidate set of sequences to obtain at least one saved sequence (803).

A program storage device as in the previous, and further comprising one or more additional aspects of the exemplary embodiments as described elsewhere herein, such as those further aspects described above with respect to one or more exemplary methods (i.e., number (1) above).

(3) In another non-limiting, exemplary embodiment, an apparatus comprising: a memory and at least one processor, where the at least one processor is configured to: randomly select a set of sequences with each sequence comprised of sequence elements, each sequence element having a frequency selected from constellation points on a unit circle in a complex plane, where the selected set of sequences comprises a candidate set of sequences; calculate a first cubic metric for each sequence of the candidate set of sequences, where the first cubic metric is for single code modulation; and in response to the first cubic metric being larger than at least one threshold, remove the corresponding sequence from the candidate set of sequences to obtain at least one saved sequence, where the at least one saved sequence is stored on the memory.

An apparatus as in the previous, and further comprising one or more additional aspects of the exemplary embodiments as described elsewhere herein, such as those further aspects described above with respect to one or more exemplary methods (i.e., number (1) above). An apparatus as in any above, further comprising at least one of a transceiver or an antenna. An apparatus as in any above, embodied in an integrated circuit.

(4) In another non-limiting, exemplary embodiment, an apparatus comprising: means for randomly selecting a set of sequences with each sequence comprised of sequence elements, each sequence element having a frequency selected from constellation points on a unit circle in a complex plane, where the selected set of sequences comprises a candidate set of sequences; means for calculating a first cubic metric for each sequence of the candidate set of sequences, where the first cubic metric is for single code modulation; and means, in response to the first cubic metric being larger than at least one threshold, for removing the corresponding sequence from the candidate set of sequences to obtain at least one saved sequence.

An apparatus as in the previous, and further comprising one or more additional aspects of the exemplary embodiments as described elsewhere herein, such as those further aspects described above with respect to one or more exemplary methods (i.e., number (1) above). An apparatus as in any above, further comprising means for communicating, such as means for transmitting and/or means for receiving, as non-limiting examples. An apparatus as in any above, embodied in an integrated circuit. An apparatus as in any above, further comprising means for storing the at least one saved sequence. An apparatus as in the previous, where the means for storing comprises a memory. An apparatus as in any above, where the means for randomly selecting, the means for calculating and the means for removing comprise at least one processor.

(5) In another non-limiting, exemplary embodiment, an apparatus comprising: first circuitry configured to randomly select a set of sequences with each sequence comprised of sequence elements, each sequence element having a frequency selected from constellation points on a unit circle in a complex plane, where the selected set of sequences comprises a candidate set of sequences; second circuitry configured to calculate a first cubic metric for each sequence of the candidate set of sequences, where the first cubic metric is for single code modulation; and third circuitry configured, in response to the first cubic metric being larger than at least one threshold, to remove the corresponding sequence from the candidate set of sequences to obtain at least one saved sequence.

An apparatus as in the previous, and further comprising one or more additional aspects of the exemplary embodiments as described elsewhere herein, such as those further aspects described above with respect to one or more exemplary methods (i.e., number (1) above). An apparatus as in any above, further comprising communication circuitry configured to at least one of transmit or receive communications to or from another apparatus. An apparatus as in any above, embodied in an integrated circuit. An apparatus as in any above, further comprising storage circuitry configured to store the at least one saved sequence.

Figure 12:
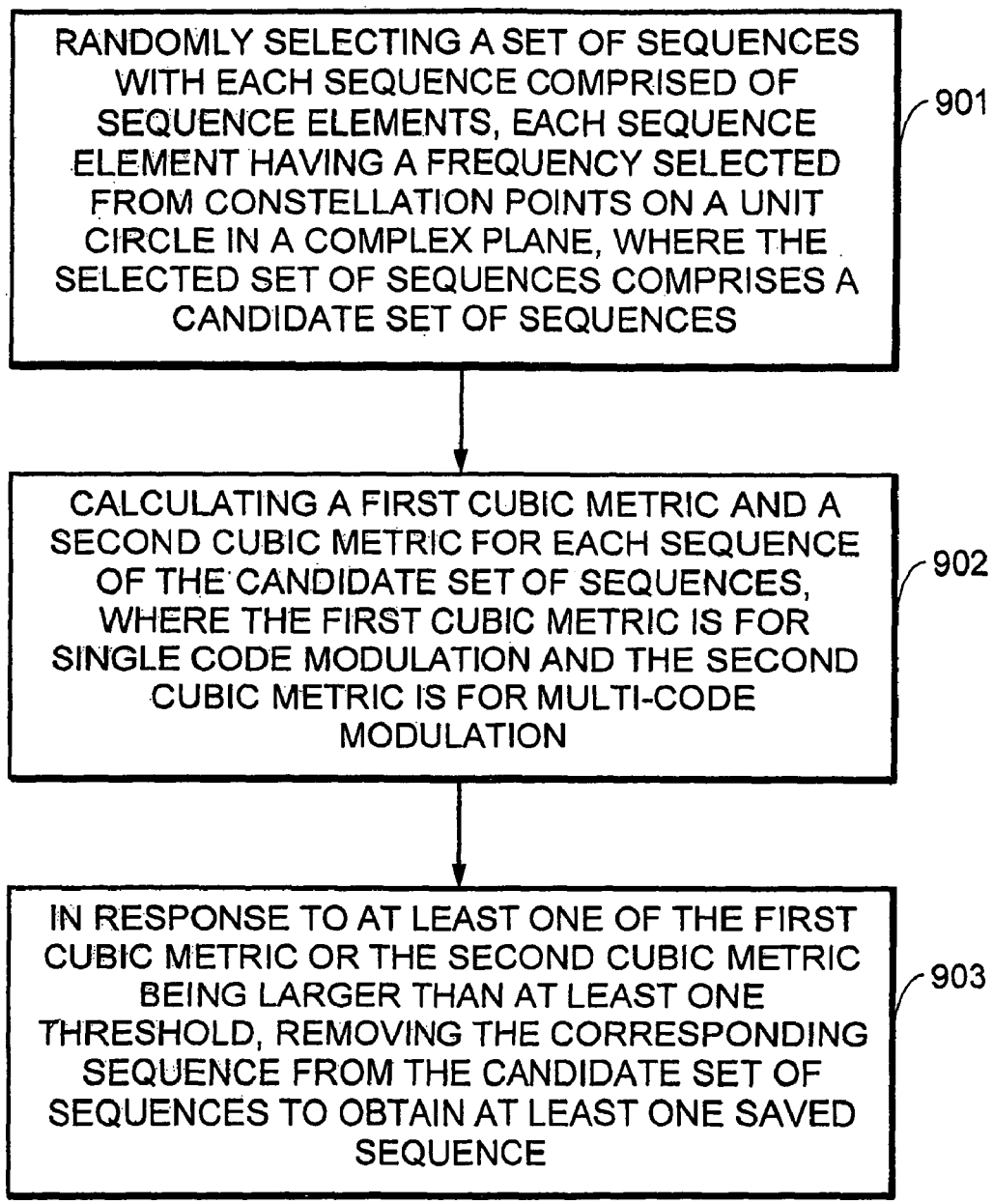
FIG. 12 is another logic flow diagram in accordance with exemplary embodiments of a another method, and a computer program product, in accordance with this invention for use in selecting a set of the exemplary sequences.

(6) In another non-limiting, exemplary embodiment, and as shown in FIG. 12, a method comprising: randomly selecting a set of sequences with each sequence comprised of sequence elements, each sequence element having a frequency selected from constellation points on a unit circle in a complex plane, where the selected set of sequences comprises a candidate set of sequences (901); calculating a first cubic metric and a second cubic metric for each sequence of the candidate set of sequences, where the first cubic metric is for single code modulation and the second cubic metric is for multi-code modulation (902); and in response to at least one of the first cubic metric or the second cubic metric being larger than at least one threshold, removing the corresponding sequence from the candidate set of sequences to obtain at least one saved sequence (903).

A method as in the previous, and further comprising one or more additional aspects of the exemplary embodiments as described elsewhere herein, such as those further aspects described above with respect to one or more exemplary methods (i.e., number (1) above). A method as in any above, implemented by a computer program or an apparatus, similar to one or more of those exemplary embodiments identified above as (2), (3), (4) and/or (5).

Figure 13:
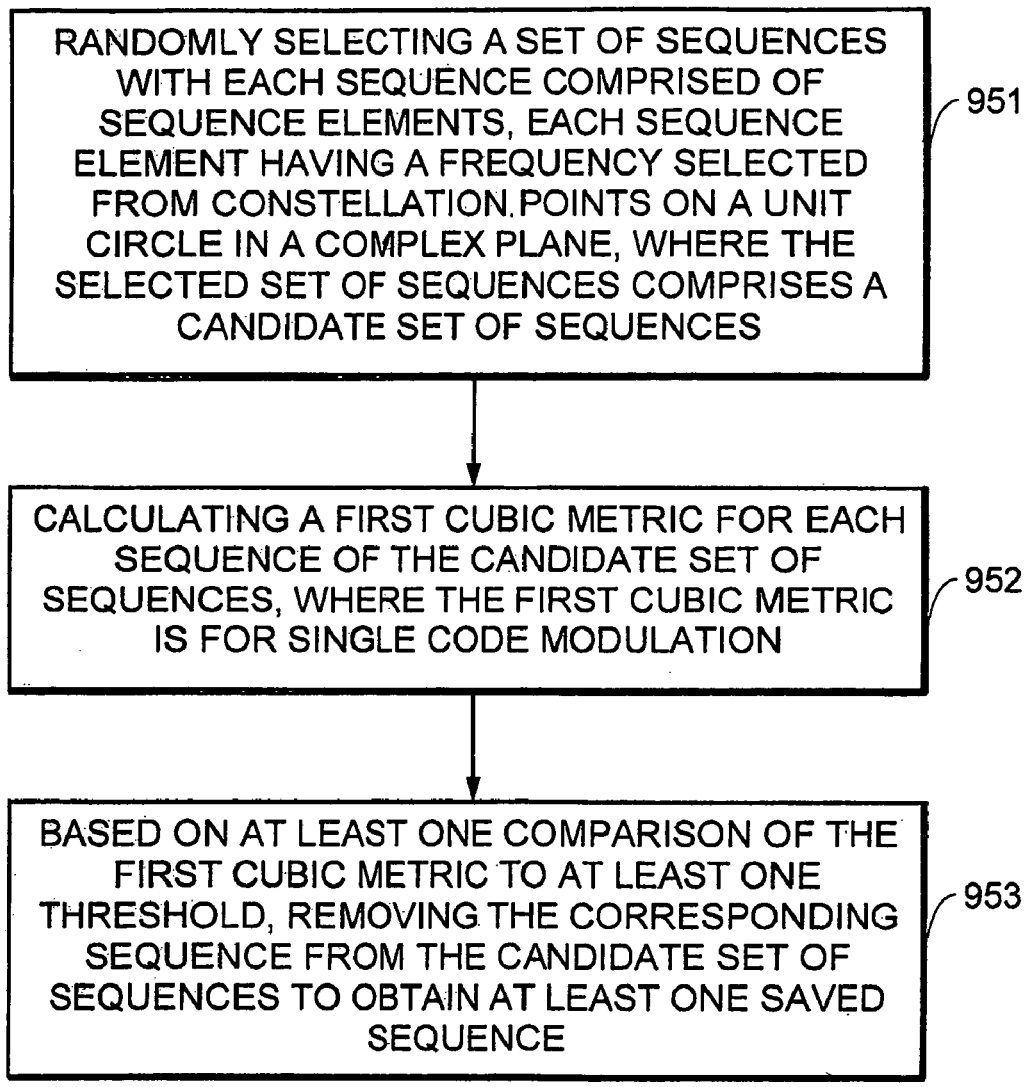
FIG. 13 is another logic flow diagram in accordance with exemplary embodiments of a another method, and a computer program product, in accordance with this invention for use in selecting a set of the exemplary sequences.

(7) In another non-limiting, exemplary embodiment, and as shown in FIG. 13, a method comprising: randomly selecting a set of sequences with each sequence comprised of sequence elements, each sequence element having a frequency selected from constellation points on a unit circle in a complex plane, where the selected set of sequences comprises a candidate set of sequences (951); calculating a first cubic metric for each sequence of the candidate set of sequences, where the first cubic metric is for single code modulation (952); and based on at least one comparison of the first cubic metric to at least one threshold, removing an unsuitable corresponding sequence from the candidate set of sequences to obtain at least one saved sequence (953).

A method as in the previous, where an unsuitable corresponding sequence comprises a sequence having a first cubic metric larger than the at least one threshold. A method as in any of the above, and further comprising one or more additional aspects of the exemplary embodiments as described elsewhere herein, such as those further aspects described above with respect to one or more exemplary methods (i.e., number (1) above). A method as in any above, implemented by a computer program or an apparatus, similar to one or more of those exemplary embodiments identified above as (2), (3), (4), (5) and/or (6).

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device readable by a machine, tangibly embodying a program of instructions executable by the machine for performing operations. The operations comprise steps of utilizing the exemplary embodiments or steps of the method.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Note further that the blocks shown in the logic flow diagrams of FIGS. 4, 7, 10 and 11 may also be viewed as a plurality of interconnected functional circuits/functions that operate as described.

As was noted above, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

As but one example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems. Further, the exemplary embodiments of this invention are not constrained for use with any specific frame format, numbers of long blocks within a frame, sub-carrier mapping scheme, type of modulation and/or precoding technique, as non-limiting examples, that may have been referred to above.

In addition, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
  randomly selecting a set of sequences with each sequence comprised of sequence elements, each sequence element having a frequency selected from constellation points on a unit circle in a complex plane, where the selected set of sequences comprises a candidate set of sequences;
  calculating a first cubic metric for each sequence of the candidate set of sequences, where the first cubic metric is for single code modulation; and
  in response to the first cubic metric being larger than at least one threshold, removing the corresponding sequence from the candidate set of sequences to obtain at least one saved sequence.

2. A method as in claim 1, further comprising:
calculating a second cubic metric for each sequence of the candidate set of sequences, where the second cubic metric is for multi-code modulation; and
in response to at least one of the first cubic metric or the second cubic metric being larger than the at least one threshold, removing the corresponding sequence from the candidate set of sequences to obtain the at least one saved sequence.

3. A method as in claim 2, where the at least one threshold comprises a first threshold and a second threshold, where removing the corresponding sequence is performed in response to at least one of the first cubic metric being larger than the first threshold or the second cubic metric being larger than the second threshold.

4. A method as in claim 1, further comprising:
calculating cross-correlations for a plurality of different cyclic shift combinations of each sequence of the candidate set of sequences against a second sequence set;
selecting a cross-correlation value having a largest amplitude as a representative cross-correlation value for the cross-correlations between the corresponding sequence and the second sequence set; and
in response to the representative cross-correlation value being larger than a threshold, removing the corresponding sequence from the candidate set of sequences.

5. A method as in claim 4, where the second sequence set is comprised of second sequences having a length of 36 sequence elements or second sequences having a length of 12 sequence elements.

6. A method as in claim 1, where the at least one saved sequence is used for sequence modulation on a physical uplink control channel.

7. A method as in claim 1, where two consecutive cyclic shifts are used in multi-code modulation based on the at least one saved sequence.

8. A method as in claim 1, where the at least one saved sequence comprises a plurality of random zero auto-correlation-like sequences.

9. A method as in claim 1, where each sequence element of the sequences in the selected set of sequences has a frequency selected from four possible constellation points on a unit circle.

10. A method as in claim 1, where the at least one saved sequence has a length of one resource block or two resource blocks.

11. A method as in claim 1, where the at least one saved sequence comprises at least one of:

| element | | | | | |
|---|---|---|---|---|---|
| | 1 | 0.7071 − 0.7071i | −0.7071 + 0.7071i | 0.7071 + 0.7071i | 0.7071 + 0.7071i |
| | 2 | −0.7071 + 0.7071i | 0.7071 + 0.7071i | 0.7071 + 0.7071i | −0.7071 + 0.7071i |
| | 3 | 0.7071 − 0.7071i | 0.7071 − 0.7071i | −0.7071 − 0.7071i | 0.7071 + 0.7071i |
| | 4 | 0.7071 + 0.7071i | 0.7071 − 0.7071i | −0.7071 − 0.7071i | 0.7071 − 0.7071i |
| | 5 | −0.7071 − 0.7071i | −0.7071 + 0.7071i | −0.7071 − 0.7071i | 0.7071 + 0.7071i |
| | 6 | −0.7071 − 0.7071i | −0.7071 + 0.7071i | −0.7071 − 0.7071i | −0.7071 + 0.7071i |
| | 7 | −0.7071 − 0.7071i | −0.7071 − 0.7071i | 0.7071 − 0.7071i | −0.7071 + 0.7071i |
| | 8 | −0.7071 − 0.7071i | 0.7071 + 0.7071i | −0.7071 + 0.7071i | −0.7071 − 0.7071i |
| | 9 | −0.7071 − 0.7071i | −0.7071 + 0.7071i | −0.7071 − 0.7071i | 0.7071 − 0.7071i |
| | 10 | 0.7071 + 0.7071i | 0.7071 + 0.7071i | 0.7071 + 0.7071i | 0.7071 − 0.7071i |
| | 11 | 0.7071 − 0.7071i | −0.7071 + 0.7071i | −0.7071 − 0.7071i | −0.7071 + 0.7071i |
| | 12 | −0.7071 − 0.7071i | −0.7071 + 0.7071i | −0.7071 + 0.7071i | 0.7071 − 0.7071i |

| element | | | | |
|---|---|---|---|---|
| | 1 | −0.7071 − 0.7071i | −0.7071 − 0.7071i | 0.7071 + 0.7071i |
| | 2 | −0.7071 + 0.7071i | 0.7071 + 0.7071i | −0.7071 + 0.7071i |
| | 3 | 0.7071 + 0.7071i | 0.7071 + 0.7071i | −0.7071 + 0.7071i |
| | 4 | 0.7071 + 0.7071i | −0.7071 + 0.7071i | −0.7071 + 0.7071i |
| | 5 | −0.7071 − 0.7071i | −0.7071 − 0.7071i | 0.7071 − 0.7071i |
| | 6 | 0.7071 + 0.7071i | −0.7071 + 0.7071i | 0.7071 − 0.7071i |
| | 7 | −0.7071 − 0.7071i | −0.7071 − 0.7071i | −0.7071 − 0.7071i |
| | 8 | −0.7071 − 0.7071i | −0.7071 − 0.7071i | −0.7071 − 0.7071i |
| | 9 | 0.7071 − 0.7071i | −0.7071 + 0.7071i | 0.7071 + 0.7071i |
| | 10 | 0.7071 − 0.7071i | 0.7071 + 0.7071i | −0.7071 − 0.7071i |
| | 11 | 0.7071 + 0.7071i | −0.7071 + 0.7071i | −0.7071 + 0.7071i |
| | 12 | −0.7071 − 0.7071i | 0.7071 − 0.7071i | 0.7071 − 0.7071i. |

12. A method as in claim 1, where the at least one saved sequence comprises at least one of:

| element | | | | |
|---|---|---|---|---|
| | 1 | −0.7071 − 0.7071i | −0.7071 + 0.7071i | −0.7071 − 0.7071i |
| | 2 | −0.7071 − 0.7071i | 0.7071 − 0.7071i | −0.7071 + 0.7071i |
| | 3 | −0.7071 + 0.7071i | 0.7071 − 0.7071i | −0.7071 − 0.7071i |
| | 4 | 0.7071 + 0.7071i | 0.7071 − 0.7071i | −0.7071 − 0.7071i |
| | 5 | −0.7071 + 0.7071i | 0.7071 − 0.7071i | −0.7071 − 0.7071i |
| | 6 | 0.7071 + 0.7071i | −0.7071 − 0.7071i | 0.7071 + 0.7071i |
| | 7 | −0.7071 − 0.7071i | 0.7071 − 0.7071i | −0.7071 − 0.7071i |
| | 8 | −0.7071 + 0.7071i | −0.7071 − 0.7071i | −0.7071 − 0.7071i |
| | 9 | 0.7071 + 0.7071i | −0.7071 + 0.7071i | −0.7071 + 0.7071i |
| | 10 | −0.7071 + 0.7071i | 0.7071 + 0.7071i | 0.7071 − 0.7071i |
| | 11 | 0.7071 + 0.7071i | 0.7071 − 0.7071i | 0.7071 + 0.7071i |
| | 12 | 0.7071 + 0.7071i | 0.7071 − 0.7071i | 0.7071 + 0.7071i |
| | 13 | −0.7071 + 0.7071i | −0.7071 + 0.7071i | 0.7071 + 0.7071i |
| | 14 | −0.7071 + 0.7071i | −0.7071 + 0.7071i | −0.7071 + 0.7071i |

-continued

| | | | |
|---|---|---|---|
| 15 | 0.7071 − 0.7071i | −0.7071 + 0.7071i | 0.7071 + 0.7071i |
| 16 | 0.7071 − 0.7071i | 0.7071 − 0.7071i | 0.7071 − 0.7071i |
| 17 | −0.7071 − 0.7071i | 0.7071 + 0.7071i | −0.7071 + 0.7071i |
| 18 | 0.7071 + 0.7071i | 0.7071 + 0.7071i | −0.7071 − 0.7071i |
| 19 | −0.7071 − 0.7071i | −0.7071 − 0.7071i | −0.7071 − 0.7071i |
| 20 | 0.7071 − 0.7071i | 0.7071 + 0.7071i | 0.7071 + 0.7071i |
| 21 | −0.7071 + 0.7071i | −0.7071 + 0.7071i | −0.7071 + 0.7071i |
| 22 | 0.7071 + 0.7071i | 0.7071 − 0.7071i | 0.7071 + 0.7071i |
| 23 | 0.7071 + 0.7071i | −0.7071 − 0.7071i | 0.7071 + 0.7071i |
| 24 | −0.7071 + 0.7071i | −0.7071 + 0.7071i | −0.7071 − 0.7071i |

| | | | |
|---|---|---|---|
| element 1 | 0.7071 − 0.7071i | 0.7071 − 0.7071i | |
| 2 | 0.7071 − 0.7071i | 0.7071 + 0.7071i | |
| 3 | 0.7071 − 0.7071i | −0.7071 − 0.7071i | |
| 4 | −0.7071 − 0.7071i | −0.7071 − 0.7071i | |
| 5 | −0.7071 − 0.7071i | −0.7071 + 0.7071i | |
| 6 | 0.7071 − 0.7071i | 0.7071 − 0.7071i | |
| 7 | 0.7071 + 0.7071i | −0.7071 + 0.7071i | |
| 8 | 0.7071 + 0.7071i | 0.7071 − 0.7071i | |
| 9 | −0.7071 + 0.7071i | 0.7071 − 0.7071i | |
| 10 | −0.7071 + 0.7071i | −0.7071 − 0.7071i | |
| 11 | 0.7071 − 0.7071i | −0.7071 − 0.7071i | |
| 12 | −0.7071 + 0.7071i | −0.7071 − 0.7071i | |
| 13 | 0.7071 − 0.7071i | 0.7071 − 0.7071i | |
| 14 | 0.7071 + 0.7071i | −0.7071 − 0.7071i | |
| 15 | 0.7071 − 0.7071i | −0.7071 − 0.7071i | |
| 16 | −0.7071 − 0.7071i | 0.7071 + 0.7071i | |
| 17 | 0.7071 + 0.7071i | 0.7071 − 0.7071i | |
| 18 | 0.7071 − 0.7071i | 0.7071 + 0.7071i | |
| 19 | −0.7071 − 0.7071i | −0.7071 + 0.7071i | |
| 20 | −0.7071 − 0.7071i | −0.7071 + 0.7071i | |
| 21 | 0.7071 + 0.7071i | 0.7071 − 0.7071i | |
| 22 | −0.7071 − 0.7071i | 0.7071 + 0.7071i | |
| 23 | 0.7071 − 0.7071i | 0.7071 − 0.7071i | |
| 24 | 0.7071 − 0.7071i | −0.7071 + 0.7071i. | |

13. A method as in claim 1, where the at least one saved sequence is used for sequence modulation for at least one communication transmitted from a mobile station.

14. A method as in claim 1, where the at least one saved sequence is used for sequence modulation for at least one communication received by a base station.

15. A method as in claim 1, where the at least one saved sequence is used for at least one wireless communication within an evolved universal terrestrial radio access network.

16. A method as in claim 1, where the at least one saved sequence comprises a plurality of saved sequences, the method further comprising: selecting a subset of the plurality of saved sequences.

17. A method as in claim 16, where selecting the subset of the plurality of saved sequences comprises:
calculating cross-correlations for each pair of sequences of the plurality of saved sequences for a plurality of different cyclic shift combinations;
selecting a cross-correlation value having a largest amplitude as a cross-correlation representative value for the cross-correlations between the corresponding pair of sequences; and
iterating the sequences of the plurality of saved sequences in the following manner to obtain the subset of the plurality of saved sequences, where zero or more of the sequences of the plurality of saved sequences are removed on each iteration:
for each sequence of the plurality of saved sequences, counting a first number of representative values exceeding a first cross-correlation threshold, a second number of representative values exceeding a second cross-correlation threshold and a third number of representative values exceeding a third cross-correlation threshold, where the first cross-correlation threshold is greater than the second cross-correlation threshold and the second cross-correlation threshold is greater than the third cross-correlation threshold;
selecting for further consideration those sequences having the first number of representative values equal to a maximum first number of representative values over all sequences under consideration;
selecting for further consideration those sequences having the second number of representative values equal to a maximum second number of representative values over all sequences under consideration;
removing a sequence having a largest third number of representative values over all sequences under consideration;
removing the cross-correlation representative values related to the removed sequence; and
placing remaining sequences back under consideration.

18. A method as in claim 16, where selecting the subset of the plurality of saved sequences comprises:
calculating cross-correlations for each pair of sequences of the plurality of saved sequences for a first plurality of different cyclic shift combinations;
selecting a cross-correlation value having a largest amplitude as a cross-correlation representative value for the cross-correlations between the corresponding pair of sequences;
for each pair of sequences, calculating mean squared difference between the cross-correlations and m/sqrt(N) over a second plurality of different cyclic shift combination, where m comprises a scaling factor and N comprises a sequence length;
iterating the sequences of the plurality of saved sequences in the following manner to obtain the subset of the plurality of saved sequences, where zero or more of the sequences of the plurality of saved sequences are removed on each iteration:
for each sequence of the plurality of saved sequences, counting a number of representative values exceeding a cross-correlation threshold;
selecting for further consideration those sequences having the number of representative values equal to a maximum number of representative values over all sequences under consideration;
removing a sequence having a largest mean squared difference over all sequences under consideration;
removing the cross-correlation representative values and the mean squared difference values related to the removed sequence; and
placing remaining sequences back under consideration.

19. A non-transitory program storage device readable by a machine, tangibly embodying a program of instructions executable by the machine for performing operations, said operations comprising:

randomly selecting a set of sequences with each sequence comprised of sequence elements, each sequence element having a frequency selected from constellation points on a unit circle in a complex plane, where the selected set of sequences comprises a candidate set of sequences;

calculating a first cubic metric for each sequence of the candidate set of sequences, where the first cubic metric is for single code modulation; and in response to the first cubic metric being larger than at least one threshold, removing the corresponding sequence from the candidate set of sequences to obtain at least one saved sequence.

20. A program storage device as in claim 19, further comprising:

calculating a second cubic metric for each sequence of the candidate set of sequences, where the second cubic metric is for multi-code modulation; and in response to at least one of the first cubic metric or the second cubic metric being larger than the at least one threshold, removing the corresponding sequence from the candidate set of sequences to obtain the at least one saved sequence.

21. A program storage device as in claim 20, where the at least one threshold comprises a first threshold and a second threshold, where removing the corresponding sequence is performed in response to at least one of the first cubic metric being larger than the first threshold or the second cubic metric being larger than the second threshold.

22. A program storage device as in claim 19, the operations further comprising:

calculating cross-correlations for a plurality of different cyclic shift combinations of each sequence of the candidate set of sequences against a second sequence set;

selecting a cross-correlation value having a largest amplitude as a representative cross-correlation value for the cross-correlations between the corresponding sequence and the second sequence set; and in response to the representative cross-correlation value being larger than a threshold, removing the corresponding sequence from the candidate set of sequences.

23. A program storage device as in claim 19, where the at least one saved sequence comprises at least one of:

| element | | | | | |
|---|---|---|---|---|---|
| | 1 | 0.7071 − 0.7071i | −0.7071 + 0.7071i | 0.7071 + 0.7071i | 0.7071 + 0.7071i |
| | 2 | −0.7071 + 0.7071i | 0.7071 + 0.7071i | 0.7071 + 0.7071i | −0.7071 + 0.7071i |
| | 3 | 0.7071 − 0.7071i | 0.7071 − 0.7071i | −0.7071 − 0.7071i | 0.7071 + 0.7071i |
| | 4 | 0.7071 + 0.7071i | 0.7071 − 0.7071i | −0.7071 − 0.7071i | 0.7071 − 0.7071i |
| | 5 | −0.7071 − 0.7071i | −0.7071 + 0.7071i | −0.7071 − 0.7071i | 0.7071 + 0.7071i |
| | 6 | −0.7071 − 0.7071i | −0.7071 + 0.7071i | −0.7071 − 0.7071i | −0.7071 + 0.7071i |
| | 7 | −0.7071 − 0.7071i | −0.7071 − 0.7071i | 0.7071 − 0.7071i | −0.7071 + 0.7071i |
| | 8 | −0.7071 − 0.7071i | 0.7071 + 0.7071i | −0.7071 + 0.7071i | −0.7071 − 0.7071i |
| | 9 | −0.7071 − 0.7071i | −0.7071 + 0.7071i | −0.7071 − 0.7071i | 0.7071 − 0.7071i |
| | 10 | 0.7071 + 0.7071i | 0.7071 + 0.7071i | 0.7071 + 0.7071i | 0.7071 − 0.7071i |
| | 11 | 0.7071 − 0.7071i | −0.7071 + 0.7071i | −0.7071 − 0.7071i | −0.7071 + 0.7071i |
| | 12 | −0.7071 − 0.7071i | −0.7071 + 0.7071i | −0.7071 − 0.7071i | 0.7071 − 0.7071i |

| element | | | | |
|---|---|---|---|---|
| | 1 | −0.7071 − 0.7071i | −0.7071 − 0.7071i | 0.7071 + 0.7071i |
| | 2 | −0.7071 + 0.7071i | 0.7071 + 0.7071i | −0.7071 + 0.7071i |
| | 3 | 0.7071 + 0.7071i | 0.7071 + 0.7071i | −0.7071 + 0.7071i |
| | 4 | 0.7071 + 0.7071i | −0.7071 + 0.7071i | −0.7071 + 0.7071i |
| | 5 | −0.7071 − 0.7071i | −0.7071 − 0.7071i | 0.7071 − 0.7071i |
| | 6 | 0.7071 + 0.7071i | −0.7071 + 0.7071i | 0.7071 − 0.7071i |
| | 7 | −0.7071 − 0.7071i | −0.7071 − 0.7071i | −0.7071 − 0.7071i |
| | 8 | −0.7071 − 0.7071i | −0.7071 − 0.7071i | −0.7071 − 0.7071i |
| | 9 | 0.7071 − 0.7071i | −0.7071 + 0.7071i | 0.7071 + 0.7071i |
| | 10 | 0.7071 − 0.7071i | 0.7071 + 0.7071i | −0.7071 − 0.7071i |
| | 11 | 0.7071 + 0.7071i | −0.7071 + 0.7071i | −0.7071 + 0.7071i |
| | 12 | −0.7071 − 0.7071i | 0.7071 − 0.7071i | 0.7071 − 0.7071i. |

24. A program storage device as in claim 19, where the at least one saved sequence comprises at least one of:

| element | | | | |
|---|---|---|---|---|
| | 1 | −0.7071 − 0.7071i | −0.7071 + 0.7071i | −0.7071 − 0.7071i |
| | 2 | −0.7071 − 0.7071i | 0.7071 − 0.7071i | −0.7071 + 0.7071i |
| | 3 | −0.7071 + 0.7071i | 0.7071 − 0.7071i | −0.7071 − 0.7071i |
| | 4 | 0.7071 + 0.7071i | 0.7071 − 0.7071i | −0.7071 − 0.7071i |
| | 5 | −0.7071 + 0.7071i | 0.7071 − 0.7071i | −0.7071 − 0.7071i |
| | 6 | 0.7071 + 0.7071i | −0.7071 − 0.7071i | 0.7071 + 0.7071i |
| | 7 | −0.7071 − 0.7071i | 0.7071 − 0.7071i | −0.7071 − 0.7071i |
| | 8 | −0.7071 + 0.7071i | −0.7071 + 0.7071i | −0.7071 − 0.7071i |
| | 9 | 0.7071 + 0.7071i | −0.7071 + 0.7071i | −0.7071 − 0.7071i |
| | 10 | −0.7071 + 0.7071i | 0.7071 + 0.7071i | 0.7071 − 0.7071i |
| | 11 | 0.7071 + 0.7071i | 0.7071 − 0.7071i | 0.7071 + 0.7071i |
| | 12 | 0.7071 + 0.7071i | 0.7071 − 0.7071i | 0.7071 + 0.7071i |
| | 13 | −0.7071 + 0.7071i | −0.7071 + 0.7071i | 0.7071 + 0.7071i |
| | 14 | −0.7071 + 0.7071i | −0.7071 − 0.7071i | −0.7071 − 0.7071i |
| | 15 | 0.7071 − 0.7071i | −0.7071 + 0.7071i | 0.7071 + 0.7071i |
| | 16 | 0.7071 − 0.7071i | 0.7071 − 0.7071i | 0.7071 − 0.7071i |
| | 17 | −0.7071 − 0.7071i | 0.7071 + 0.7071i | −0.7071 + 0.7071i |
| | 18 | 0.7071 + 0.7071i | 0.7071 + 0.7071i | −0.7071 − 0.7071i |

-continued

| | | | | |
|---|---|---|---|---|
| | 19 | −0.7071 − 0.7071i | −0.7071 − 0.7071i | −0.7071 − 0.7071i |
| | 20 | 0.7071 − 0.7071i | 0.7071 + 0.7071i | 0.7071 + 0.7071i |
| | 21 | −0.7071 + 0.7071i | −0.7071 + 0.7071i | −0.7071 + 0.7071i |
| | 22 | 0.7071 + 0.7071i | 0.7071 − 0.7071i | 0.7071 + 0.7071i |
| | 23 | 0.7071 + 0.7071i | −0.7071 − 0.7071i | 0.7071 + 0.7071i |
| | 24 | −0.7071 + 0.7071i | −0.7071 + 0.7071i | −0.7071 − 0.7071i |

| | | | |
|---|---|---|---|
| element | 1 | 0.7071 − 0.7071i | 0.7071 − 0.7071i |
| | 2 | 0.7071 − 0.7071i | 0.7071 + 0.7071i |
| | 3 | 0.7071 − 0.7071i | −0.7071 − 0.7071i |
| | 4 | −0.7071 − 0.7071i | −0.7071 − 0.7071i |
| | 5 | −0.7071 − 0.7071i | −0.7071 + 0.7071i |
| | 6 | 0.7071 − 0.7071i | 0.7071 − 0.7071i |
| | 7 | 0.7071 + 0.7071i | −0.7071 + 0.7071i |
| | 8 | 0.7071 + 0.7071i | 0.7071 − 0.7071i |
| | 9 | −0.7071 + 0.7071i | 0.7071 − 0.7071i |
| | 10 | −0.7071 + 0.7071i | −0.7071 − 0.7071i |
| | 11 | 0.7071 − 0.7071i | −0.7071 − 0.7071i |
| | 12 | −0.7071 + 0.7071i | −0.7071 − 0.7071i |
| | 13 | 0.7071 − 0.7071i | 0.7071 − 0.7071i |
| | 14 | 0.7071 + 0.7071i | −0.7071 − 0.7071i |
| | 15 | 0.7071 − 0.7071i | −0.7071 − 0.7071i |
| | 16 | −0.7071 − 0.7071i | 0.7071 + 0.7071i |
| | 17 | 0.7071 + 0.7071i | 0.7071 − 0.7071i |
| | 18 | 0.7071 − 0.7071i | 0.7071 + 0.7071i |
| | 19 | −0.7071 − 0.7071i | −0.7071 + 0.7071i |
| | 20 | −0.7071 − 0.7071i | −0.7071 + 0.7071i |
| | 21 | 0.7071 + 0.7071i | 0.7071 − 0.7071i |
| | 22 | −0.7071 − 0.7071i | 0.7071 + 0.7071i |
| | 23 | 0.7071 − 0.7071i | 0.7071 − 0.7071i |
| | 24 | 0.7071 − 0.7071i | −0.7071 + 0.7071i. |

25. A program storage device as in claim 19, where the at least one saved sequence is used for at least one wireless communication within an evolved universal terrestrial radio access network.

26. A program storage device as in claim 19, where the at least one saved sequence comprises a plurality of saved sequences, the operations further comprising: selecting a subset of the plurality of saved sequences, where selecting the subset of the plurality of saved sequences comprises:
  calculating cross-correlations for each pair of sequences of the plurality of saved sequences for a plurality of different cyclic shift combinations;
  selecting a cross-correlation value having a largest amplitude as a cross-correlation representative value for the cross-correlations between the corresponding pair of sequences; and
  iterating the sequences of the plurality of saved sequences in the following manner to obtain the subset of the plurality of saved sequences, where zero or more of the sequences of the plurality of saved sequences are removed on each iteration:
    for each sequence of the plurality of saved sequences, counting a first number of representative values exceeding a first cross-correlation threshold, a second number of representative values exceeding a second cross-correlation threshold and a third number of representative values exceeding a third cross-correlation threshold, where the first cross-correlation threshold is greater than the second cross-correlation threshold and the second cross-correlation threshold is greater than the third cross-correlation threshold;
    selecting for further consideration those sequences having the first number of representative values equal to a maximum first number of representative values over all sequences under consideration;
    selecting for further consideration those sequences having the second number of representative values equal to a maximum second number of representative values over all sequences under consideration;
    removing a sequence having a largest third number of representative values over all sequences under consideration;
    removing the cross-correlation representative values related to the removed sequence; and
    placing remaining sequences back under consideration.

27. A program storage device as in claim 19, where the at least one saved sequence comprises a plurality of saved sequences, the operations further comprising: selecting a subset of the plurality of saved sequences, where selecting the subset of the plurality of saved sequences comprises:
  calculating cross-correlations for each pair of sequences of the plurality of saved sequences for a first plurality of different cyclic shift combinations;
  selecting a cross-correlation value having a largest amplitude as a cross-correlation representative value for the cross-correlations between the corresponding pair of sequences;
  for each pair of sequences, calculating mean squared difference between the cross-correlations and m/sqrt(N) over a second plurality of different cyclic shift combination, where m comprises a scaling factor and N comprises a sequence length;
  iterating the sequences of the plurality of saved sequences in the following manner to obtain the subset of the plurality of saved sequences, where zero or more of the sequences of the plurality of saved sequences are removed on each iteration:
    for each sequence of the plurality of saved sequences, counting a number of representative values exceeding a cross-correlation threshold;
    selecting for further consideration those sequences having the number of representative values equal to a maximum number of representative values over all sequences under consideration;
    removing a sequence having a largest mean squared difference over all sequences under consideration;
    removing the cross-correlation representative values and the mean squared difference values related to the removed sequence; and
    placing remaining sequences back under consideration.

28. An apparatus comprising: a memory and at least one processor, where the at least one processor is configured to:
  randomly select a set of sequences with each sequence comprised of sequence elements, each sequence element having a frequency selected from constellation points on a unit circle in a complex plane, where the selected set of sequences comprises a candidate set of sequences;
  calculate a first cubic metric for each sequence of the candidate set of sequences, where the first cubic metric is for single code modulation; and
  in response to the first cubic metric being larger than at least one threshold, remove the corresponding sequence from the candidate set of sequences to obtain at least one saved sequence, where the at least one saved sequence is stored on the memory.

29. An apparatus as in claim 28, where the at least one processor is further configured to:
   calculate a second cubic metric for each sequence of the candidate set of sequences, where the second cubic metric is for multi-code modulation; and
   in response to at least one of the first cubic metric or the second cubic metric being larger than at least one threshold, remove the corresponding sequence from the candidate set of sequences to obtain the at least one saved sequence.

30. An apparatus as in claim 29, where the at least one threshold comprises a first threshold and a second threshold, where the at least one processor is configured to remove the corresponding sequence in response to at least one of the first cubic metric being larger than the first threshold or the second cubic metric being larger than the second threshold.

31. An apparatus as in claim 28, where the processor is further configured to:
   calculate cross-correlations for a plurality of different cyclic shift combinations of each sequence of the candidate set of sequences against a second sequence set;
   select a cross-correlation value having a largest amplitude as a representative cross-correlation value for the cross-correlations between the corresponding sequence and the second sequence set; and
   in response to the representative cross-correlation value being larger than a threshold, remove the corresponding sequence from the candidate set of sequences.

32. An apparatus as in claim 28, where the at least one saved sequence comprises at least one of:

| element | | | | | |
|---|---|---|---|---|---|
| | 1 | 0.7071 − 0.7071i | −0.7071 + 0.7071i | 0.7071 + 0.7071i | 0.7071 + 0.7071i |
| | 2 | −0.7071 + 0.7071i | 0.7071 + 0.7071i | 0.7071 + 0.7071i | −0.7071 + 0.7071i |
| | 3 | 0.7071 − 0.7071i | 0.7071 − 0.7071i | −0.7071 − 0.7071i | 0.7071 + 0.7071i |
| | 4 | 0.7071 + 0.7071i | 0.7071 − 0.7071i | −0.7071 − 0.7071i | 0.7071 − 0.7071i |
| | 5 | −0.7071 − 0.7071i | −0.7071 + 0.7071i | −0.7071 − 0.7071i | 0.7071 + 0.7071i |
| | 6 | −0.7071 − 0.7071i | −0.7071 + 0.7071i | −0.7071 − 0.7071i | −0.7071 + 0.7071i |
| | 7 | −0.7071 − 0.7071i | −0.7071 − 0.7071i | 0.7071 − 0.7071i | −0.7071 + 0.7071i |
| | 8 | −0.7071 − 0.7071i | 0.7071 + 0.7071i | −0.7071 + 0.7071i | −0.7071 − 0.7071i |
| | 9 | −0.7071 − 0.7071i | −0.7071 + 0.7071i | −0.7071 − 0.7071i | 0.7071 − 0.7071i |
| | 10 | 0.7071 + 0.7071i | 0.7071 + 0.7071i | 0.7071 + 0.7071i | 0.7071 − 0.7071i |
| | 11 | 0.7071 − 0.7071i | −0.7071 + 0.7071i | −0.7071 − 0.7071i | −0.7071 + 0.7071i |
| | 12 | −0.7071 − 0.7071i | −0.7071 + 0.7071i | −0.7071 − 0.7071i | 0.7071 − 0.7071i |

| element | | | | |
|---|---|---|---|---|
| | 1 | −0.7071 − 0.7071i | −0.7071 − 0.7071i | 0.7071 + 0.7071i |
| | 2 | −0.7071 + 0.7071i | 0.7071 + 0.7071i | −0.7071 + 0.7071i |
| | 3 | 0.7071 + 0.7071i | 0.7071 + 0.7071i | −0.7071 + 0.7071i |
| | 4 | 0.7071 + 0.7071i | −0.7071 + 0.7071i | −0.7071 + 0.7071i |
| | 5 | −0.7071 − 0.7071i | −0.7071 + 0.7071i | 0.7071 − 0.7071i |
| | 6 | 0.7071 + 0.7071i | −0.7071 + 0.7071i | 0.7071 − 0.7071i |
| | 7 | −0.7071 − 0.7071i | −0.7071 − 0.7071i | −0.7071 − 0.7071i |
| | 8 | −0.7071 − 0.7071i | −0.7071 − 0.7071i | −0.7071 − 0.7071i |
| | 9 | 0.7071 − 0.7071i | −0.7071 + 0.7071i | 0.7071 + 0.7071i |
| | 10 | 0.7071 − 0.7071i | 0.7071 − 0.7071i | −0.7071 − 0.7071i |
| | 11 | 0.7071 + 0.7071i | −0.7071 + 0.7071i | −0.7071 + 0.7071i |
| | 12 | −0.7071 − 0.7071i | 0.7071 − 0.7071i | 0.7071 − 0.7071i. |

33. An apparatus as in claim 28, where the at least one saved sequence comprises at least one of:

| element | | | | |
|---|---|---|---|---|
| | 1 | −0.7071 − 0.7071i | −0.7071 + 0.7071i | −0.7071 − 0.7071i |
| | 2 | −0.7071 − 0.7071i | 0.7071 − 0.7071i | −0.7071 + 0.7071i |
| | 3 | −0.7071 + 0.7071i | 0.7071 − 0.7071i | −0.7071 − 0.7071i |
| | 4 | 0.7071 + 0.7071i | 0.7071 − 0.7071i | −0.7071 − 0.7071i |
| | 5 | −0.7071 + 0.7071i | 0.7071 − 0.7071i | −0.7071 − 0.7071i |
| | 6 | 0.7071 + 0.7071i | −0.7071 − 0.7071i | 0.7071 + 0.7071i |
| | 7 | −0.7071 − 0.7071i | 0.7071 − 0.7071i | −0.7071 − 0.7071i |
| | 8 | −0.7071 + 0.7071i | −0.7071 + 0.7071i | −0.7071 − 0.7071i |
| | 9 | 0.7071 + 0.7071i | −0.7071 + 0.7071i | −0.7071 + 0.7071i |
| | 10 | −0.7071 + 0.7071i | 0.7071 + 0.7071i | 0.7071 − 0.7071i |
| | 11 | 0.7071 + 0.7071i | 0.7071 − 0.7071i | 0.7071 + 0.7071i |
| | 12 | 0.7071 + 0.7071i | 0.7071 + 0.7071i | 0.7071 + 0.7071i |
| | 13 | −0.7071 + 0.7071i | −0.7071 + 0.7071i | 0.7071 + 0.7071i |
| | 14 | −0.7071 + 0.7071i | −0.7071 + 0.7071i | −0.7071 + 0.7071i |
| | 15 | 0.7071 − 0.7071i | −0.7071 + 0.7071i | 0.7071 + 0.7071i |
| | 16 | 0.7071 − 0.7071i | 0.7071 − 0.7071i | 0.7071 − 0.7071i |
| | 17 | −0.7071 − 0.7071i | 0.7071 + 0.7071i | −0.7071 + 0.7071i |
| | 18 | 0.7071 + 0.7071i | 0.7071 + 0.7071i | −0.7071 − 0.7071i |
| | 19 | −0.7071 − 0.7071i | −0.7071 − 0.7071i | −0.7071 − 0.7071i |
| | 20 | 0.7071 − 0.7071i | 0.7071 + 0.7071i | 0.7071 + 0.7071i |
| | 21 | −0.7071 + 0.7071i | −0.7071 + 0.7071i | −0.7071 + 0.7071i |
| | 22 | 0.7071 + 0.7071i | 0.7071 − 0.7071i | 0.7071 + 0.7071i |
| | 23 | 0.7071 + 0.7071i | −0.7071 − 0.7071i | 0.7071 + 0.7071i |
| | 24 | −0.7071 + 0.7071i | −0.7071 + 0.7071i | −0.7071 − 0.7071i |

| element | | |
|---|---|---|
| 1 | 0.7071 − 0.7071i | 0.7071 − 0.7071i |
| 2 | 0.7071 − 0.7071i | 0.7071 + 0.7071i |
| 3 | 0.7071 − 0.7071i | −0.7071 − 0.7071i |
| 4 | −0.7071 − 0.7071i | −0.7071 − 0.7071i |
| 5 | −0.7071 − 0.7071i | −0.7071 + 0.7071i |
| 6 | 0.7071 − 0.7071i | 0.7071 − 0.7071i |
| 7 | 0.7071 + 0.7071i | −0.7071 + 0.7071i |
| 8 | 0.7071 + 0.7071i | 0.7071 − 0.7071i |
| 9 | −0.7071 + 0.7071i | 0.7071 − 0.7071i |
| 10 | −0.7071 + 0.7071i | −0.7071 − 0.7071i |
| 11 | 0.7071 − 0.7071i | −0.7071 − 0.7071i |
| 12 | −0.7071 + 0.7071i | −0.7071 − 0.7071i |
| 13 | 0.7071 − 0.7071i | 0.7071 − 0.7071i |
| 14 | 0.7071 + 0.7071i | −0.7071 − 0.7071i |
| 15 | 0.7071 − 0.7071i | −0.7071 − 0.7071i |
| 16 | −0.7071 − 0.7071i | 0.7071 + 0.7071i |
| 17 | 0.7071 + 0.7071i | 0.7071 − 0.7071i |
| 18 | 0.7071 − 0.7071i | 0.7071 + 0.7071i |
| 19 | −0.7071 − 0.7071i | −0.7071 + 0.7071i |
| 20 | −0.7071 − 0.7071i | −0.7071 + 0.7071i |
| 21 | 0.7071 + 0.7071i | 0.7071 − 0.7071i |
| 22 | −0.7071 − 0.7071i | 0.7071 + 0.7071i |
| 23 | 0.7071 − 0.7071i | 0.7071 − 0.7071i |
| 24 | 0.7071 − 0.7071i | −0.7071 + 0.7071i. |

34. An apparatus as in claim 28, further comprising a transceiver, where the at least one saved sequence is used for at least one wireless communication, via the transceiver, within an evolved universal terrestrial radio access network.

35. An apparatus as in claim 28, where the at least one saved sequence comprises a plurality of saved sequences, the at least one processor being further configured to select a subset of the plurality of saved sequences, where the at least one processor selecting the subset of the plurality of saved sequences comprises the at least one processor:
 calculating cross-correlations for each pair of sequences of the plurality of saved sequences for a plurality of different cyclic shift combinations;
 selecting a cross-correlation value having a largest amplitude as a cross-correlation representative value for the cross-correlations between the corresponding pair of sequences; and
 iterating the sequences of the plurality of saved sequences in the following manner to obtain the subset of the plurality of saved sequences, where zero or more of the sequences of the plurality of saved sequences are removed on each iteration:
  for each sequence of the plurality of saved sequences, counting a first number of representative values exceeding a first cross-correlation threshold, a second number of representative values exceeding a second cross-correlation threshold and a third number of representative values exceeding a third cross-correlation threshold, where the first cross-correlation threshold is greater than the second cross-correlation threshold and the second cross-correlation threshold is greater than the third cross-correlation threshold;
  selecting for further consideration those sequences having the first number of representative values equal to a maximum first number of representative values over all sequences under consideration;
  selecting for further consideration those sequences having the second number of representative values equal to a maximum second number of representative values over all sequences under consideration;
  removing a sequence having a largest third number of representative values over all sequences under consideration;
  removing the cross-correlation representative values related to the removed sequence; and
  placing remaining sequences back under consideration.

36. An apparatus as in claim 28, where the at least one saved sequence comprises a plurality of saved sequences, the at least one processor being further configured to select a subset of the plurality of saved sequences, where the at least one processor selecting the subset of the plurality of saved sequences comprises the at least one processor:
 calculating cross-correlations for each pair of sequences of the plurality of saved sequences for a first plurality of different cyclic shift combinations;
 selecting a cross-correlation value having a largest amplitude as a cross-correlation representative value for the cross-correlations between the corresponding pair of sequences;
 for each pair of sequences, calculating mean squared difference between the cross-correlations and m/sqrt(N) over a second plurality of different cyclic shift combination, where m comprises a scaling factor and N comprises a sequence length;
 iterating the sequences of the plurality of saved sequences in the following manner to obtain the subset of the plurality of saved sequences, where zero or more of the sequences of the plurality of saved sequences are removed on each iteration:
  for each sequence of the plurality of saved sequences, counting a number of representative values exceeding a cross-correlation threshold;
  selecting for further consideration those sequences having the number of representative values equal to a maximum number of representative values over all sequences under consideration;
  removing a sequence having a largest mean squared difference over all sequences under consideration;
  removing the cross-correlation representative values and the mean squared difference values related to the removed sequence; and
  placing remaining sequences back under consideration.

37. An apparatus as in claim 28, where the apparatus comprises a mobile station.

38. An apparatus as in claim 28, where the apparatus comprises a base station.

* * * * *